United States Patent
Xin et al.

(10) Patent No.: US 11,601,849 B2
(45) Date of Patent: Mar. 7, 2023

(54) METHOD FOR DETERMINING BACKGROUND TRAFFIC TRANSFER POLICY AND APPARATUS

(71) Applicant: Huawei Technologies Co., Ltd., Shenzhen (CN)

(72) Inventors: Yang Xin, Shanghai (CN); Xiaobo Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/100,208

(22) Filed: Nov. 20, 2020

(65) Prior Publication Data

US 2021/0076261 A1    Mar. 11, 2021

Related U.S. Application Data

(63) Continuation of application No. PCT/CN2019/087653, filed on May 20, 2019.

(30) Foreign Application Priority Data

May 21, 2018  (CN) .......................... 201810491483.8
Jun. 26, 2018  (CN) .......................... 201810671611.7
Apr. 1, 2019   (CN) .......................... 201910256749.5

(51) Int. Cl.
*H04W 28/10*    (2009.01)
*H04W 24/08*    (2009.01)
*H04W 28/02*    (2009.01)

(52) U.S. Cl.
CPC ........... *H04W 28/10* (2013.01); *H04W 24/08* (2013.01); *H04W 28/0247* (2013.01)

(58) Field of Classification Search
CPC ..... H04W 24/02; H04W 24/10; H04W 28/10; H04W 28/0247; H04W 24/08; H04W 28/02

(Continued)

(56) References Cited

U.S. PATENT DOCUMENTS 8,340,099 B2    12/2012  Black et al.
9,674,731 B2    6/2017   Raleigh et al.
(Continued)

FOREIGN PATENT DOCUMENTS

CN    102934477 A    2/2013
CN    106797321 A    5/2017
(Continued)

OTHER PUBLICATIONS

3GPP TS 23.502 V15.1.0, "3rd Generation Partnership Project; Technical Specification Group Services and System Aspects; Procedures for the 5G System; Stage 2 (Release 15)," Mar. 2018, 285 pages.
(Continued)

*Primary Examiner* — Man U Phan
(74) *Attorney, Agent, or Firm* — Conley Rose, P.C.

(57) ABSTRACT

A method where a data analytics network element may determine a background traffic transmission data analysis result of a first terminal device based on target background traffic transfer policies of another terminal device (that is, a second terminal device), and where the data analytics network element may further enable a first policy control network element to determine a background traffic transfer policy of the first terminal device. Therefore, the background traffic transfer policy of the first terminal device is determined by the first policy control network element with reference to the other terminal devices.

20 Claims, 14 Drawing Sheets

(58) Field of Classification Search
USPC .......................................................... 370/235
See application file for complete search history.

(56) References Cited

U.S. PATENT DOCUMENTS

| | | | |
|---|---|---|---|
| 10,211,995 B2* | 2/2019 | Wang | H04W 4/24 |
| 10,757,716 B2* | 8/2020 | Starsinic | H04W 4/50 |
| 10,785,634 B1* | 9/2020 | Fiorese | H04L 41/40 |
| 10,805,841 B2* | 10/2020 | Livanos | H04W 8/24 |
| 11,234,161 B2* | 1/2022 | Hua | H04W 16/02 |
| 2011/0312312 A1 | 12/2011 | Astrom et al. | |
| 2012/0224481 A1 | 9/2012 | Babiarz et al. | |
| 2017/0214536 A1 | 7/2017 | Wang et al. | |
| 2019/0268230 A1* | 8/2019 | Huang | H04L 47/20 |
| 2019/0357301 A1* | 11/2019 | Li | H04W 80/10 |
| 2020/0022027 A1* | 1/2020 | Iwai | H04L 12/14 |
| 2021/0022022 A1* | 1/2021 | Guo | H04L 41/14 |
| 2021/0136548 A1* | 5/2021 | Mladin | H04W 12/08 |
| 2021/0168584 A1* | 6/2021 | Li | H04W 28/16 |
| 2021/0352180 A1* | 11/2021 | Xu | H04M 15/854 |

FOREIGN PATENT DOCUMENTS

| | | |
|---|---|---|
| CN | 106982125 A | 7/2017 |
| CN | 107040481 A | 8/2017 |
| WO | 2011049430 A2 | 4/2011 |
| WO | 2017175070 A1 | 10/2017 |

OTHER PUBLICATIONS

3GPP TS 23.503 V15.1.0 "3rd Generation Partnership Project; Technical Specification Group Services and System Aspects; Policy and Charging Control Framework for the 5G System; Stage 2 (Release 15)," Mar. 2018, 65 pages.

KDDI, Toyota Ito, "7.4 NWADF-assisted Background Data Transfer." 3GPP TSG-SA WG2 Meeting #130, Jan. 21-25, 2019, Kochi, India, S2-1900079, 4 pages.

KDDI, Toyota Ito, Huawei, HiSilicon, "Solution Update and Merging: Solution 18," 3GPP TSG SA WG2 Meeting #129BIS, Nov. 26-30, 2018, West Palm Beach, USA, S2-1811694, 5 pages.

"3rd Generation Partnership Project; Technical Specification Group Services and System Aspects; Study of Enablers for Network Automation for 5G(Release 16)," 3GPP TR 23.791 V0.3.0, Apr. 2018, 19 pages.

* cited by examiner

METHOD FOR DETERMINING BACKGROUND TRAFFIC TRANSFER POLICY AND APPARATUS

CROSS-REFERENCE TO RELATED APPLICATIONS

This application is a continuation of International Patent Application No. PCT/CN2019/087653, filed on May 20, 2019, which claims priority to Chinese Patent Application No. 201810491483.8, filed on May 21, 2018, Chinese Patent Application No. 201810671611.7, filed on Jun. 26, 2018, and Chinese Patent Application No. 201910256749.5, filed on Apr. 1, 2019. The disclosures of the aforementioned applications are hereby incorporated by reference in their entireties.

TECHNICAL FIELD

This application relates to the field of communications technologies, and in particular, to a method for determining a background traffic transfer policy and an apparatus.

BACKGROUND

Background traffic (background traffic, BG) may also be referred to as background data (BD), and is usually defined as non-real-time interactive traffic, for example, transmitted traffic such as a software update package, a software notification message, and in-vehicle map information.

Currently, before the background traffic is transmitted, a policy control network element usually formulates a background traffic transfer policy for a service network element, such that a terminal device corresponding to the service network element subsequently transmits background traffic according to the background traffic transfer policy. However, in practice, different service network elements request respective background traffic transfer policies from different policy control network elements, and different policy control network elements can formulate corresponding background traffic transfer policies based on requests of only service network elements accessing the policy control network elements. As a result, background traffic transfer policies of different service network elements conflict with each other, leading to a background traffic transmission failure. For example, a background traffic transfer policy of each of a plurality of service network elements indicates a terminal device corresponding to the service network element to transmit background traffic between 1:00 a.m. and 2:00 a.m. In this case, when a plurality of terminal devices transmit background traffic in a same time period, network congestion may be caused, and further, background traffic transmission may fail.

Currently, a problem of a background traffic transmission failure caused by a conflict between background traffic transfer policies formulated by different policy control network elements for different service network elements needs to be resolved urgently.

SUMMARY

This application provides a method for determining a background traffic transfer policy and an apparatus, to resolve a problem in other approaches of a transmitting background traffic transmission failure caused by a conflict between background traffic transfer policies formulated by different policy control network elements for different service network elements.

According to a first aspect, this application provides a method for determining a background traffic transfer policy. The method includes the following.

A first policy control network element (for example, a policy control function (PCF) network element) receives first information from a requesting device, where the first information is used to request a background traffic transfer policy of a first terminal device. The first policy control network element sends second information to a data analytics network element (for example, a network data analytics function (NWDAF) network element) based on the first information, where the second information is used to request a background traffic transmission data analysis result of the first terminal device. The first policy control network element receives the background traffic transmission data analysis result of the first terminal device from the data analytics network element, where the background traffic transmission data analysis result of the first terminal device is determined by the data analytics network element according to a target background traffic transfer policy of a second terminal device, the second terminal device is different from the first terminal device, and the target background traffic transfer policy of the second terminal device is used by the second terminal device to transmit background traffic. The first policy control network element sends the background traffic transfer policy of the first terminal device to the requesting device, where the background traffic transfer policy of the first terminal device is determined by the first policy control network element based on third information, and the third information includes the background traffic transmission data analysis result of the first terminal device.

According to the foregoing method, the data analytics network element determines the background traffic transmission data analysis result of the first terminal device based on a target background traffic transfer policy of another terminal device (that is, the second terminal device), such that the first policy control network element can determine the background traffic transfer policy of the first terminal device. Therefore, the background traffic transfer policy of the first terminal device is determined by the first policy control network element with reference to the other terminal device. In this way, the background traffic transfer policy that is of the first terminal device and that is determined by the first policy control network element does not conflict with a background traffic transfer policy of the other terminal device, thereby avoiding a background traffic transmission failure.

In a possible design, the third information further includes a background traffic transmission query result of the first terminal device and/or a local background traffic transfer policy of the first terminal device. In this way, the background traffic transfer policy that is of the first terminal device and that is determined by the first policy control network element may be more accurate.

In a possible design, the method further includes: When the third information further includes the background traffic transmission query result of the first terminal device, the first policy control network element obtains the background traffic transmission query result of the first terminal device from a database network element; or when the third information further includes the local background traffic transfer policy of the first terminal device, the first policy control network element obtains the local background traffic transfer policy of the first terminal device from the first policy control network element; or when the third information further includes the background traffic transmission query result of the first terminal device and the local background traffic transfer policy of the first terminal device, the first policy control network element obtains the background traffic transmission query result of the first terminal device from a database network element, and the first policy control network element obtains the local background traffic transfer policy of the first terminal device from the first policy control network element.

According to the foregoing method, the first policy control network element can accurately determine the background traffic transfer policy of the first terminal device based on the third information subsequently.

In a possible design, when the first terminal device has one background traffic transfer policy, the first policy control network element determines that the background traffic transfer policy of the first terminal device is a target background traffic transfer policy of the first terminal device, where the target background traffic transfer policy of the first terminal device is used by the first terminal device to transmit background traffic. Then, the first policy control network element sends the target background traffic transfer policy of the first terminal device to the data analytics network element; or the first policy control network element sends the target background traffic transfer policy of the first terminal device to the database network element; or the first policy control network element sends the target background traffic transfer policy of the first terminal device to both the data analytics network element and the database network element.

According to the foregoing method, the data analytics network element may store the target background traffic transfer policy of the first terminal device. Then, when another terminal device requests a corresponding background traffic transmission data analysis result from the data analytics network element, the data analytics network element may determine a background traffic transmission data analysis result of the other terminal device for the other terminal device according to the target background traffic transfer policy of the first terminal device. In this way, a conflict between a background traffic transfer policy of the other terminal device and the target background traffic transfer policy of the first terminal device can be reduced subsequently, such that background traffic of the other terminal device can be successfully transmitted. Alternatively, the database network element may store the target background traffic transfer policy of the first terminal device, such that the data analytics network element can obtain the target background traffic transfer policy of the first terminal device from the database network element subsequently, thereby achieving the foregoing beneficial effects.

In a possible design, when the first terminal device has a plurality of background traffic transfer policies, the first policy control network element receives a target background traffic transfer policy of the first terminal device from the requesting device, where the target background traffic transfer policy of the first terminal device is selected by the requesting device according to the background traffic transfer policies of the first terminal device. Then, the first policy control network element sends the target background traffic transfer policy of the first terminal device to the data analytics network element; or the first policy control network element sends the target background traffic transfer policy of the first terminal device to the database network element; or the first policy control network element sends the target background traffic transfer policy of the first terminal device to both the data analytics network element and the database network element.

According to the foregoing method, the data analytics network element may store the target background traffic transfer policy of the first terminal device. Then, when another terminal device requests a corresponding background traffic transmission data analysis result from the data analytics network element, the data analytics network element may determine a background traffic transmission data analysis result of the other terminal device for the other terminal device according to the target background traffic transfer policy of the first terminal device. In this way, a conflict between a background traffic transfer policy of the other terminal device and the target background traffic transfer policy of the first terminal device can be reduced subsequently, such that background traffic of the other terminal device can be successfully transmitted. Alternatively, the database network element may store the target background traffic transfer policy of the first terminal device, such that the data analytics network element can obtain the target background traffic transfer policy of the first terminal device from the database network element subsequently, thereby achieving the foregoing beneficial effects.

In a possible design, the requesting device is the first terminal device or a service network element serving the first terminal device. In this way, both a request for an uplink background traffic transfer policy and a request for a downlink background traffic transfer policy can be implemented, and a background traffic transfer policy can be relatively flexibly requested.

In a possible design, the background traffic transmission data analysis result includes a first data value of a background traffic transmission time window. The background traffic transmission data analysis result further includes at least one of a first data value of a background traffic transmission bandwidth, location information of the first terminal device, or an identifier of the first terminal device.

In this way, the first policy control network element can determine the background traffic transfer policy of the first terminal device using content included in the background traffic transmission data analysis result.

In a possible design, the location information of the first terminal device may be one or more of the following information: a network area, a radio access network (RAN) device ID, a cell ID, and a global positioning system (GPS).

In a possible design, the identifier of the first terminal device may be one or more of the following: an Internet Protocol (IP) address, a subscription permanent identifier (SUFI), a permanent equipment identifier (PEI), a generic public subscription identifier (GPSI), an international mobile subscriber identity (IMSI), an international mobile equipment identity (IMEI), an IP 5-tuple, and a mobile station international integrated service digital network number (MSISDN).

In a possible design, the background traffic transfer policy includes a second data value of the background traffic transmission time window. The background traffic transfer policy further includes at least one of a second data value of the background traffic transmission bandwidth, the location information of the first terminal device, or the identifier of the first terminal device.

In this way, the first terminal device can transmit background traffic using the background traffic transfer policy subsequently.

In a possible design, the second information includes a volume of background traffic of the first terminal device. The second information further includes at least one of an identifier of the first policy control network element, an identifier of the requesting device, a third data value of the background traffic transmission time window for the first terminal device, the location information of the first terminal device, or the identifier of the first terminal device.

In this way, the data analytics network element can accurately determine the background traffic transmission data analysis result of the first terminal device with reference to content included in the second information.

In a possible design, the first information includes the volume of the background traffic of the first terminal device. The first information further includes at least one of the identifier of the requesting device, the third data value of the background traffic transmission time window for the first terminal device, the location information of the first terminal device, or the identifier of the first terminal device.

In this way, the first policy control network element can learn of a requirement of the first terminal device based on content included in the first information, to request, for the first terminal device, a background traffic transfer policy that satisfies the requirement.

In a possible design, the background traffic transmission query result includes a fourth data value of the background traffic transmission time window. The background traffic transmission query result further includes at least one of a fourth data value of the background traffic transmission bandwidth, the location information of the first terminal device, or the identifier of the first terminal device.

In a possible design, the local background traffic transfer policy includes a fifth data value of the background traffic transmission time window. The local background traffic transmission result further includes at least one of a fifth data value of the background traffic transmission bandwidth, the location information of the first terminal device, or the identifier of the first terminal device.

In a possible design, when the first policy control network element sends the background traffic transfer policy of the first terminal device to the requesting device, the first policy control network element may further send identification information to the requesting device, where the identification information is used to identify the target background traffic transfer policy of the first terminal device.

In this way, when receiving the background traffic of the first terminal device, the requesting device may determine target background traffic of the first terminal device in the background traffic of the first terminal device using the identification information.

In a possible design, when the first policy control network element sends the target background traffic transfer policy of the first terminal device to the data analytics network element, the first policy control network element may further send at least one of the identification information, the identifier of the requesting device, or the identifier of the first policy control network element to the data analytics network element. Alternatively, when the first policy control network element sends the target background traffic transfer policy of the first terminal device to the data analytics network element, the first policy control network element may further send at least one of the identification information, the identifier of the requesting device, or the identifier of the first policy control network element to the database network element. Alternatively, when the first policy control network element sends the target background traffic transfer policy of the first terminal device to the data analytics network element and the database network element, the first policy control network element may further send at least one of the identification information, the identifier of the requesting device, or the identifier of the first policy control network element to the data analytics network element and the database network element.

In this way, the data analytics network element can determine that the target background traffic transfer policy of the first terminal device is formulated for the requesting device or the first policy control network element, such that the data analytics network element subsequently formulates a target background traffic transfer policy for a terminal device that is different from the first terminal device and that is on the requesting device or another requesting device, or on the first policy control network element or another policy control network element. Alternatively, the database network element stores the target background traffic transfer policy of the first terminal device and the identification information. In this way, when the requesting device is to transmit background traffic, the requesting device may obtain, by querying the database network element using the identification information, the target background traffic transfer policy that is of the first terminal device and that corresponds to the identification information.

In a possible design, after the first policy control network element sends the background traffic transfer policy of the first terminal device to the requesting device, the first policy control network element may further receive identification information from the requesting device.

In this way, the first policy control network element can obtain the target background traffic transfer policy of the first terminal device by querying the database network element using the identification information, and subsequently send the target background traffic transfer policy of the first terminal device to at least one of the first terminal device, a radio access network element, a user plane function network element, or a service network element.

According to a second aspect, this application provides a method for determining a background traffic transfer policy. The method includes the following.

A data analytics network element receives second information from a first policy control network element, where the second information is used to request a background traffic transmission data analysis result of a first terminal device, the second information is determined by the first policy control network element based on first information received from a requesting device, and the first information is used to request a background traffic transfer policy of the first terminal device. The data analytics network element sends the background traffic transmission data analysis result of the first terminal device to the first policy control network element, where the background traffic transmission data analysis result of the first terminal device is determined by the data analytics network element according to a target background traffic transfer policy of a second terminal device, the second terminal device is different from the first terminal device, and the target background traffic transfer policy of the second terminal device is used by the second terminal device to transmit background traffic.

According to the foregoing method, the data analytics network element determines the background traffic transmission data analysis result of the first terminal device based on a target background traffic transfer policy of another terminal device (that is, the second terminal device), such that the first policy control network element can determine the background traffic transfer policy of the first terminal device. Therefore, the background traffic transfer policy that is of the first terminal device and that is determined by the first policy control network element can be referred to the other terminal device. In this way, the background traffic transfer policy that is of the first terminal device and that is determined by the first policy control network element does not conflict with a background traffic transfer policy of the other terminal device, thereby avoiding a background traffic transmission failure.

In a possible design, the background traffic transmission data analysis result of the first terminal device may alternatively be determined by the data analytics network element based on the target background traffic transfer policy of the second terminal device, the second information, and at least one of load information of a functional network element and capacity information of the functional network element.

According to the foregoing method, the background traffic transmission data analysis result of the first terminal device obtained through analysis by the data analytics network element may be more reliable.

In a possible design, when the first terminal device is the first terminal device that needs to transmit background traffic in a communications system, the data analytics network element cannot obtain a target background traffic transfer policy of any terminal device. In this case, the background traffic transmission data analysis result of the first terminal device may be determined by the data analytics network element based on at least one of the second information, the load information of the functional network element, or the capacity information of the functional network element.

According to the foregoing method, an initial background traffic transmission data analysis result of the first terminal device may be accurately obtained through analysis by the data analytics network element, to obtain the background traffic transfer policy of the first terminal device subsequently.

In a possible design, the data analytics network element may further obtain the target background traffic transfer policy of the second terminal device.

According to the foregoing method, the data analytics network element can accurately determine the background traffic transmission data analysis result of the first terminal device according to the target background traffic transfer policy of the second terminal device.

In a possible design, that the data analytics network element obtains the target background traffic transfer policy of the second terminal device may include: The data analytics network element receives the target background traffic transfer policy of the second terminal device from a first device, where the first device is any one or more of the following: the second terminal device, the first policy control network element, a second policy control network element, a second service network element, or a second database network element, where the first policy control network element, the second policy control network element, the second service network element, and the second database network element serve the second terminal device.

According to the foregoing method, the data analytics network element can successfully obtain the target background traffic transfer policy of the second terminal device in multiple manners, such that the data analytics network element subsequently determines the background traffic transmission data analysis result of the first terminal device.

In a possible design, the data analytics network element may further obtain the load information of the functional network element. Alternatively, the data analytics network element may further obtain the capacity information of the functional network element. Alternatively, the data analytics network element may further obtain the load information of the functional network element and the capacity information of the functional network element.

According to the foregoing method, the data analytics network element can more accurately determine the background traffic transmission data analysis result of the first terminal device based on the load information of the functional network element, or based on the capacity information of the functional network element, or based on the load information of the functional network element and the capacity information of the functional network element.

In a possible design, that the data analytics network element obtains the load information of the functional network element may include: The data analytics network element receives the load information of the functional network element from the functional network element or an operation, administration and maintenance network element. Alternatively, that the data analytics network element obtains the capacity information of the functional network element may include: The data analytics network element receives the capacity information of the functional network element from the functional network element or an operation, administration and maintenance network element. Alternatively, that the data analytics network element obtains the load information of the functional network element and the capacity information of the functional network element may include: The data analytics network element receives the load information of the functional network element and the capacity information of the functional network element from the functional network element or an operation, administration and maintenance network element.

According to the foregoing method, the data analytics network element can successfully obtain the load information of the functional network element, the capacity information of the functional network element, or the load information of the functional network element and the capacity information of the functional network element in a plurality of manners, such that the data analytics network element can accurately determine the background traffic transmission data analysis result of the first terminal device subsequently.

In a possible design, the functional network element includes at least one of the first policy control network element, a session management function network element, a radio access network element, an access and mobility management function network element, or a user plane function network element that serves the first terminal device.

In a possible design, the data analytics network element may further receive a target background traffic transfer policy of the first terminal device, where the first terminal device transmits background traffic according to the target background traffic transfer policy of the first terminal device.

According to the foregoing method, the data analytics network element may store the target background traffic transfer policy of the first terminal device. Then, when another terminal device requests a corresponding background traffic transmission data analysis result from the data analytics network element, the data analytics network element may determine the background traffic transmission data analysis result of the other terminal device for the other terminal device according to the target background traffic transfer policy of the first terminal device. In this way, a conflict between a background traffic transfer policy of the other terminal device and the target background traffic transfer policy of the first terminal device can be reduced subsequently, such that background traffic of the other terminal device can be successfully transmitted.

In a possible design, that the data analytics network element receives a target background traffic transfer policy of the first terminal device may include: The data analytics network element receives the target background traffic transfer policy of the first terminal device from a second device, where the second device is any one or more of the following: the first terminal device, the first policy control network element, a first service network element, or a first database network element, where the first policy control network element, the first service network element, and the first database network element serve the first terminal device.

According to the foregoing method, the data analytics network element may obtain the target background traffic transfer policy of the first terminal device in a plurality of manners, and the data analytics network element may store the target background traffic transfer policy of the first terminal device. Then, when another terminal device requests a corresponding background traffic transmission data analysis result from the data analytics network element, the data analytics network element may determine the background traffic transmission data analysis result of the other terminal device for the other terminal device according to the target background traffic transfer policy of the first terminal device. In this way, a conflict between a background traffic transfer policy of the other terminal device and the target background traffic transfer policy of the first terminal device can be reduced subsequently, such that background traffic of the other terminal device can be successfully transmitted.

In a possible design, when the data analytics network element receives the target background traffic transfer policy of the first terminal device, the data analytics network element may further receive an identifier of the requesting device, an identifier of the first policy control network element, or an identifier of the requesting device and an identifier of the first policy control network element.

In this way, the data analytics network element can determine that the target background traffic transfer policy of the first terminal device is formulated for the requesting device or the first policy control network element, such that the data analytics network element formulates a target background traffic transfer policy for a terminal device that is different from the first terminal device and that is on the requesting device or another requesting device, or on the first policy control network element or another policy control network element.

In a possible design, the background traffic transmission data analysis result includes a first data value of a background traffic transmission time window. The background traffic transmission data analysis result further includes at least one of a first data value of a background traffic transmission bandwidth, location information of the first terminal device, or an identifier of the first terminal device.

In this way, the first policy control network element can determine the background traffic transfer policy of the first terminal device using content included in the background traffic transmission data analysis result.

In a possible design, the background traffic transfer policy includes a second data value of the background traffic transmission time window. The background traffic transfer policy further includes at least one of a second data value of the background traffic transmission bandwidth, the location information of the first terminal device, or the identifier of the first terminal device.

In this way, the first terminal device can transmit background traffic using the background traffic transfer policy subsequently.

In a possible design, the second information includes a volume of background traffic of the first terminal device. The second information further includes at least one of an identifier of the first policy control network element, an identifier of the requesting device, a third data value of the background traffic transmission time window for the first terminal device, the location information of the first terminal device, or the identifier of the first terminal device.

In this way, the data analytics network element can accurately determine the background traffic transmission data analysis result of the first terminal device with reference to content included in the second information.

In a possible design, the first information includes the volume of the background traffic of the first terminal device. The first information further includes at least one of the identifier of the requesting device, the third data value of the background traffic transmission time window for the first terminal device, the location information of the first terminal device, or the identifier of the first terminal device.

In this way, the first policy control network element can learn of a requirement of the first terminal device based on content included in the first information, to request the background traffic transmission data analysis result of the first terminal device from the data analytics network element.

According to a third aspect, this application provides a method for determining a background traffic transfer policy. The method includes the following.

A first terminal device sends first information to a first policy control network element, where the first information is used to request a background traffic transfer policy of the first terminal device. The first terminal device receives the background traffic transfer policy of the first terminal device from the first policy control network element, where the background traffic transfer policy of the first terminal device is determined by the first policy control network element based on third information, and the third information includes a background traffic transmission data analysis result that is of the first terminal device and that is from a data analytics network element.

According to the foregoing method, the background traffic transfer policy of the first terminal device is determined by the first policy control network element based on the third information, and the third information includes the background traffic transmission data analysis result that is of the first terminal device and that is from the data analytics network element. Therefore, the background traffic transfer policy of the first terminal device is determined by the first policy control network element with reference to another terminal device. In this way, the background traffic transfer policy of the first terminal device does not conflict with a background traffic transfer policy of the other terminal device, thereby avoiding a background traffic transmission failure. In addition, according to the foregoing method, a request for an uplink background traffic transfer policy of the first terminal device can be further implemented.

In a possible design, the third information further includes a background traffic transmission query result of the first terminal device and/or a local background traffic transfer policy of the first terminal device.

According to the foregoing method, the first policy control network element can accurately determine the background traffic transfer policy of the first terminal device based on the third information subsequently.

In a possible design, when the first terminal device has one background traffic transfer policy, the method further includes: The first terminal device determines that the background traffic transfer policy of the first terminal device is a target background traffic transfer policy of the first terminal device. The first terminal device sends the target background traffic transfer policy of the first terminal device to the data analytics network element.

According to the foregoing method, the data analytics network element may store the target background traffic transfer policy of the first terminal device. Then, when another terminal device requests a corresponding background traffic transmission data analysis result from the data analytics network element, the data analytics network element may determine a background traffic transmission data analysis result of the other terminal device for the other terminal device according to the target background traffic transfer policy of the first terminal device. In this way, a conflict between a background traffic transfer policy of the other terminal device and the target background traffic transfer policy of the first terminal device can be reduced subsequently, such that background traffic of the other terminal device can be successfully transmitted.

In a possible design, when the first terminal device has a plurality of background traffic transfer policies, the method further includes: The first terminal device selects a target background traffic transfer policy of the first terminal device according to the background traffic transfer policies of the first terminal device. The first terminal device sends the target background traffic transfer policy of the first terminal device to the first policy control network element.

According to the foregoing method, when receiving the target background traffic transfer policy of the first terminal device, the first policy control network element may send the target background traffic transfer policy of the first terminal device to the data analytics network element, such that the data analytics network element stores the target background traffic transfer policy of the first terminal device. Then, when another terminal device requests a corresponding background traffic transmission data analysis result from the data analytics network element, the data analytics network element may determine the background traffic transmission data analysis result of the other terminal device for the other terminal device according to the target background traffic transfer policy of the first terminal device. In this way, a conflict between a background traffic transfer policy of the other terminal device and the target background traffic transfer policy of the first terminal device can be reduced subsequently, such that background traffic of the other terminal device can be successfully transmitted.

In a possible design, the first terminal device may further send the target background traffic transfer policy of the first terminal device to the data analytics network element.

According to the foregoing method, the data analytics network element may store the target background traffic transfer policy of the first terminal device. Then, when another terminal device requests a corresponding background traffic transmission data analysis result from the data analytics network element, the data analytics network element may determine a background traffic transmission data analysis result of the other terminal device for the other terminal device according to the target background traffic transfer policy of the first terminal device. In this way, a conflict between a background traffic transfer policy of the other terminal device and the target background traffic transfer policy of the first terminal device can be reduced subsequently, such that background traffic of the other terminal device can be successfully transmitted.

In a possible design, the background traffic transmission data analysis result includes a first data value of a background traffic transmission time window. The background traffic transmission data analysis result further includes at least one of a first data value of a background traffic transmission bandwidth, location information of the first terminal device, or an identifier of the first terminal device.

In this way, the first policy control network element can determine the background traffic transfer policy of the first terminal device using content included in the background traffic transmission data analysis result.

In a possible design, the background traffic transfer policy includes a second data value of the background traffic transmission time window. The background traffic transfer policy further includes at least one of a second data value of the background traffic transmission bandwidth, the location information of the first terminal device, or the identifier of the first terminal device.

In this way, the first terminal device can transmit background traffic using the background traffic transfer policy subsequently.

In a possible design, the first information includes a volume of background traffic of the first terminal device. The first information further includes at least one of a third data value of the background traffic transmission time window for, the location information of, or the identifier of the first terminal device.

In this way, the first policy control network element can learn of a requirement of the first terminal device based on content included in the first information, to request, for the first terminal device, a background traffic transfer policy that satisfies the requirement.

In a possible design, the background traffic transmission query result includes a fourth data value of the background traffic transmission time window. The background traffic transmission query result further includes at least one of a fourth data value of the background traffic transmission bandwidth, the location information of the first terminal device, or the identifier of the first terminal device.

In a possible design, the local background traffic transfer policy includes a fifth data value of the background traffic transmission time window. The local background traffic transmission result further includes at least one of a fifth data value of the background traffic transmission bandwidth, the location information of the first terminal device, or the identifier of the first terminal device.

In a possible design, when the first terminal device receives the background traffic transfer policy of the first terminal device from the first policy control network element, the first terminal device may further receive identification information from the first policy control network element, where the identification information is used to identify the target background traffic transfer policy of the first terminal device.

In this way, when the first terminal device is to transmit the background traffic and receives the background traffic transfer policy of the first terminal device, the first terminal device may determine the target background traffic transfer policy of the first terminal device in the background traffic transfer policy of the first terminal device using the identification information.

In a possible design, after the first terminal device receives the background traffic transfer policy of the first terminal device from the first policy control network element, the first terminal device may further send the identification information to the first policy control network element.

In this way, the first policy control network element can obtain the target background traffic transfer policy of the first terminal device by querying a database network element using the identification information, and subsequently send the target background traffic transfer policy of the first terminal device to at least one of a radio access network element, a user plane function network element, or a service network element.

In a possible design, before the first terminal device sends the first information to the first policy control network element, the method further includes: The first terminal device obtains the volume of the background traffic of the first terminal device from the first service network element. The first terminal device further obtains at least one of the third data value of the background traffic transmission time window for, the location information of, or the identifier of the first terminal device from the first service network element.

According to the foregoing method, the first terminal device may obtain a downlink background traffic transmission requirement from the first service network element, such that the first terminal device subsequently requests a downlink background traffic transfer policy.

According to a fourth aspect, this application provides a method for determining a background traffic transfer policy. The method includes the following.

A first service network element sends first information to a first policy control network element, where the first information is used to request a background traffic transfer policy of a first terminal device. The first service network element receives the background traffic transfer policy of the first terminal device from the first policy control network element, where the background traffic transfer policy of the first terminal device is determined by the first policy control network element based on third information, and the third information includes a background traffic transmission data analysis result that is of the first terminal device and that is from a data analytics network element.

According to the foregoing method, the background traffic transfer policy of the first terminal device is determined by the first policy control network element based on the third information, and the third information includes the background traffic transmission data analysis result that is of the first terminal device and that is from the data analytics network element. Therefore, the background traffic transfer policy of the first terminal device is determined by the first policy control network element with reference to another terminal device. In this way, the background traffic transfer policy of the first terminal device does not conflict with a background traffic transfer policy of the other terminal device, thereby avoiding a background traffic transmission failure.

In a possible design, the third information further includes a background traffic transmission query result of the first terminal device and/or a local background traffic transfer policy of the first terminal device. In this way, the background traffic transfer policy that is of the first terminal device and that is determined by the first policy control network element may be more accurate.

In a possible design, when the first terminal device has one background traffic transfer policy, the method further includes: The first service network element determines that the background traffic transfer policy of the first terminal device is a target background traffic transfer policy of the first terminal device. The first service network element sends the target background traffic transfer policy of the first terminal device to the data analytics network element.

According to the foregoing method, the data analytics network element may store the target background traffic transfer policy of the first terminal device. Then, when another terminal device requests a corresponding background traffic transmission data analysis result from the data analytics network element, the data analytics network element may determine a background traffic transmission data analysis result of the other terminal device for the other terminal device according to the target background traffic transfer policy of the first terminal device. In this way, a conflict between a background traffic transfer policy of the other terminal device and the target background traffic transfer policy of the first terminal device can be reduced subsequently, such that background traffic of the other terminal device can be successfully transmitted.

In a possible design, when the first terminal device has a plurality of background traffic transfer policies, the method further includes: The first service network element selects a target background traffic transfer policy of the first terminal device according to the background traffic transfer policies of the first terminal device. The first service network element sends the target background traffic transfer policy of the first terminal device to the first policy control network element.

According to the foregoing method, when receiving the target background traffic transfer policy of the first terminal device, the first policy control network element may send the target background traffic transfer policy of the first terminal device to the data analytics network element, such that the data analytics network element stores the target background traffic transfer policy of the first terminal device. Then, when another terminal device requests a corresponding background traffic transmission data analysis result from the data analytics network element, the data analytics network element may determine the background traffic transmission data analysis result of the other terminal device for the other terminal device according to the target background traffic transfer policy of the first terminal device. In this way, a conflict between a background traffic transfer policy of the other terminal device and the target background traffic transfer policy of the first terminal device can be reduced subsequently, such that background traffic of the other terminal device can be successfully transmitted.

In a possible design, the first service network element may further send the target background traffic transfer policy of the first terminal device to the data analytics network element.

According to the foregoing method, the data analytics network element may store the target background traffic transfer policy of the first terminal device. Then, when another terminal device requests a corresponding background traffic transmission data analysis result from the data analytics network element, the data analytics network element may determine a background traffic transmission data analysis result of the other terminal device for the other terminal device according to the target background traffic transfer policy of the first terminal device. In this way, a conflict between a background traffic transfer policy of the other terminal device and the target background traffic transfer policy of the first terminal device can be reduced subsequently, such that background traffic of the other terminal device can be successfully transmitted.

In a possible design, the background traffic transmission data analysis result includes a first data value of a background traffic transmission time window. The background traffic transmission data analysis result further includes at least one of a first data value of a background traffic transmission bandwidth, location information of the first terminal device, or an identifier of the first terminal device.

In this way, the first policy control network element can determine the background traffic transfer policy of the first terminal device using content included in the background traffic transmission data analysis result.

In a possible design, the background traffic transfer policy includes a second data value of the background traffic transmission time window. The background traffic transfer policy further includes at least one of a second data value of the background traffic transmission bandwidth, the location information of the first terminal device, or the identifier of the first terminal device.

In this way, the first terminal device can transmit background traffic using the background traffic transfer policy subsequently.

In a possible design, the first information includes the volume of the background traffic of the first terminal device. The first information further includes at least one of the identifier of the first service network element, the third data value of the background traffic transmission time window for the first terminal device, the location information of the first terminal device, or the identifier of the first terminal device.

In this way, the first policy control network element can learn of a requirement of the first terminal device based on content included in the first information, to request, for the first terminal device, a background traffic transfer policy that satisfies the requirement.

In a possible design, the background traffic transmission query result includes a fourth data value of the background traffic transmission time window. The background traffic transmission query result further includes at least one of a fourth data value of the background traffic transmission bandwidth, the location information of the first terminal device, or the identifier of the first terminal device.

In a possible design, the local background traffic transfer policy includes a fifth data value of the background traffic transmission time window. The local background traffic transmission result further includes at least one of a fifth data value of the background traffic transmission bandwidth, the location information of the first terminal device, or the identifier of the first terminal device.

In a possible design, when the first service network element receives the background traffic transfer policy of the first terminal device from the first policy control network element, the first service network element may further receive identification information from the first policy control network element, where the identification information is used to identify the target background traffic transfer policy of the first terminal device.

In this way, when receiving the background traffic of the first terminal device, the first service network element may determine target background traffic of the first terminal device in the background traffic of the first terminal device using the identification information.

In a possible design, after the first service network element receives the background traffic transfer policy of the first terminal device from the first policy control network element, the first service network element may further send identification information to the first policy control network element.

In this way, the first policy control network element can obtain the target background traffic transfer policy of the first terminal device by querying the database network element using the identification information, and subsequently send the target background traffic transfer policy of the first terminal device to at least one of the first terminal device, a radio access network element, or a user plane function network element.

In a possible design, before the first service network element sends the first information to the first policy control network element, the method further includes: The first service network element obtains the volume of the background traffic of the first terminal device from the first terminal device. The first service network element further obtains at least one of the identifier of the first service network element, the third data value of the background traffic transmission time window for the first terminal device, the location information of the first terminal device, or the identifier of the first terminal device from the first terminal device.

According to the foregoing method, the first service network element may obtain an uplink background traffic transmission requirement from the first terminal device, such that the first service network element subsequently requests an uplink background traffic transfer policy for the first terminal device.

According to a fifth aspect, this application further provides a communications apparatus for determining a background traffic transfer policy. The communications apparatus has a function of implementing the first policy control network element in the foregoing method embodiments. The function may be implemented by hardware, or may be implemented by hardware executing corresponding software. The hardware or the software includes one or more modules corresponding to the foregoing function.

In a possible design, a structure of the communications apparatus includes a receiving module and a sending module, and optionally, may further include a processing module. These modules may perform corresponding functions in the foregoing method examples. For details, refer to detailed descriptions in the method examples. Details are not described herein again.

In a possible design, a structure of the communications apparatus includes a transceiver and a processor, and optionally, may further include a memory. The transceiver is configured to receive and send data, and perform communication interaction with another device in a communications system. The processor is configured to support the first policy control network element in performing a corresponding function in the foregoing methods. The memory is coupled to the processor and stores a program instruction and data that are necessary for the communications apparatus.

According to a sixth aspect, this application further provides a communications apparatus for determining a background traffic transfer policy. The communications apparatus has a function of implementing the data analytics network element in the foregoing method embodiments. The function may be implemented by hardware, or may be implemented by hardware executing corresponding software. The hardware or the software includes one or more modules corresponding to the foregoing function.

In a possible design, a structure of the communications apparatus includes a receiving module and a sending module. These modules may perform corresponding functions in the foregoing method examples. For details, refer to detailed descriptions in the method examples. Details are not described herein again.

In a possible design, a structure of the communications apparatus includes a transceiver and a processor, and optionally, may further include a memory. The transceiver is configured to receive and send data, and perform communication interaction with another device in a communications system. The processor is configured to support the data analytics network element in performing a corresponding function in the foregoing methods. The memory is coupled to the processor and stores a program instruction and data that are necessary for the communications apparatus.

According to a seventh aspect, this application further provides a communications apparatus for determining a background traffic transfer policy. The communications apparatus has a function of implementing the first terminal device in the foregoing method embodiments. The function may be implemented by hardware, or may be implemented by hardware executing corresponding software. The hardware or the software includes one or more modules corresponding to the foregoing function.

In a possible design, a structure of the communications apparatus includes a receiving module and a sending module, and optionally, may further include a processing module. These modules may perform corresponding functions in the foregoing method examples. For details, refer to detailed descriptions in the method examples. Details are not described herein again.

In a possible design, a structure of the communications apparatus includes a transceiver and a processor, and optionally, may further include a memory. The transceiver is configured to receive and send data, and perform communication interaction with another device in a communications system. The processor is configured to support the first terminal device in performing a corresponding function in the foregoing methods. The memory is coupled to the processor and stores a program instruction and data that are necessary for the communications apparatus.

According to an eighth aspect, this application further provides a communications apparatus for determining a background traffic transfer policy. The communications apparatus has a function of implementing the first service network element in the foregoing method embodiments. The function may be implemented by hardware, or may be implemented by hardware executing corresponding software. The hardware or the software includes one or more modules corresponding to the foregoing function.

In a possible design, a structure of the communications apparatus includes a receiving module and a sending module, and optionally, may further include a processing module. These modules may perform corresponding functions in the foregoing method examples. For details, refer to detailed descriptions in the method examples. Details are not described herein again.

In a possible design, a structure of the communications apparatus includes a transceiver and a processor, and optionally, may further include a memory. The transceiver is configured to receive and send data, and perform communication interaction with another device in a communications system. The processor is configured to support the first service network element in performing a corresponding function in the foregoing methods. The memory is coupled to the processor and stores a program instruction and data that are necessary for the communications apparatus.

According to a ninth aspect, this application further provides a communications system. The communications system may include the first policy control network element, the data analytics network element, and the requesting device (for example, the first terminal device and/or the first service network element) mentioned in the foregoing designs, and the like.

According to a tenth aspect, this application further provides a computer storage medium. The computer storage medium stores a computer executable instruction, and when the computer executable instruction is invoked by a computer, the computer is enabled to perform any one of the foregoing methods.

According to an eleventh aspect, this application further provides a computer program product including an instruction. When the computer program product runs on a computer, the computer is enabled to perform any one of the foregoing methods.

According to a twelfth aspect, this application further provides a chip. The chip is connected to a memory, and is configured to read and execute a program instruction stored in the memory, to implement any one of the foregoing methods.

According to a thirteenth aspect, this application provides a method for determining a background traffic transfer policy. The method includes the following.

A first policy control network element (for example, a PCF network element) obtains at least one piece of first information, and determines a background traffic transfer policy of at least one second terminal device based on second information. The first information includes an identifier of at least one first terminal device, a first time, a first location, and a first network element status. The second information includes the at least one piece of first information. The at least one first terminal device is a part or all of the at least one second terminal device. The at least one first terminal device camps on the first location at the first time, and has the first network element status.

According to the foregoing method, when formulating the background traffic transfer policy of the at least one second terminal device, the first policy control network element may consider a movement track (including the first time and the first location) of each second terminal device and the first network element status at the first location. In this way, the background traffic transfer policy of the at least one second terminal device formulated by the first policy control network element is more accurate.

In a possible design, before the first policy control network element obtains the at least one piece of first information, the first policy control network element receives fifth information from a requesting device, where the fifth information is used to request the background traffic transfer policy of the at least one second terminal device. The requesting device serves the at least one second terminal device, and the fifth information may include an identifier of the requesting device and one or more of the following: a quantity of second terminal devices, a volume of background traffic that needs to be transmitted by each second terminal device, or a time window. Optionally, the fifth information may further include a network area (a tracking area (TA) list or a routing area (RA) list in which the at least one second terminal device is located.

According to the foregoing method, the first policy control network element may be triggered to initiate a procedure of obtaining the at least one piece of first information, to obtain information required for determining the background traffic transfer policy of the second terminal device.

In a possible design, the method further includes: The first policy control network element receives an identifier of the at least one second terminal device from the requesting device, where the requesting device serves the at least one second terminal device; or the first policy control network element receives the identifier of the requesting device from the requesting device, and obtains an identifier of the at least one second terminal device by querying the first policy control network element or the database network element based on the identifier of the requesting device.

According to the foregoing method, the first policy control network element can request the at least one piece of first information based on the identifier of the at least one second terminal device.

In a possible design, a method used by the first policy control network element to obtain the at least one piece of first information may be as follows: The first policy control network element obtains the at least one piece of first information from a data analytics network element; or the first policy control network element obtains at least one piece of locally stored first information. In this way, the first policy control network element can accurately obtain the at least one piece of first information.

In a possible design, a method used by the first policy control network element to obtain the at least one piece of first information from the data analytics network element may be as follows: The first policy control network element sends sixth information to the data analytics network element, where the sixth information is used to request the at least one piece of first information, and the sixth information includes the identifier of the at least one second terminal device. The first policy control network element receives the at least one piece of first information from the data analytics network element.

According to the foregoing method, the first policy control network element may accurately obtain the at least one piece of first information from the data analytics network element, and further determine the background traffic transfer policy of the second terminal device.

In a possible design, the first policy control network element may store at least one piece of seventh information corresponding to at least one third terminal device, where the seventh information includes an identifier of at least one fourth terminal device, the first time, the first location, and the first network element status. The at least one fourth terminal device is a part or all of the at least one third terminal device, and the at least one third terminal device includes the at least one second terminal device. In this case, after receiving the fifth information of the requesting device, the first policy control network element determines the at least one piece of first information in the stored at least one piece of seventh information. For example, a method used by the first policy control network element to determine the at least one piece of first information in the stored at least one piece of seventh information may be as follows: The first policy control network element selects, from the at least one piece of seventh information, information corresponding to a fourth terminal device whose identifier is the same as the identifier of the second terminal device, to select the at least one piece of first information.

According to the foregoing method, the first policy control network element may accurately obtain the at least one piece of first information from the data analytics network element, and further determine the background traffic transfer policy of the at least one second terminal device.

In a possible design, the at least one piece of seventh information locally stored by the first policy control network element may be obtained by the first policy control network element from the data analytics network element.

In a possible design, the first network element status includes one or more of the following: a first load, a first capacity, and a first available bandwidth. The first load is a load of a first network element corresponding to the first location, and the first network element serves the first terminal device. The first capacity is a capacity of the first network element corresponding to the first location. The first available bandwidth is a bandwidth for the first network element corresponding to the first location. The first terminal device camps on the first location at the first time.

In a possible design, the first network element may be a user plane network element (for example, a RAN or a user plane function (UPF)), a control plane network element (for example, an access and mobility management function (AMF) or a session management function (SMF)), or the like that serves the first terminal device. Optionally, if the first terminal device is a massive internet of things (mIoT) terminal, the AMF network element or the SMF network element may also be used as a user plane network element to transmit background traffic.

In a possible design, after the first policy control network element determines the background traffic transfer policy of the at least one second terminal device based on the second information, the first policy control network element sends the background traffic transfer policy of the at least one second terminal device to the requesting device. In this way, the requesting device can send the background traffic transfer policy of the second terminal device to the corresponding second terminal device.

In a possible design, when the second terminal device has one background traffic transfer policy, the first policy control network element determines that the background traffic transfer policy of the second terminal device is a target background traffic transfer policy of the second terminal device. The first policy control network element sends the target background traffic transfer policy of the second terminal device to the data analytics network element.

According to the foregoing method, the data analytics network element can store the target background traffic transfer policy of the second terminal device. In this way, if the requesting device requests background traffic policies of other new terminal devices next time, when determining a movement track (including a time and a location) and a network element status of a corresponding network element on the movement track for each of the new terminal devices, the data analytics network element may refer to the stored target background traffic transfer policy of the second terminal device, such that a network element status is more accurate.

In a possible design, when the second terminal device has a plurality of background traffic transfer policies, the first policy control network element receives a target background traffic transfer policy of the second terminal device from the requesting device, where the target background traffic transfer policy of the second terminal device is selected by the requesting device according to the background traffic transfer policies of the second terminal device. The first policy control network element sends the target background traffic transfer policy of the second terminal device to the data analytics network element.

According to the foregoing method, the data analytics network element can store the target background traffic transfer policy of the second terminal device. In this way, if the requesting device requests background traffic policies of other new terminal devices next time, when determining a movement track (including a time and a location) and a network element status of a corresponding network element on the movement track for each of the new terminal devices, the data analytics network element may refer to the stored target background traffic transfer policy of the second terminal device, such that a network element status is more accurate.

In a possible design, the background traffic transfer policy of the second terminal device includes a first data value of a background traffic transmission time window. The background traffic transfer policy of the second terminal device further includes one or more of the following: a first data value of a background traffic transmission bandwidth, location information of the second terminal device, and an identifier of the second terminal device.

According to a fourteenth aspect, this application provides a method for determining a background traffic transfer policy. The method includes the following.

A data analytics network element determines at least one piece of first information, and then sends the at least one piece of first information to a first policy control network element. The first information includes an identifier of at least one first terminal device, a first time, a first location, and a first network element status. The at least one first terminal device is a part or all of at least one second terminal device. The at least one first terminal device camps on the first location at the first time, and has the first network element status.

According to the foregoing method, when formulating a background traffic transfer policy of the at least one second terminal device, the first policy control network element may consider a movement track (including the first time and the first location) of each second terminal device and the first network element status at the first location. In this way, the background traffic transfer policy of the at least one second terminal device formulated by the first policy control network element is more accurate.

In a possible design, a method used by the data analytics network element to determine the at least one piece of first information may be as follows: The data analytics network element obtains at least one piece of third information of the at least one second terminal device on a third network element; and the data analytics network element determines the at least one piece of first information based on the at least one piece of third information of the at least one second terminal device. The third information includes an identifier of the second terminal device, a second time, a second location, and a second network element status. In the second time, the second terminal device camps on the second location, and has the second network element status.

According to the foregoing method, the data analytics network element can accurately obtain the at least one piece of first information through analysis, and then send the at least one piece of first information to the first policy control network element, such that the first policy control network element formulates the background traffic transfer policy of the second terminal device based on the at least one piece of first information.

In a possible design, the third network element may be one or more of an access device, a functional network element in $5^{th}$ generation (5G), and an operation, administration, and maintenance (OAM).

In a possible design, when the third network element is one or more of the access network device or the functional network element in 5G, the data analytics network element may obtain the at least one piece of third information of the at least one second terminal device on the third network element from the OAM network element.

In a possible design, the second network element status includes one or more of the following: a second load, a second capacity, and a second available bandwidth. The second load is a load of a second network element corresponding to the second location, and the second network element serves the second terminal device. The second capacity is a capacity of the second network element corresponding to the second location. The second bandwidth is a bandwidth for the second network element corresponding to the second location. The second terminal device camps on the second location in the second time.

In a possible design, the first network element status includes one or more of the following: a first load, a first capacity, and a first available bandwidth. The first load is a load of a first network element corresponding to the first location, and the first network element serves the first terminal device. The first capacity is a capacity of the first network element corresponding to the first location. The first available bandwidth is a bandwidth for the first network element corresponding to the first location. The first terminal device camps on the first location at the first time.

In a possible design, the first network element may be a user plane network element (for example, an RAN or a UPF), a control plane network element (for example, an AMF or an SMF), or the like that serves the first terminal device. Optionally, if the first terminal device is an mIoT terminal, the AMF network element or the SMF network element may also be used as a user plane network element to transmit background traffic.

In a possible design, the first network element may be the third network element or may be any one of third network elements.

According to a fifteenth aspect, this application further provides a communications apparatus for determining a background traffic transfer policy. The communications apparatus has a function of implementing the first policy control network element in the foregoing method embodiment in the thirteenth aspect. The function may be implemented by hardware, or may be implemented by hardware executing corresponding software. The hardware or the software includes one or more modules corresponding to the foregoing function.

In a possible design, a structure of the communications apparatus includes an obtaining module and a processing module, and optionally, may further include a sending module. These modules may perform corresponding functions in the foregoing method example in the thirteenth aspect. For details, refer to detailed descriptions in the method example. Details are not described herein again.

In a possible design, a structure of the communications apparatus includes a transceiver and a processor, and optionally, may further include a memory. The transceiver is configured to receive and send data, and perform communication interaction with another device in a communications system. The processor is configured to support the first policy control network element in performing a corresponding function in the foregoing method in the thirteenth aspect. The memory is coupled to the processor and stores a program instruction and data that are necessary for the communications apparatus.

According to a sixteenth aspect, this application further provides a communications apparatus for determining a background traffic transfer policy. The communications apparatus has a function of implementing the data analytics network element in the foregoing method embodiment in the fourteenth aspect. The function may be implemented by hardware, or may be implemented by hardware executing corresponding software. The hardware or the software includes one or more modules corresponding to the foregoing function.

In a possible design, a structure of the communications apparatus includes a processing module and a sending module. These modules may perform corresponding functions in the foregoing method example in the fourteenth aspect. For details, refer to detailed descriptions in the method example. Details are not described herein again.

In a possible design, a structure of the communications apparatus includes a transceiver and a processor, and optionally, may further include a memory. The transceiver is configured to receive and send data, and perform communication interaction with another device in a communications system. The processor is configured to support the data analytics network element in performing a corresponding function in the foregoing method in the fourteenth aspect. The memory is coupled to the processor and stores a program instruction and data that are necessary for the communications apparatus.

According to a seventeenth aspect, this application further provides a computer storage medium. The computer storage medium stores a computer executable instruction, and when the computer executable instruction is invoked by a computer, the computer is enabled to perform any one of the foregoing methods in the thirteenth aspect and the fourteenth aspect.

According to an eighteenth aspect, this application further provides a computer program product including an instruction. When the computer program product runs on a computer, the computer is enabled to perform any one of the foregoing methods in the thirteenth aspect and the fourteenth aspect.

According to a nineteenth aspect, this application further provides a chip. The chip is connected to a memory, and is configured to read and execute a program instruction stored in the memory, to implement any one of the foregoing methods in the thirteenth aspect and the fourteenth aspect.

According to a twentieth aspect, this application further provides a method for determining network performance information, including the following.

A first network element sends first information to a data analytics network element, where the first information is used to request network performance information, and the first information includes one or more of the following: area information of a first area, an identifier of a requesting device, or a terminal device group identifier. Then, the first network element receives the network performance information from the data analytics network element, where the network performance information includes area information of a second area and second information, and the second information includes one or more of the following: load information of a network in the second area, service experience information for a service in the second area, or a number of terminal devices in the second area, where the second area is a subarea of the first area. Finally, the first network element determines a first policy based on the network performance information.

According to the foregoing method, after obtaining the network performance information from the data analytics network element, the first network element may formulate a policy based on area information of a subarea obtained through division, such that the formulated policy is more accurate.

In a possible design, the first policy includes a background traffic transfer policy, and the background traffic transfer policy is a background traffic transfer policy of at least one terminal device. In this way, the background traffic transfer policy can be accurately formulated for the at least one terminal device.

In a possible design, the first network element receives third information from the requesting device, where the third information is used to request the background traffic transfer policy, and the third information includes one or more of the following: the area information of the first area, the terminal device group identifier, or the identifier of the requesting device. The first network element sends the background traffic transfer policy to the requesting device.

According to the foregoing method, the requesting device may obtain an accurate background traffic transfer policy from the first network element.

In a possible design, the background traffic transfer policy includes the area information of the second area. In this way, the background traffic transfer policy is more accurate.

In a possible design, the first network element sends the area information of the second area to the requesting device. In this way, the background traffic transfer policy requested by the requesting device can be more accurate.

In a possible design, the background traffic transfer policy further includes one or more of the following information: a recommended time window, a rate, or a maximum aggregated bitrate.

In a possible design, the first network element is a policy control function network element.

According to a twenty-first aspect, this application provides a method for determining network performance information, including the following.

A data analytics network element receives first information from a first network element, where the first information is used to request network performance information, and the first information includes one or more of the following: area information of a first area, an identifier of a requesting device, or a terminal device group identifier. Then, the data analytics network element determines the network performance information based on the first information, where the network performance information includes area information of a second area and second information, and the second information includes one or more of the following: load information of a network in the second area, service experience information for a service in the second area, or a number of terminal devices in the second area, where the second area is a subarea of the first area. Finally, the data analytics network element sends the network performance information to the first network element.

According to the foregoing method, after obtaining the network performance information from the data analytics network element, the first network element may formulate a policy based on area information of a subarea obtained through division, such that the formulated policy is more accurate.

In a possible design, when the first information includes the area information of the first area, that the data analytics network element determines the network performance information based on the first information includes: the data analytics network element obtains the area information of the second area based on the area information of the first area; and the data analytics network element determines one or more of the following: the load information of the network in the second area, the service experience information for the service in the second area, or the number of terminal devices in the second area.

According to the foregoing method, the data analytics network element can accurately determine the network performance information, such that the first network element accurately formulates the policy.

In a possible design, when the first information includes the terminal device group identifier and/or the identifier of the requesting device, that the data analytics network element determines the network performance information based on the first information includes: the data analytics network element determines the area information of the second area based on the terminal device group identifier and/or the identifier of the requesting device; and the data analytics network element determines one or more of the following: the load information of the network in the second area, the service experience information for the service in the second area, or the number of terminal devices in the second area.

According to the foregoing method, the data analytics network element can accurately determine the network performance information, such that the first network element accurately formulates the policy.

In a possible design, that the data analytics network element determines the area information of the second area based on the terminal device group identifier and/or the identifier of the requesting device includes: the data analytics network element determines the area information of the first area based on the terminal device group identifier and/or the identifier of the requesting device; and the data analytics network element obtains the area information of the second area based on the area information of the first area.

According to the foregoing method, the data analytics network element may accurately determine the area information of the second area, such that the data analytics network element accurately determines the network performance information.

In a possible design, that the data analytics network element obtains the area information of the second area based on the area information of the first area includes: the data analytics network element obtains locally stored area information of the second area based on the area information of the first area; or the data analytics network element obtains the area information of the second area from an operation, management, and maintenance network element or an access and mobility management function network element based on the area information of the first area.

According to the foregoing method, the data analytics network element may accurately determine the area information of the second area, such that the data analytics network element accurately determines the network performance information.

In a possible design, that the data analytics network element determines load information of a network in the second area includes: the data analytics network element obtains the load information of the network in the second area from a network management network element or the operation, management, and maintenance network element.

According to the foregoing method, the data analytics network element may accurately determine the load information of the network in the second area, such that the data analytics network element accurately determines the network performance information.

In a possible design, the first network element is a policy control function network element.

According to a twenty-second aspect, this application provides a method for determining a background traffic transfer policy, including the following.

A requesting device sends third information to a first network element, where the third information is used to request a background traffic transfer policy, and the third information includes one or more of the following: area information of a first area, an identifier of the requesting device, or a terminal device group identifier. Then, the requesting device receives the background traffic transfer policy from the first network element, where the background traffic transfer policy includes area information of a second area, and the second area is a subarea of the first area.

According to the foregoing method, the requesting device can accurately obtain the background traffic transmission policy.

In a possible design, the background traffic transfer policy is a background traffic transfer policy of at least one terminal device.

In a possible design, the requesting device serves the at least one terminal device.

In a possible design, the background traffic transfer policy includes one or more of the following information: a recommended time window, a rate, or a maximum aggregated bitrate.

In a possible design, the first network element is a policy control function network element.

According to a twenty-third aspect, this application further provides a communications apparatus for determining network performance information. The communications apparatus has a function of implementing the first network element in the method embodiment in the twentieth aspect. The function may be implemented by hardware, or may be implemented by hardware executing corresponding software. The hardware or the software includes one or more modules corresponding to the foregoing function.

In a possible design, a structure of the communications apparatus includes a sending module, a receiving module, and a processing module. These modules may perform corresponding functions in the foregoing method example in the twentieth aspect. For details, refer to detailed descriptions in the method example. Details are not described herein again.

In a possible design, a structure of the communications apparatus includes a transceiver and a processor, and optionally, may further include a memory. The transceiver is configured to receive and send data, and perform communication interaction with another device in a communications system. The processor is configured to support the first network element in performing a corresponding function in the foregoing method in the twentieth aspect. The memory is coupled to the processor and stores a program instruction and data that are necessary for the communications apparatus.

According to a twenty-fourth aspect, this application further provides a communications apparatus for determining network performance information. The communications apparatus has a function of implementing the data analytics network element in the method embodiment in the twenty-first aspect. The function may be implemented by hardware, or may be implemented by hardware executing corresponding software. The hardware or the software includes one or more modules corresponding to the foregoing function.

In a possible design, a structure of the communications apparatus includes a sending module, a receiving module, and a processing module. These modules may perform corresponding functions in the foregoing method example in the twenty-first aspect. For details, refer to detailed descriptions in the method example. Details are not described herein again.

In a possible design, a structure of the communications apparatus includes a transceiver and a processor, and optionally, may further include a memory. The transceiver is configured to receive and send data, and perform communication interaction with another device in a communications system. The processor is configured to support the data analytics network element in performing a corresponding function in the foregoing method in the twenty-first aspect. The memory is coupled to the processor and stores a program instruction and data that are necessary for the communications apparatus.

According to a twenty-fifth aspect, this application further provides a communications apparatus for determining a background traffic transfer policy. The communications apparatus has a function of implementing the requesting device in the method embodiment in the twenty-second aspect. The function may be implemented by hardware, or may be implemented by hardware executing corresponding software. The hardware or the software includes one or more modules corresponding to the foregoing function.

In a possible design, a structure of the communications apparatus includes a receiving module and a sending module. These modules may perform corresponding functions in the foregoing method example in the twenty-second aspect. For details, refer to detailed descriptions in the method example. Details are not described herein again.

In a possible design, a structure of the communications apparatus includes a transceiver and a processor, and optionally, may further include a memory. The transceiver is configured to receive and send data, and perform communication interaction with another device in a communications system. The processor is configured to support the requesting device in performing a corresponding function in the foregoing method in the twenty-second aspect. The memory is coupled to the processor and stores a program instruction and data that are necessary for the communications apparatus.

According to a twenty-sixth aspect, this application further provides a computer storage medium. The computer storage medium stores a computer executable instruction, and when the computer executable instruction is invoked by a computer, the computer is enabled to perform any one of the foregoing methods in the twentieth aspect to the twenty-second aspect.

According to a twenty-seventh aspect, this application further provides a computer program product including an instruction. When the computer program product runs on a computer, the computer is enabled to perform any one of the foregoing methods in the twentieth aspect to the twenty-second aspect.

According to a twenty-eighth aspect, this application further provides a chip. The chip is connected to a memory, and is configured to read and execute a program instruction stored in the memory, to implement any one of the foregoing methods in the twentieth aspect to the twenty-second aspect.

DESCRIPTION OF EMBODIMENTS

Figure 1:
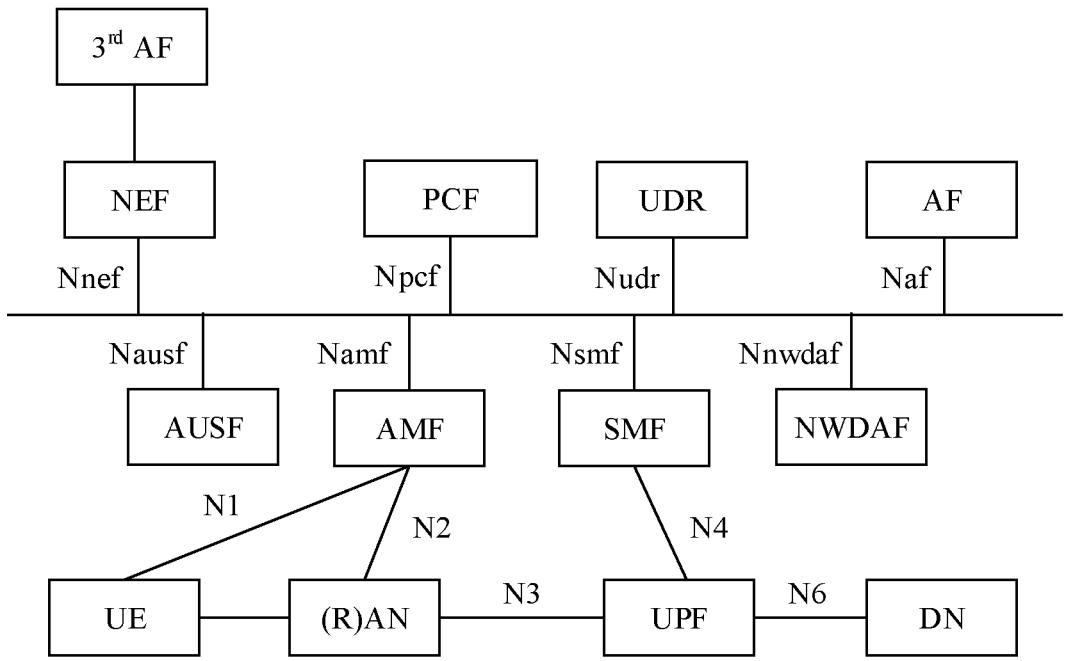
FIG. 1 is a schematic architecture diagram of a communications system according to this application.

The following further describes in detail this application with reference to the accompanying drawings.

Embodiments of this application provide a method for determining a background traffic transfer policy and an apparatus, to resolve a problem in other approaches of a background traffic transmission failure caused by a conflict between background traffic transfer policies formulated by different policy control network elements for different service network elements. The method and the apparatus in this application are based on a same concept. The method and the apparatus have similar problem resolving principles. Therefore, for implementation of the apparatus and the method, mutual reference may be made. Details of repeated parts are not described again.

The following explains some terms in this application to facilitate understanding by a person skilled in the art.

(1) Background traffic is usually defined as non-real-time interactive traffic, and may be classified into uplink background traffic and downlink background traffic. For example, the downlink background traffic may be transmitted traffic such as a buffered video, a downloaded file, a software update package, and a software notification message. The uplink background traffic may be transmitted traffic such as information, stored by a vehicle, about a driving map.

(2) A data analytics network element is a network element device that can perform big data analytics, and may be, but is not limited to, a network data analytics function network element. For example, the network data analytics function network element may be an network data analytic function (NWDAF). In the embodiments of this application, the data analytics network element can analyze target background traffic transfer policies of all terminal devices, to determine a background traffic transmission data analysis result of a terminal device that requires a background traffic transfer policy, to obtain the background traffic transfer policy of the terminal device.

(3) A service network element may be an application network element. For example, the application network element may be, but is not limited to, an application function (AF) network element of an operator, a terminal device, a third-party device such as an AF network element (which may also be referred to as a third-party AF network element) of a non-operator. The AF network element of the operator may be, but is not limited to, a service management and control server of the operator. The third-party AF network element may be, but is not limited to, a third-party service server.

(4) In the descriptions of this application, terms such as "first" and "second" are merely used for distinction and description, and shall not be understood as an indication or implication of relative importance or an indication or implication of an order.

(5) The term "and/or" describes an association relationship between associated objects and indicates that three relationships may exist. For example, A and/or B may represent the following three cases: Only A exists, both A and B exist, and only B exists. The character "/" generally indicates an "or" relationship between the associated objects.

To more clearly describe the technical solutions in the embodiments of this application, the following describes in detail, with reference to the accompanying drawings, the method for determining a background traffic transfer policy and the apparatus that are provided in the embodiments of this application.

A possible architecture of a communications system to which the method for determining a background traffic transfer policy provided in the embodiments of this application are applicable may include: a network exposure function network element, a policy control function network element, a database network element, a service network element, an authentication server function network element, an access and mobility management function network element, a session management function network element, a data analytics network element, a terminal device, an access network device, a user plane function network element, and a data network. For example, FIG. 1 shows a possible example of an architecture of the communications system. The architecture of the communications system includes a network exposure function (NEF) network element, a policy control function (PCF) network element, a unified data repository (UDR) network element, a third-party AF network element, an AF network element, an authentication server function (AUSF) network element, an access and mobility management function (AMF) network element, a session management function network element (SMF) network element, a network data analytic function (NWDAF) network element, a user equipment (UE), a radio access network (RAN) device, a user plane function (UPF) network element, and a data network (DN). The AMF network element may be connected to the UE through an N1 interface, the AMF may be connected to the AN device through an N2 interface, the AN device may be connected to the UPF through an N3 interface, the SMF may be connected to the UPF through an N4 interface, and the UPF may be connected to the DN through an N6 interface. An interface name is merely an example for description, and is not specifically limited in the embodiments of this application. It should be understood that the embodiments of this application are not limited to the communications system shown in FIG. 1. Names of the network elements shown in FIG. 1 are merely used as examples for description herein, and are not used for limiting the network elements included in the architecture of the communications system to which the method in this application is applicable. Functions of the network elements or devices in the communications system are described in detail below.

The terminal device may also be referred to as a user equipment (UE), a mobile station (MS), a mobile terminal (MT), or the like, and is a device that provides voice and/or data connectivity for a user. For example, the terminal device may include a handheld device or a vehicle-mounted device that has a wireless connection function. Currently, the terminal device may be a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, or the like. In FIG. 1, the terminal device is merely shown using UE as an example, and is not limited thereto.

The radio access network (RAN) shown in FIG. 1 provides a wireless access service for the terminal device. The access network device is a device, in the communications system, that enables the terminal device to access a wireless network. The access network device is a node in the radio access network, and may also be referred to as a base station, or may also be referred to as a radio access network (RAN) node (or device). Currently, for example, the access network device is a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB (HNB)), a baseband unit BBU), or a wireless fidelity (Wi-Fi) access point (AP).

The data network shown in FIG. 1, may be the Internet, an IP multimedia service (IMS) network, a regional network (namely, a local network, for example, a mobile edge computing (MEC) network), or the like. The data network includes an application server, and the application server provides a service for the terminal device by transmitting data to the terminal device.

A core network is used to enable the terminal device to access a DN that can implement a service of the terminal device. The following describes functions of network elements in the core network.

The access and mobility management function network element may be configured to manage access control and mobility of the terminal device. In an actual application, the access and mobility management function network element includes a mobility management function of a mobility management entity (MME) in a network framework in Long-Term Evolution (LTE), and further includes an access management function. For example, the access and mobility management function network element may be responsible for registration of the terminal device, mobility management, a tracking area update procedure, reachability detection, selection of a session management function network element, mobility state transition management, and the like. For example, in 5G, the access and mobility management function network element may be an AMF network element, as shown in FIG. 1. In future communication, for example, in 6G, the access and mobility management function network element may still be an AMF network element or may have another name. This is not limited in this application.

When the access and mobility management function network element is an AMF network element, the AMF may provide an Namf service.

The session management function network element may be responsible for session management (including session establishment, modification, and release) of the terminal device, selection and reselection of a user plane function network element, Internet Protocol (IP) address assignment of the terminal device, quality of service (QoS) control, and the like. For example, in 5G, the session management function network element may be an SMF, for example, as shown in FIG. 1. In future communication, for example, in 6G, the session management function network element may still be an SMF network element or may have another name. This is not limited in this application. When the session management function network element is an SMF network element, the SMF may provide an Nsmf service.

The data analytics network element may be configured to perform big data analytics (for example, in the embodiments of this application, a background traffic transmission data analysis result of the terminal device may be obtained through analysis). For example, in 5G, the data analytics network element may be an NWDAF network element, for example, as shown in FIG. 1. In future communication, for example, in 6G, the data analytics network element may still be an NWDAF network element or may have another name. This is not limited in this application. When the data analytics network element is an NWDAF network element, the NWDAF network element may provide an Nnwdaf service.

The policy control function network element may be responsible for making a policy control decision (for example, may be responsible for making a decision on a background traffic transfer policy in the embodiments of this application), providing a detection rule, a gate control threshold, and a QoS parameter that are based on a service data flow and an application, providing a function of flow-based charging control, and the like. For example, in 5G, the policy control function network element may be a PCF network element, for example, as shown in FIG. 1. In future communication, for example, in 6G, the policy control function network element may still be a PCF network element or may have another name. This is not limited in this application. When the policy control function network element is a PCF network element, the PCF network element may provide an Npcf service.

A main function of the service network element is to interact with a 3rd Generation Partnership Project (3GPP) core network to provide a service, to affect service flow routing, access network capability exposure, policy control, and the like. For example, in 5G, the service network element may be an AF network element, or may be a third-party AF ($3^{rd}$ AF) network element. The AF network element may directly interact with an operator network element (for example, an AMF network element, an SMF network element, or a PCF network element). The $3^{rd}$ AF network element needs to interact with the operator network element via the network exposure function network element (for example, an NEF network element), as shown in FIG. 1. In future communication, for example, in 6G, the service network element may still be an AF network element, a $3^{rd}$ AF network element, or may have another name. This is not limited in this application. When the service network element is an AF network element, the AF network element may provide an Naf service.

The authentication server function network element may be configured to provide an authentication service. For example, in 5G, the authentication server function network element may be an AUSF network element, for example, as shown in FIG. 1. In future communication, for example, in 6G, the authentication server function network element may still be an AUSF network element or may have another name. This is not limited in this application. When the authentication server function network element is an AUSF network element, the AUSF network element may provide an Nausf service.

The database network element may be configured to store data and the like. For example, in 5G, the database network element may be a UDR network element, for example, as shown in FIG. 1. In future communication, for example, in 6G, the database network element may still be a UDR network element or may have another name. This is not limited in this application. When the database network element is a UDR network element, the UDR network element may provide an Nudr service.

The network exposure function network element may be configured to enable the 3GPP to securely provide a network service capability and the like for a third-party AF (for example, a service capability server (SCS) or an application server (AS)). For example, in 5G, the network exposure function network element may be an NEF network element, for example, as shown in FIG. 1. In future communication, for example, in 6G, the network exposure function network element may still be an NEF network element or may have another name. This is not limited in this application. When the network exposure function network element is an NEF, the NEF may provide an Nnef service for another network function network element.

The user plane function network element may be configured to forward user plane data of the terminal device. Main functions include data packet routing and forwarding, mobility anchoring, supporting, using an uplink classifier, routing of a service flow to the data network, supporting a multi-homed packet data unit (PDU) session using a branch point, and the like. For example, in 5G, the user plane function network element may be a UPF network element, for example, as shown in FIG. 1. In future communication, for example, in 6G, the user plane function network element may still be a UPF network element or may have another name. This is not limited in this application.

Each of the foregoing network elements in the core network may also be referred to as a function entity or a device, and may be a network element implemented on dedicated hardware, or may be a software instance run on dedicated hardware, or an instance of a virtualization function on a proper platform. For example, the foregoing virtualization platform may be a cloud platform.

It should be noted that the architecture of the communications system shown in FIG. 1 includes, but is not limited, the network elements shown in the figure, and may further include another device not shown in the figure. Details are not described herein in this application one by one.

It should be noted that a distribution form of the network elements in the core network is not limited in the embodiments of this application. The distribution form shown in FIG. 1 is merely an example, and is not limited in this application.

For ease of description, the network elements shown in FIG. 1 are used as examples for description subsequently in this application, and an XX network element is directly referred to as XX. It should be understood that names of all network elements in this application are merely used as examples, and the network elements may also have other names in future communication, or the network element in this application may be replaced with another entity or device that has a same function in future communication. This is not limited in this application. A unified description is provided herein, and details are not described later.

It should be noted that the communications system shown in FIG. 1 does not constitute a limitation on a communications system to which the embodiments of this application are applicable. The architecture of the communications system shown in FIG. 1 is a 5G system architecture. Optionally, the method in the embodiments of this application is further applicable to various future communications systems, for example, a 6G communications network or another communications network.

Figure 2:
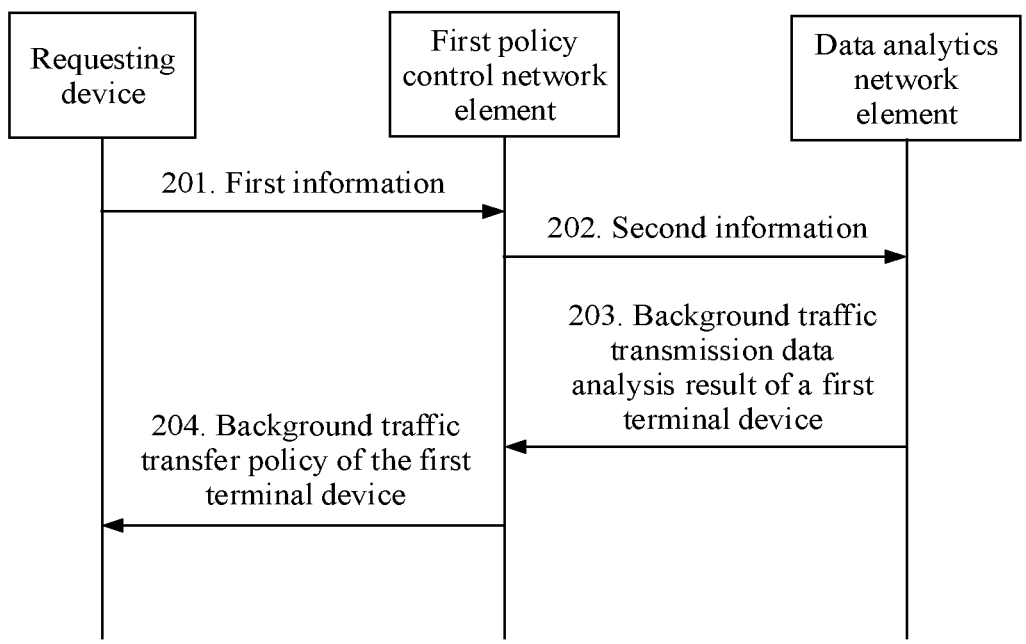
FIG. 2 is a flowchart of a method for determining a background traffic transfer policy according to this application.

A method for determining a background traffic transfer policy provided by an embodiment of this application is applicable to the communications system shown in FIG. 1. Referring to FIG. 2, a procedure of the method may include the following steps.

Step 201. A first policy control network element receives first information from a requesting device, where the first information is used to request a background traffic transfer policy of a first terminal device.

In a possible example, the first information may include a volume of background traffic of the first terminal device. The first information may further include at least one of an identifier of the requesting device, a third data value of a background traffic transmission time window for the first terminal device, location information of the first terminal device, or an identifier of the first terminal device. The third data value of the background traffic transmission time window for the first terminal device may be an expected value of the background traffic transmission time window for the first terminal device. The expected value may be understood as a value that is used for the background traffic transmission time window by the first terminal device and that the requesting device expects to obtain. Certainly, there may be another understanding. This is not limited in this application. It should be noted that each third data value, subsequently mentioned in this application, of the background traffic transmission time window for the first terminal device may correspond to the expected value of the background traffic transmission time window for the first terminal device. Details are not described below. The location information of the first terminal device may be at least one or more of the following: a network area in which the first terminal device is located, a cell identifier (Cell identification (ID)), an identifier (RAN ID) of a radio access network in which the first terminal device is located, or a global positioning system (GPS) value. It should be noted that each piece of location information, subsequently mentioned in this application, of the first terminal device may be at least one or more of a network area in which the first terminal device is located, a cell ID, an ID of a RAN in which the first terminal device is located, or a GPS value. Details are not described below. The identifier of the first terminal device may be at least one or more of the following: a subscription permanent identifier (SUFI), a permanent equipment identifier (PEI), a generic public subscription identifier (GPSI), an IP address 5-tuple, international mobile subscriber identity (IMSI), international mobile equipment identity (IMEI), and mobile station international integrated services digital network number (MSISDN) It should be noted that each identifier, subsequently mentioned in this application, of the first terminal device may be at least one or more of an SUPI, a PEI, a GPSI, an IP 5-tuple, an IMSI, an IMEI, or an MSISDN. Details are not described below. The background traffic transfer policy of the first terminal device that satisfies the foregoing requirements may be requested using the information included in the first information.

In an optional implementation, the requesting device may be the first terminal device. When the requesting device is the first terminal device, there may be the following two scenarios.

Scenario a1: When determining to transmit uplink background traffic to a first service network element serving the first terminal device, the first terminal device may initiate a packet data unit session (PDU session) modification procedure to request the background traffic transfer policy of the first terminal device.

For example, in the scenario a1, a process in which the first terminal device sends the first information to the first policy control network element may be as follows: The first terminal device sends the first information to an access and mobility management function network element. Optionally, the first terminal device may send the first information to the access and mobility management function network element using an N1 message. For example, the N1 message may be a PDU session modification request. Then, the access and mobility management function network element forwards the first information to a session management function network element. Optionally, the access and mobility management function network element may send the first information to the session management function network element by invoking an Nsmf_PDUSession_UpdateSMContext service. Finally, the session management function network element forwards the first information to the first policy control network element. Optionally, the session management function network element may send the first information to the first policy control network element by invoking an Npcf_SMPolicyControl_Update service. In this way, the first terminal device may send the first information to the first policy control network element using the foregoing method.

Scenario a2: When the first terminal device needs to transmit downlink background traffic, the terminal device may first obtain, from a first service network element serving the first terminal device, information required for requesting the background traffic transfer policy. For example, the first terminal device obtains the volume of the background traffic of the first terminal device from the first service network element. The first terminal device further obtains at least one of an identifier of the first service network element, the third data value of the background traffic transmission time window for the first terminal device, the location information of the first terminal device, or the identifier of the first terminal device from the first service network element. Then, the first terminal device may include the obtained information in the first information, and send the first information to the first policy control network element, to request the background traffic transfer policy of the first terminal device.

In another optional implementation, the requesting device may be a first service network element serving the first terminal device. When the requesting device is the first service network element, there may be the following two scenarios.

Scenario b1: When determining to transmit downlink background traffic to the first terminal device, the first service network element initiates a PDU session modification procedure to request the background traffic transfer policy of the first terminal device.

In the scenario b1, that the first service network element sends the first information to the first policy control network element may be as follows: The first service network element sends the first information to the first policy control network element by invoking an Npcf_PolicyAuthorization_Create/Update service. Optionally, the first service network element may send the first information to the first policy control network element via a network exposure function network element. The foregoing process may be as follows: The first service network element sends the first information to the network exposure function network element. Optionally, the first service network element may send the first information to the network exposure function network element by invoking an Nnef_BDTPNegotiation_Create request service. Then, the network exposure function network element forwards the first information to the first policy control network element. Optionally, the network exposure function network element may send the first information to the first policy control network element by invoking an Npcf_BDTPolicyControl_Create request service.

Scenario b2: When the first terminal device needs to transmit uplink background traffic, the first service network element obtains, from the first terminal device, information required for requesting the background traffic transfer policy of the first terminal device. For example, the first service network element obtains the volume of the background traffic of the first terminal device from the first terminal device. The first service network element further obtains at least one of the third data value of the background traffic transmission time window for, the location information of, or the identifier of the first terminal device from the first terminal device. Then, the first service network element may include the obtained information in the first information, and send the first information to the first policy control network element, to request the background traffic transfer policy of the first terminal device.

In the foregoing scenario a1 and scenario b2, both a request for an uplink background traffic transfer policy and a request for a downlink background traffic transfer policy can be implemented.

In an optional implementation, when the requesting device is the first service network element, the first service network element may simultaneously request background traffic transfer policies of a plurality of terminal devices using the first information, where the first terminal device may be any one of the plurality of terminal devices. The first information may include a volume of background traffic of each of the plurality of terminal devices. The first information further includes at least one of a third data value of a background traffic transmission time window for, location information of, or an identifier of each terminal device.

Step 202. The first policy control network element sends second information to a data analytics network element based on the first information, where the second information is used to request a background traffic transmission data analysis result of the first terminal device.

In an implementation, after the first policy control network element receives the first information, the first policy control network element sends the second information to the data analytics network element based on content requested using the first information, such that the data analytics network element performs step 203.

In an optional implementation, the second information may include the volume of the background traffic of the first terminal device. The second information may further include at least one of the third data value of the background traffic transmission time window for, the location information of, or the identifier of the first terminal device. In this way, the data analytics network element may return a background traffic transmission data analysis result that conforms to content included in the second information. For example, the content included in the second information may be determined based on the content included in the first information. For example, the first policy control network element may process the second information into information that is the same as the first information, that is, the content included in the second information is the same as the content included in the first information. For another example, the first policy control network element may process the second information into information different from the first information. In this case, other information may be added to the content included in the first information to obtain the content included in the second information, or some information is selected from the content included in the first information as the content of the second information. This is not limited in this application.

In an optional implementation, the first policy control network element may send the second information to the data analytics network element by invoking an Nnwdaf_AnalyticsInfo_Request service.

In an optional implementation, the first policy control network element may simultaneously request background traffic transmission data analysis results of a plurality of terminal devices using the second information, where the first terminal device is any one of the plurality of terminal devices. In this case, the second information may include a volume of background traffic of each of the plurality of terminal devices. The second information may further include at least one of an identifier of the first policy function network element, the identifier of the requesting device, a third data value of a background traffic transmission time window for each terminal device, location information of each terminal device, or an identifier of each terminal device.

In an example implementation, when the first policy control network element simultaneously requests background traffic transmission data analysis results of a plurality of terminal devices using the second information, there may be the following two scenarios.

Scenario c1: The first policy control network element may collect a plurality of requests for background traffic transfer policies of a plurality of terminal devices that are within preset duration, and then simultaneously request background traffic transmission data analysis results of the plurality of terminal devices using the second information. Optionally, the background traffic transfer policies of the plurality of terminal devices may be respectively requested by a plurality of different terminal devices by sending the first information, may be simultaneously requested by one service network element using one piece of first information, may be requested by at least one terminal device using first information and by one service network element for the at least one terminal device using one piece of first information, or may be requested by a plurality of service network elements for at least one terminal device using respective first information. Certainly, in addition to the foregoing listed several cases of requesting the background traffic transfer policy of the plurality of terminal devices, there may be another case. This is not limited in this application.

Scenario c2: The first policy control network element may collect a preset quantity of requests for background traffic transfer policies of a preset quantity of terminal devices, and then simultaneously request background traffic transmission data analysis results of a plurality of terminal devices using the second information. Optionally, for a case of requesting background traffic transfer policies of the plurality (that is, the preset quantity) of terminal devices in this scenario, refer to related descriptions in the scenario c1. Details are not described herein again.

In an optional implementation, when the first information is from the first service network element serving the first terminal device, the second information may further include the identifier of the first service network element. Optionally, the identifier of the first service network element may be an application service provider (ASP) identifier. Optionally, the ASP identifier may be stored in the first policy control network element, or may be from the first service network element.

Step 203. The data analytics network element sends the background traffic transmission data analysis result of the first terminal device to the first policy control network element, where the background traffic transmission data analysis result of the first terminal device is determined by the data analytics network element according to a target background traffic transfer policy of a second terminal device, the second terminal device is different from the first terminal device, and the target background traffic transfer policy of the second terminal device is used by the second terminal device to transmit background traffic.

For example, after step 202, to be more specific, after the data analytics network element receives the second information, the data analytics network element determines the background traffic transmission data analysis result of the first terminal device based on the second information and the target background traffic transfer policy of the second terminal device.

In an optional implementation, the background traffic transmission data analysis result of the first terminal device may be alternatively determined by the data analytics network element based on the target background traffic transfer policy of the second terminal device, the second information, and load information of a functional network element and/or capacity information of the functional network element. In this way, the background traffic transmission data analysis result of the first terminal device obtained through analysis by the data analytics network element may be more reliable.

In an optional implementation, the data analytics network element may determine one or more background traffic transmission data analysis results of the first terminal device. Optionally, the background traffic transmission data analysis result may include a first data value of the background traffic transmission time window. The background traffic transmission data analysis result may further include at least one of a first data value of a background traffic transmission bandwidth, the location information of the first terminal device, or the identifier of the first terminal device. The first data value of the background traffic transmission time window for the first terminal device may be a data analysis value of the background traffic transmission time window for the first terminal device. It should be noted that each first data value, subsequently mentioned in this application, of the background traffic transmission time window for the first terminal device may correspond to the data analysis value of the background traffic transmission time window for the first terminal device. Details are not described below. The first data value of the background traffic transmission bandwidth for the first terminal device may be a data analysis value of the background traffic transmission bandwidth for the first terminal device. It should be noted that each first data value, subsequently mentioned in this application, of the background traffic transmission bandwidth for the first terminal device may correspond to the data analysis value of the background traffic transmission bandwidth for the first terminal device. Details are not described below.

It should be noted that the second terminal device may refer to at least one terminal device. Herein, the second terminal device is a generic term of terminal devices that currently transmit background traffic. Optionally, the second terminal device may be a terminal device served by the first policy control network element, may be a terminal device connected to a second policy control network element, or may be a terminal device connected to both the first policy control network element and a second policy control network element. The second policy control network element may be a policy control network element different from the first policy control network element in the communications system. Alternatively, the second policy control network element may be a policy control network element that is located in a same location area (for example, a tracking area (TA), a tracking area list (TA List), a routing area (RA), or a routing area list (RA List)) as the first policy control network element. In this way, the data analytics network element determines the background traffic transmission data analysis result of the first terminal device using a target transfer policy of a terminal device that currently transmits background traffic, to reduce a possibility of a conflict between the subsequently determined background traffic transfer policy of the first terminal device and a background traffic transfer policy of another terminal device, thereby successfully transmitting background traffic.

In an optional implementation, before the data analytics network element sends the background traffic transmission data analysis result of the first terminal device to the first policy control network element, the data analytics network element needs to first determine the background traffic transmission data analysis result of the first terminal device according to the target background traffic transfer policy of the second terminal device. Further, before the data analytics network element determines the background traffic transmission data analysis result of the first terminal device according to the target background traffic transfer policy of the second terminal device, the data analytics network element may alternatively first obtain the target background traffic transfer policy of the second terminal device.

In an example implementation, the data analytics network element may obtain the target background traffic transfer policy of the second terminal device using the following method: The data analytics network element receives the target background traffic transfer policy of the second terminal device from a first device, where the first device may be any one or any combination of the following: the second terminal device, the first policy control network element, the second policy control network element, a second service network element, a second database network element, or the like.

In an optional implementation, the target background traffic transfer policy of the second terminal device may include a sixth data value of a background traffic transmission time window. The target background traffic transfer policy of the second terminal device may further include at least one of a sixth data value of a background traffic transmission bandwidth, location information of the second terminal device, or an identifier of the second terminal device.

In an optional implementation, when the first terminal device is the $1^{st}$ terminal device that needs to transmit background traffic in the communications system, the data analytics network element may fail in obtaining a target background traffic transfer policy of any terminal device.

That is, in this case, the first terminal device is the 1$^{st}$ terminal device that requires a background traffic transfer policy. In this case, before the data analytics network element sends the background traffic transmission data analysis result of the first terminal device to the first policy control network element, the data analytics network element may first determine the background traffic transmission data analysis result of the first terminal device based on at least one of the second information, the load information of the functional network element, or the capacity information of the functional network element. In an optional implementation, before the data analytics network element determines the background traffic transmission data analysis result of the first terminal device based on the load information of the functional network element and/or the capacity information of the functional network element, the data analytics network element may alternatively first obtain the load information of the functional network element and/or the capacity information of the functional network element. Optionally, the functional network element may be at least one of the first policy control network element, the session management function network element, a radio access network element, the access and mobility management function network element, or a user plane function network element.

In an example implementation, the data analytics network element may obtain the load information of the functional network element and/or the capacity information of the functional network element using the following method: The data analytics network element receives the load information of the functional network element and/or the capacity information of the functional network element from the functional network element or an operation, administration and maintenance (OAM) network element. Optionally, if the data analytics network element receives the load information of the functional network element and/or the capacity information of the functional network element from the OAM network element, the OAM network element collects the load information of the functional network element and/or the capacity information of the functional network element from the functional network element before the data analytics network element receives the load information of the functional network element and/or the capacity information of the functional network element.

In an optional implementation, a method used by the data analytics network element to determine the background traffic transmission data analysis result of the first terminal device based on the target background traffic transfer policy of the second terminal device, the second information, and the load information of the functional network element and/or the capacity information of the functional network element may be as follows: The data analytics network element obtains, through analysis, the background traffic transmission data analysis result of the first terminal device with reference to content included in the target background traffic transfer policy of the second terminal device, the content included in the second information, and information (for example, a congestion level or a non-congestion indicator present during background traffic transmission at a specific location) that is about background traffic transmission and that is maintained by the data analytics network element.

In an example, when the data analytics network element analyzes the background traffic transmission data analysis result of the first terminal device with reference to the content included in the target background traffic transfer policy of the second terminal device, the content included in the second information, the maintained information about the background traffic transmission, the load information of the functional network element (for example, a radio access network element, namely, a base station), and the capacity information of the functional network element (for example, a radio access network element, namely, a base station), a process may be but is not limited to the following steps.

Step 1. The data analytics network element may perform offline analysis based on the foregoing related content, to obtain a first total throughput (that is, a first total bandwidth) that is used for background traffic transmission and that is of each cell or base station (corresponding to a cell ID or a RAN ID) in an area (for example, any one of a TA, a TA List, an RA, or an RA List).

For example, according to an operator policy, a congestion level 9 is a maximum congestion level (critical point) that can be borne by a cell or a base station. In this case, the data analytics network element collects statistics on transmission bandwidths that are used for background traffic transmission and that are of all terminal devices in the cell or the base station (optionally, statistics may be collected for a plurality of times to take an average value), to obtain a first total throughput that is of the cell or the base station and that is used for the background traffic transmission.

Step 2. The data analytics network element determines a second total throughput that is used for background traffic transmission and that is of a current cell in which the first terminal device is located or a base station to which the first terminal device belongs. A method may be as follows: The data analytics network element obtains the location information of the first terminal device, to obtain a cell identifier (Cell ID) of the cell in which the first terminal device is located or a base station identifier (RAN ID) of the base station to which the first terminal device belongs; and then obtains, based on the cell identifier or the base station identifier of the first terminal device by querying first total throughputs of a plurality of cells or base stations obtained in step 1, the second total throughput (that is, a second total bandwidth) of the current cell in which the first terminal device is located or the current base station to which the first terminal device belongs.

In an optional implementation, the data analytics network element does not find the location information, namely, a cell identifier or a base station identifier (Cell ID or RAN ID), of the first terminal device from the second information that is from the first policy control network element, but finds the identifier (for example, A) of the first terminal device. In this case, the data analytics network element may obtain the location information of the first terminal device by querying any one of an operation, administration, and maintenance (OAM) network element, an AMF, a PCF, or a RAN using A.

Step 3. The data analytics network element determines the first data value of the background traffic transmission time window of the first terminal device and the first data value of the background traffic transmission bandwidth for the first terminal device based on the volume of the background traffic, the expected value of the background traffic transmission time window (that is, the third data value of the background traffic transmission time window, where in this case, it is assumed that this information is carried in the second information), and the expected value of the background traffic transmission bandwidth for the first terminal device that are currently requested by the first terminal device, and the second total throughput. A method is as follows:

The data analytics network element first obtains real-time throughputs at different time nodes (timestamp) in a transmission time window (that is, the expected value of the background traffic transmission time window for the first terminal device) expected by the first terminal device in a cell in which the first terminal device is located or on a base station to which the first terminal device belongs, that is, sums transmission bandwidths for one or more second terminal devices that are transmitting background traffic at a time node in the cell in which the first terminal device is located or on the base station to which the first terminal device belongs; and then adds the expected value of the background traffic transmission bandwidth for the first terminal device to an obtained result, to obtain third total bandwidths (that is, third total throughputs) at the different time nodes. Then, the data analytics network element determines the first data value of the background traffic transmission time for the first terminal device and the first data value of the background traffic transmission bandwidth for the first terminal device based on a value relationship between the third total bandwidths at the different time nodes and the second total throughput. For example, there are the following two cases.

Case e1: When the third total bandwidths at all of the time nodes are less than or equal to the second total throughput, the data analytics network element may use the expected value of the background traffic transmission time window for the first terminal device as the first data value of the background traffic transmission time window for the first terminal device. In addition, the data analytics network element may use the expected value of the background traffic transmission bandwidth for the first terminal device as the first data value of the background traffic transmission bandwidth for the first terminal device.

Case e2: When third total bandwidths at some of the time nodes are greater than the second total throughput, the data analytics network element may take many various measures. Examples are described below.

EXAMPLE 1

The data analytics network element does not change a size of the time window, but moves the entire time window backward or forward by a transmission time interval (TTI), and collects statistics on real-time throughputs at different time nodes (timestamp) in a time window obtained after adding the TTI to the third data value of the transmission time window for the first terminal device, that is, sums transmission bandwidths for the second terminal device that is transmitting background traffic at the time nodes in the cell in which the first terminal device is located or on the base station to which the first terminal device belongs; and then adds the expected value of the background traffic transmission bandwidth for the first terminal device to an obtained value, to obtain fourth total bandwidths at the different time nodes in the time window obtained after movement. In this case, the data analytics network element determines the first data value of the background traffic transmission time for the first terminal device and the first data value of the background traffic transmission bandwidth for the first terminal device based on a value relationship between the fourth total bandwidths at the different time nodes and the second total throughput. When the fourth total bandwidths at all of the time nodes are less than or equal to the second total throughput, the data analytics network element uses the expected value of the background traffic transmission time window for the first terminal device plus the TTI as the first data value of the background traffic transmission time window for the first terminal device. In addition, the data analytics network element determines the first data value of the background traffic transmission bandwidth for the first terminal device as the volume of the background traffic of the first terminal device divided by a total time length of a time window corresponding to the first data value of the background traffic transmission time window for the first terminal device. Assuming that the first data value of the background traffic transmission time window for the first terminal device falls within [T1, T2], the total time length is equal to T2−T1.

EXAMPLE 2

The data analytics network element changes a size of the time window, for example, shrinks the entire time window. Assuming that the expected value of the background traffic transmission time window for the first terminal device falls within [T3, T4], a size of an updated time window may be [T3+t, T4]. That is, a start time is moved backward by t. An average transmission bandwidth at each time point in the time window is enlarged, and the new time window and bandwidth are used for transmission. If a requirement can be satisfied, the data analytics network element may determine that the first data value of the background traffic transmission time window for the first terminal device falls within [T3+t, T4]. In addition, the data analytics network element may determine that the first data value of the background traffic transmission bandwidth for the first terminal device is the volume of the background traffic of the first terminal device divided by (T4−(T3+t)).

It should be noted that the NWDAF may alternatively obtain the background traffic transmission data analysis result of the first terminal device according to the target background traffic transfer policy of the second terminal device in another manner. This is not limited in the solutions.

In an optional implementation, the data analytics network element may send the background traffic transmission data analysis result of the first terminal device to the first policy control network element by invoking an Nnwdaf_AnalyticsInfo_Request response service.

Step 204. The first policy control network element sends the background traffic transfer policy of the first terminal device to the requesting device, where the background traffic transfer policy of the first terminal device is determined by the first policy control network element based on third information, and the third information includes the background traffic transmission data analysis result of the first terminal device.

In an optional implementation, the third information may further include a background traffic transmission query result of the first terminal device and/or a local background traffic transfer policy of the first terminal device. Optionally, the background traffic transmission query result may include a fourth data value of the background traffic transmission time window. The background traffic transmission query result further includes at least one of a fourth data value of the background traffic transmission bandwidth, the location information of the first terminal device, or the identifier of the first terminal device. The fourth data value of the background traffic transmission time window for the first terminal device may be a database query value of the background traffic transmission time window for the first terminal device. It should be noted that each fourth data value, subsequently mentioned in this application, of the background traffic transmission time window for the first terminal device may correspond to the database query value of the background traffic transmission time window for the first terminal device. Details are not described below. The fourth data value of the background traffic transmission bandwidth for the first terminal device may be a database query value of the background traffic transmission bandwidth for the first terminal device. It should be noted that each fourth data value, subsequently mentioned in this application, of the background traffic transmission bandwidth for the first terminal device may correspond to the database query value of the background traffic transmission bandwidth for the first terminal device. Details are not described below. The local background traffic transfer policy may include a fifth data value of the background traffic transmission time window. The local background traffic transmission result may further include at least one of a fifth data value of the background traffic transmission bandwidth, the location information of the first terminal device, or the identifier of the first terminal device. The fifth data value of the background traffic transmission time window for the first terminal device may be a local query value of the background traffic transmission time window for the first terminal device. It should be noted that each fifth data value, subsequently mentioned in this application, of the background traffic transmission time window for the first terminal device may correspond to the local query value of the background traffic transmission time window for the first terminal device. Details are not described below. The fifth data value of the background traffic transmission bandwidth for the first terminal device may be a local query value of the background traffic transmission bandwidth for the first terminal device. It should be noted that each fifth data value, subsequently mentioned in this application, of the background traffic transmission bandwidth for the first terminal device may correspond to the local query value of the background traffic transmission bandwidth for the first terminal device. Details are not described below.

In an implementation process, before the first policy control network element sends the background traffic transfer policy of the first terminal device to the requesting device, the first policy control network element may determine the background traffic transfer policy of the first terminal device based on the third information. Optionally, the first terminal device may have one or more background traffic transfer policies. For example, the background traffic transfer policy of the first terminal device may include a second data value of the background traffic transmission time window. The background traffic transfer policy may further include at least one of a second data value of the background traffic transmission bandwidth, the location information of the first terminal device, or the identifier of the first terminal device. The second data value of the background traffic transmission time window for the first terminal device may be a recommended value of the background traffic transmission time window for the first terminal device. It should be noted that each second data value, subsequently mentioned in this application, of the background traffic transmission time window for the first terminal device may correspond to the recommended value of the background traffic transmission time window for the first terminal device. Details are not described below. The second data value of the background traffic transmission bandwidth for the first terminal device may be a recommended value of the background traffic transmission bandwidth for the first terminal device. It should be noted that each second data value, subsequently mentioned in this application, of the background traffic transmission bandwidth for the first terminal device may correspond to the recommended value of the background traffic transmission bandwidth for the first terminal device. Details are not described below.

Based on content that may be included in the third information, before the first policy control network element determines the background traffic transfer policy of the first terminal device based on the third information, the first policy control network element may further perform any one of the following three operations.

First operation: When the third information further includes the background traffic transmission query result of the first terminal device, the first policy control network element obtains the background traffic transmission query result of the first terminal device from a database network element.

Second operation: When the third information further includes the local background traffic transfer policy of the first terminal device, the first policy control network element obtains the local background traffic transfer policy of the first terminal device from the first policy control network element.

Third operation: When the third information further includes the background traffic transmission query result of the first terminal device and the local background traffic transfer policy of the first terminal device, the first policy control network element obtains the background traffic transmission query result of the first terminal device from a database network element, and the first policy control network element obtains the local background traffic transfer policy of the first terminal device from the first policy control network element.

In an implementation, when the third information includes only the background traffic transmission data analysis result of the first terminal device, a process in which the first policy control network element determines the background traffic transfer policy of the first terminal device based on the third information may be as follows.

The first policy control network element may determine the second data value of the background traffic transmission time window in the background traffic transfer policy of the first terminal device based on the first data value of the background traffic transmission time window in the background traffic transmission data analysis result. The first policy control network element may further perform at least one of the following operations: The first policy control network element determines the second data value of the background traffic transmission bandwidth in the background traffic transfer policy of the first terminal device based on the first data value of the background traffic transmission bandwidth in the background traffic transmission data analysis result. The first policy control network element includes, in the background traffic transfer policy of the first terminal device, the location information of the first terminal device that is in the background traffic transmission data analysis result. The first policy control network element includes, in the background traffic transfer policy of the first terminal device, the identifier of the first terminal device that is in the background traffic transmission data analysis result.

In another implementation, when the third information includes the background traffic transmission data analysis result of the first terminal device and the background traffic transmission query result of the first terminal device, a process in which the first policy control network element determines the background traffic transfer policy of the first terminal device based on the third information may be as follows.

The first policy control network element may determine the second data value of the background traffic transmission time window in the background traffic transfer policy of the first terminal device based on the first data value of the background traffic transmission time window in the data transmission analysis result and the fourth data value of the background traffic transmission time window in the background traffic transmission query result of the first terminal device. The first policy control network element may further perform at least one of the following operations: The first policy control network element determines the second data value of the background traffic transmission bandwidth in the background traffic transfer policy of the first terminal device based on the first data value of the background traffic transmission bandwidth in the data transmission analysis result and the fourth data value of the background traffic transmission bandwidth in the background traffic transmission query result of the first terminal device. The first policy control network element includes, in the background traffic transfer policy of the first terminal device, the location information of the first terminal device that is in the background traffic transmission data analysis result and in the background traffic transmission query result of the first terminal device. The first policy control network element includes, in the background traffic transfer policy of the first terminal device, the identifier of the first terminal device that is in the background traffic transmission data analysis result and in the background traffic transmission query result of the first terminal device.

In still another implementation, when the third information includes the background traffic transmission data analysis result of the first terminal device and the local background traffic transfer policy of the first terminal device, a process in which the first policy control network element determines the background traffic transfer policy of the first terminal device based on the third information may be as follows.

The first policy control network element may determine the second data value of the background traffic transmission time window in the background traffic transfer policy of the first terminal device based on the first data value of the background traffic transmission time window in the data transmission analysis result and the fifth data value of the background traffic transmission time window in the local background traffic transfer policy of the first terminal device. The first policy control network element may further perform at least one of the following operations: The first policy control network element determines the second data value of the background traffic transmission bandwidth in the background traffic transfer policy of the first terminal device based on the first data value of the background traffic transmission bandwidth in the data transmission analysis result and the fifth data value of the background traffic transmission time window in the local background traffic transfer policy of the first terminal device. The first policy control network element includes, in the background traffic transfer policy of the first terminal device, the location information of the first terminal device that is in the background traffic transmission data analysis result and in the local background traffic transfer policy of the first terminal device. The first policy control network element includes, in the background traffic transfer policy of the first terminal device, the identifier of the first terminal device that is in the background traffic transmission data analysis result and in the local background traffic transfer policy of the first terminal device.

In still another implementation, when the third information includes the background traffic transmission data analysis result of the first terminal device, the background traffic transmission query result of the first terminal device, and the local background traffic transfer policy of the first terminal device, a process in which the first policy control network element determines the background traffic transfer policy of the first terminal device based on the third information may be as follows.

The first policy control network element may determine the second data value of the background traffic transmission time window in the background traffic transfer policy of the first terminal device based on the first data value of the background traffic transmission time window in the background traffic data transmission analysis result, the fourth data value of the background traffic transmission time window in the background traffic transmission query result of the first terminal device, and the fifth data value of the background traffic transmission time window in the local background traffic transfer policy of the first terminal device. The first policy control network element may further perform at least one of the following operations: The first policy control network element determines the second data value of the background traffic transmission bandwidth in the background traffic transfer policy of the first terminal device based on the first data value of the background traffic transmission bandwidth in the background traffic data transmission analysis result, the fourth data value of the background traffic transmission bandwidth in the background traffic transmission query result of the first terminal device, and the fifth data value of the background traffic transmission bandwidth in the local background traffic transfer policy of the first terminal device. The first policy control network element includes, in the background traffic transfer policy of the first terminal device, the location information of the first terminal device that is in the background traffic transmission data analysis result, in the background traffic transmission query result of the first terminal device, and in the local background traffic transfer policy of the first terminal device. The first policy control network element includes, in the background traffic transfer policy of the first terminal device, the identifier of the first terminal device that is in the background traffic transmission data analysis result, in the background traffic transmission query result of the first terminal device, and in the local background traffic transfer policy of the first terminal device.

In an optional implementation, when the first policy control network element requests background traffic transmission data analysis results of a plurality of terminal devices, and the data analytics network element returns the background traffic transmission data analysis results of the plurality of terminal devices to the first policy control network element, the third information may include background traffic transmission data analysis results of some of the plurality of terminal devices.

In an optional implementation, when the first policy control network element sends the background traffic transfer policy of the first terminal device to the requesting device, the first policy control network element may further send identification information to the requesting device, where the identification information is used to identify the target background traffic transfer policy of the first terminal device. In this way, subsequently, the requesting device may determine the target background traffic transfer policy of the first terminal device in the background traffic transfer policy of the first terminal device using the identification information.

In an optional implementation, because there may be one or more background traffic transfer policies of the first terminal device, there may be the following two cases according to a quantity of background traffic transfer policies of the first terminal device.

In the first case, when the first terminal device has one background traffic transfer policy, the first policy control network element may perform the following operations:

The first policy control network element determines that the background traffic transfer policy of the first terminal device is a target background traffic transfer policy of the first terminal device. Then, the first policy control network element sends the target background traffic transfer policy of the first terminal device to the data analytics network element; or the first policy control network element sends the target background traffic transfer policy of the first terminal device to the database network element; or the first policy control network element sends the target background traffic transfer policy of the first terminal device to the data analytics network element and the database.

In the second case, when the first terminal device has a plurality of background traffic transfer policies, the first policy control network element may further perform the following operations.

The first policy control network element receives a target background traffic transfer policy of the first terminal device from the requesting device, where the target background traffic transfer policy of the first terminal device is selected by the requesting device according to the background traffic transfer policies of the first terminal device. Then, the first policy control network element sends the target background traffic transfer policy of the first terminal device to the data analytics network element; or the first policy control network element sends the target background traffic transfer policy of the first terminal device to the database network element; or the first policy control network element sends the target background traffic transfer policy of the first terminal device to the data analytics network element and the database.

In an optional implementation, in the foregoing two cases, when the first policy control network element sends the target background traffic transfer policy of the first terminal device to the data analytics network element and/or the database network element, the first policy control network element may further send at least one of the identification information, the identifier of the requesting device, or an identifier of the first policy control network element to the data analytics network element and/or the database network element.

In the foregoing two cases, after receiving the target background traffic transfer policy of the first terminal device, the data analytics network element and/or the database network element store/stores the target background traffic transfer policy, and update/updates maintained target background traffic transfer policies of a plurality of terminal devices. According to the methods in the foregoing two cases, the first policy control network element finally sends the target background traffic transfer policy of the first terminal device and at least one of the identification information, the identifier of the requesting device, or the identifier of the first policy control network element to the data analytics network element, such that when the data analytics network element receives a background traffic transmission data analysis result requested for another terminal device by the first policy control network element or another policy control network element, the data analytics network element may further perform analysis with reference to the target background traffic transfer policy of the first terminal device, a target background traffic transfer policy of a terminal device corresponding to the requesting device and/or a target background traffic transfer policy of a terminal device corresponding to the first policy control network element. Therefore, a finally determined background traffic transfer policy of the other terminal device does not conflict with a background traffic transfer policy of a terminal device (including the first terminal device) that currently transmits background traffic. In addition, when receiving a query request for target background traffic of the first terminal device from the first policy control network element, the database network element may obtain the target background traffic transfer policy of the first terminal device through query using identification information carried in the query request, and return the target background traffic transfer policy to the first policy control network element. The first policy control network element sends the target background traffic transfer policy to at least one of the first terminal device, the radio access network element, the user plane function network element, or the first service network element.

In the first case, when the first terminal device has one background traffic transfer policy, after the requesting device receives the background traffic transfer policy of the first terminal device that is sent by the first policy control network element, the requesting device determines that the background traffic transfer policy of the first terminal device is the target background traffic transfer policy of the first terminal device, and then sends the target background traffic transfer policy of the first terminal device to the data analytics network element.

In the second case, when the first terminal device has a plurality of background traffic transfer policies, the requesting device selects the target background traffic transfer policy of the first terminal device according to the background traffic transfer policies of the first terminal device, and then sends the target background traffic transfer policy of the first terminal device to the first policy control network element. For example, the foregoing operations may be performed after the requesting device receives the background traffic transfer policy of the first terminal device that is sent by the first policy control network element.

Further, optionally, in the foregoing processes, after the requesting device determines the target background traffic transfer policy of the first terminal device according to the background traffic transfer policy of the first terminal device, the requesting device may further send the target background traffic transfer policy of the first terminal device to the data analytics network element.

During implementation, no matter in the first case or the second case, any operation performed by the requesting device may be alternatively performed by the first terminal device or the first service network element serving the first terminal device, and an execution process after the replacement is not described in detail herein again.

In an optional implementation, after obtaining the target background traffic transfer policy of the first terminal device, the first policy control network element may further send the target background traffic transfer policy of the first terminal device and/or the identification information to the database network element, where the identification information is used to identify the target background traffic transfer policy of the first terminal device. In this way, on one hand, the data analytics network element can obtain the target background traffic transfer policy of the first terminal device from the database network element. On the other hand, the first policy control network element can obtain the target background traffic transfer policy of the first terminal device by querying the database network element using the identification information.

In an optional implementation, when the first policy control network element sends the background traffic transfer policy of the first terminal device to the requesting device, there may be the following two scenarios according to different cases in which the requesting device may be the first terminal device or the first service network element.

Scenario d1: When the requesting device is the first terminal device, a process in which the first policy control network element sends the background traffic transfer policy of the first terminal device to the first terminal device may be as follows: The first policy control network element first sends the background traffic transfer policy of the first terminal device to a session management network element using a PDU session modification procedure. Optionally, the first policy control network element may send the background traffic transfer policy of the first terminal device to the session management network element by invoking an Npcf_SMPolicy Control_Update service. Then, the session management network element sends the background traffic transfer policy of the first terminal device to the access and mobility management function network element. Optionally, the session management network element may include the background traffic transfer policy of the first terminal device in a PDU session update response (response of Nsmf_PDU Session_Update SMContext) sent by the session management network element to the access and mobility management function network element. Then, the access and mobility management function network element sends the background traffic transfer policy of the first terminal device to an access network device serving the first terminal device. Optionally, the access and mobility management function network element may send the background traffic transfer policy of the first terminal device to the access network device using an N2 message. For example, the N2 message may be an N2 session request (N2 Session Request). Finally, the access network device sends the background traffic transfer policy of the first terminal device to the first terminal device. Optionally, the access network device may include the background traffic transfer policy of the first terminal device in a specific resource modification (AN_specific resource modification) message (that is, a PDU session modification command/ACK) sent by the access network device to the first terminal device.

In an optional implementation, in the scenario d1, when sending the background traffic transfer policy of the first terminal device to the first terminal device, the first policy control network element may further send the identification information to the first terminal device, where the identification information is used to identify the target background traffic transfer policy of the first terminal device. For a procedure in which the first policy control network element sends the identification information to the first terminal device, refer to the foregoing procedure in which the first policy control network element sends the background traffic transfer policy of the first terminal device to the first terminal device. Details are not described herein again. In an optional implementation, when determining to transmit the background traffic transmission policy, the first terminal device sends the identification information to the first policy control network element using a PDU session modification procedure. Further, the first policy control network element obtains the target background traffic transfer policy of the first terminal device by querying the database network element using the identification information, and further sends the target background traffic transfer policy to at least one of the radio access network element, the user plane function network element, or the first service network element.

Scenario d2: When the requesting device is the first service network element, a process in which the first policy control network element sends the background traffic transfer policy of the first terminal device to the first service network element may be as follows: The first policy control network element sends the background traffic transfer policy of the first terminal device to the first service network element via a network exposure function network element. For example, the first policy control network element sends the background traffic transfer policy of the first terminal device to the network exposure function network element. Optionally, the first policy control network element may send the background traffic transfer policy of the first terminal device to the network exposure function network element by invoking an Npcf_BDT Policy Control_Create response service. Then, the network exposure function network element sends the background traffic transfer policy of the first terminal device to the first service network element. Optionally, the network exposure function network element may send the background traffic transfer policy of the first terminal device to the first service network element by invoking an Nnef_BDT PNegotiation_Create response service.

In an optional implementation, in the scenario d2, when sending the background traffic transfer policy of the first terminal device to the first service network element, the first policy control network element may further send the identification information to the first service network element, where the identification information is used to identify the target background traffic transfer policy of the first terminal device. For a procedure in which the first policy control network element sends the identification information to the first service network element, refer to the foregoing procedure in which the first policy control network element sends the background traffic transfer policy of the first terminal device to the first service network element. Details are not described herein again.

In an optional implementation, when determining to transmit the background traffic transmission policy, the first service network element sends the identification information to the first policy control network element using a PDU session modification procedure. Further, the first policy control network element obtains the target background traffic transfer policy of the first terminal device by querying the database network element using the identification information, and further sends the target background traffic transfer policy to at least one of the first terminal device, the radio access network element, or the user plane function network element.

It should be noted that, in the scenarios d1 and d2, the first policy control network element may send the background traffic transfer policy of the first terminal device to the first terminal device using, but not limited to, the foregoing PDU session modification procedure. Optionally, the first policy control network element may alternatively send the background traffic transfer policy of the first terminal device to the first terminal device using a plurality of other procedures such as a PDU session establishment procedure, a registration procedure, a service request procedure, and a UE configuration update procedure (UE Configuration Update). Optionally, when the registration procedure or the terminal configuration update procedure is used, the first policy control network element may include the background traffic transfer policy of the first terminal device in a UE route selection policy (URSP) of the first terminal device, and send the UE route selection policy to the first terminal device. Descriptions of the plurality of other procedures such as the PDU session establishment procedure, the registration procedure, the service request procedure, and the UE configuration update procedure (UE Configuration Update) are not provided herein.

According to the method for determining a background traffic transfer policy provided in this embodiment of this application, after receiving, from the requesting device, the first information for requesting the background traffic transfer policy of the first terminal device, the first policy control network element sends the second information to the data analytics network element to request the background traffic transmission data analysis result of the first terminal device, and after receiving the data analysis result of the first terminal device from the data analytics network element, sends the background traffic transfer policy of the first terminal device to the requesting device. The data analysis result of the first terminal device is determined by the data analytics network element according to the target background traffic transfer policy of the second terminal device, the second terminal device is different from the first terminal device, and the target background traffic transfer policy of the second terminal device is used by the second terminal device to transmit background traffic. The background traffic transfer policy of the first terminal device is determined by the first policy control network element based on the third information, and the third information includes the background traffic transmission data analysis result of the first terminal device. According to the foregoing method, the data analytics network element may determine the background traffic transmission data analysis result of the first terminal device based on a target background traffic transfer policy of another terminal device (that is, the second terminal device), such that the first policy control network element can determine the background traffic transfer policy of the first terminal device. Therefore, the background traffic transfer policy of the first terminal device is determined by the first policy control network element with reference to the other terminal device or the like. In this way, the background traffic transfer policy that is of the first terminal device and that is determined by the first policy control network element does not conflict with a background traffic transfer policy of the other terminal device, thereby avoiding a background traffic transmission failure.

Figure 3:
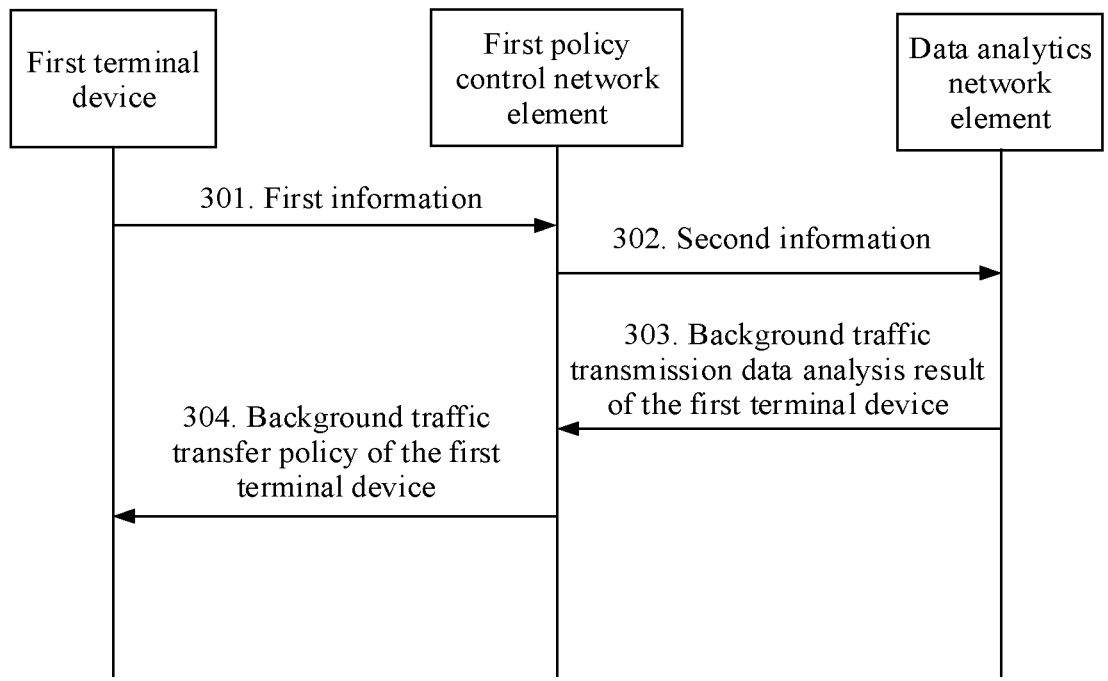
FIG. 3 is a flowchart of another method for determining a background traffic transfer policy according to this application.

Based on the foregoing embodiment, an embodiment of this application further provides a method for determining a background traffic transfer policy. In this embodiment, a first terminal device serves as a requesting device to directly request a background traffic transfer policy of the first terminal device. The method is also applicable to the communications system shown in FIG. 1. Referring to FIG. 3, a procedure of the method may include the following steps.

Step 301. The first terminal device sends first information to a first policy control network element, where the first information is used to request the background traffic transfer policy of the first terminal device.

For a process in which the first terminal device sends the first information to the first policy control network element, refer to related descriptions in the scenario a1 and the scenario a2 in the embodiment shown in FIG. 2. No repeated description is provided herein.

Content included in the first information is the same as the content included in the first information in the embodiment shown in FIG. 2. Mutual reference may be made, and details are not described herein again.

Step 302. The first policy control network element sends second information to a data analytics network element based on the first information, where the second information is used to request a background traffic transmission data analysis result of the first terminal device.

For example, for a detailed description of step 302, refer to the description in step 202 in the foregoing embodiment, and details are not described herein again.

Step 303. The data analytics network element sends the background traffic transmission data analysis result of the first terminal device to the first policy control network element, where the background traffic transmission data analysis result of the first terminal device is determined by the data analytics network element according to a target background traffic transfer policy of a second terminal device, the second terminal device is different from the first terminal device, and the target background traffic transfer policy of the second terminal device is used by the second terminal device to transmit background traffic.

For example, for a detailed description of step 303, refer to the description in step 203 in the foregoing embodiment, and details are not described herein again.

Step 304. The first terminal device receives the background traffic transfer policy of the first terminal device from the first policy control network element, where the background traffic transfer policy of the first terminal device is determined by the first policy control network element based on third information, and the third information includes the background traffic transmission data analysis result of the first terminal device.

For example, for a process in which the first terminal device receives the background traffic transfer policy of the first terminal device from the first policy control network element, refer to related descriptions of the scenario d1 in the embodiment shown in FIG. 2. Details are not described herein again.

In an optional implementation, when receiving the background traffic transfer policy of the first terminal device from the first policy control network element, the first terminal device may further receive identification information, where the identification information is used to identify a target background traffic transfer policy of the first terminal device. In this way, the first terminal device may determine the target background traffic transfer policy of the first terminal device in the background traffic transfer policy of the first terminal device using the identification information.

In an optional implementation, after the first terminal device receives the background traffic transfer policy of the first terminal device from the first policy control network element, the first terminal device may further send the identification information to the first policy control network element. In this way, the first policy control network element can obtain the target background traffic transfer policy of the first terminal device by querying a database network element using the identification information, and subsequently send the target background traffic transfer policy of the first terminal device to at least one of a radio access network element, a user plane function network element, or a service network element.

For example, the first terminal device may send the identification information to the first policy control network element via a session management function network element using a PDU session modification procedure initiated by the first terminal device. The first policy control network element may obtain the target background traffic transfer policy of the first terminal device by querying the database network element using the identification information. Then, the first policy control network element may send the target background traffic transfer policy of the first terminal device to at least one of the radio access network element, the user plane function network element, or the service network element using a remaining part of the PDU session modification procedure.

In an optional implementation, when the first terminal device has one background traffic transfer policy, the first terminal device may further perform the following operations: The first terminal device determines that the background traffic transfer policy of the first terminal device is the target background traffic transfer policy of the first terminal device. The first terminal device sends the target background traffic transfer policy of the first terminal device to the data analytics network element.

In an optional implementation, when the first terminal device has a plurality of background traffic transfer policies, the first terminal device may further perform the following operations: The first terminal device selects the target background traffic transfer policy of the first terminal device according to the background traffic transfer policies of the first terminal device. The first terminal device sends the target background traffic transfer policy of the first terminal device to the first policy control network element.

In an optional implementation, after selecting the target background traffic transfer policy of the first terminal device according to the background traffic transfer policies of the first terminal device, the first terminal device may alternatively send the target background traffic transfer policy of the first terminal device to the data analytics network element.

For the mentioned second information, background traffic transfer policy of the first terminal device, background traffic transmission data analysis result of the first terminal device, target background traffic transfer policy of the second terminal device, and the like in this embodiment, refer to related descriptions in the embodiment shown in FIG. 2.

According to the method for determining a background traffic transfer policy provided in this embodiment of this application, a technical effect of the embodiment shown in FIG. 2 can also be achieved. Details are not described herein again. In addition, an uplink background traffic transfer policy may be further determined based on the foregoing description, to resolve a problem in other approaches that an uplink background traffic transfer policy cannot be determined.

Figure 4:
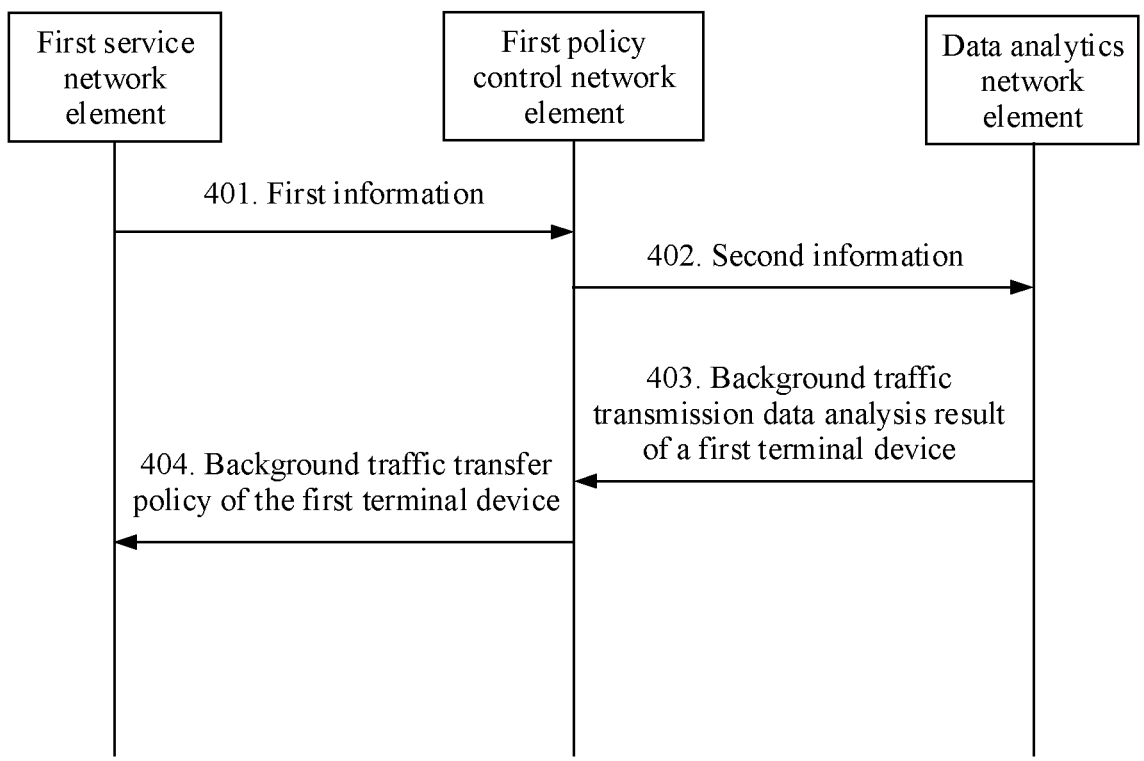
FIG. 4 is a flowchart of still another method for determining a background traffic transfer policy according to this application.

Based on the foregoing embodiment, an embodiment of this application further provides a method for determining a background traffic transfer policy. In this embodiment, a first service network element serving a first terminal device serves as a requesting device to directly request a background traffic transfer policy of the first terminal device. The method is also applicable to the communications system shown in FIG. 1. Referring to FIG. 4, a procedure of the method may include the following steps.

Step 401. The first service network element sends first information to a first policy control network element, where the first information is used to request the background traffic transfer policy of the first terminal device.

For a process in which the first service network element sends the first information to the first policy control network element, refer to related descriptions in the scenario b1 and the scenario b2 in the embodiment shown in FIG. 2. No repeated description is provided herein.

Content included in the first information is the same as the content included in the first information in the embodiment shown in FIG. 2. Mutual reference may be made, and details are not described herein again.

Step 402. The first policy control network element sends second information to a data analytics network element based on the first information, where the second information is used to request a background traffic transmission data analysis result of the first terminal device.

For a detailed description of step 402, refer to the description in step 202 in the foregoing embodiment, and details are not described herein again.

Step 403. The data analytics network element sends the background traffic transmission data analysis result of the first terminal device to the first policy control network element, where the background traffic transmission data analysis result of the first terminal device is determined by the data analytics network element according to a target background traffic transfer policy of a second terminal device, the second terminal device is different from the first terminal device, and the target background traffic transfer policy of the second terminal device is used by the second terminal device to transmit background traffic.

For a detailed description of step 403, refer to the description in step 203 in the foregoing embodiment, and details are not described herein again.

Step 404. The first service network element receives the background traffic transfer policy of the first terminal device from the first policy control network element, where the background traffic transfer policy of the first terminal device is determined by the first policy control network element based on third information, and the third information includes the background traffic transmission data analysis result of the first terminal device.

For a process in which the first service network element receives the background traffic transfer policy of the first terminal device from the first policy control network element, refer to related descriptions of the scenario d1 in the embodiment shown in FIG. 2. Details are not described herein again.

In an optional implementation, when receiving the background traffic transfer policy of the first terminal device from the first policy control network element, the first service network element may further receive identification information, where the identification information is used to identify a target background traffic transfer policy of the first terminal device. In this way, the first service network element may determine the target background traffic transfer policy of the first terminal device in the background traffic transfer policy of the first terminal device using the identification information.

In an optional implementation, after the first service network element receives the background traffic transfer policy of the first terminal device from the first policy control network element, the first service network element may further send the identification information to the first policy control network element. In this way, the first policy control network element can obtain the target background traffic transfer policy of the first terminal device by querying a database network element using the identification information, and subsequently send the target background traffic transfer policy of the first terminal device to at least one of the first terminal device, a radio access network element, or a user plane function network element.

For example, the first service network element may send the identification information to the first policy control network element using a PDU session modification procedure initiated by the first terminal device. The first policy control network element may obtain the target background traffic transfer policy of the first terminal device by querying the database network element using the identification information. Then, the first policy control network element may send the target background traffic transfer policy of the first terminal device to at least one of the first terminal device, the radio access network element, or the user plane function network element using a remaining part of the PDU session modification procedure.

In an optional implementation, when the first terminal device has one background traffic transfer policy, the first service network element may further perform the following operations: The first service network element determines that the background traffic transfer policy of the first terminal device is the target background traffic transfer policy of the first terminal device. The first service network element sends the target background traffic transfer policy of the first terminal device to the data analytics network element.

In an optional implementation, when the first terminal device has a plurality of background traffic transfer policies, the first service network element may further perform the following operations: The first service network element selects the target background traffic transfer policy of the first terminal device according to the background traffic transfer policies of the first terminal device. The first service network element sends the target background traffic transfer policy of the first terminal device to the first policy control network element.

In an optional implementation, after determining the target background traffic transfer policy of the first terminal device according to the background traffic transfer policies of the first terminal device, the first service network element may alternatively send the target background traffic transfer policy of the first terminal device to the data analytics network element.

For the mentioned second information, background traffic transfer policy of the first terminal device, background traffic transmission data analysis result of the first terminal device, target background traffic transfer policy of the second terminal device, and the like in this embodiment, refer to related descriptions in the embodiment shown in FIG. 2.

According to the method for determining a background traffic transfer policy provided in this embodiment of this application, a technical effect of the embodiment shown in FIG. 2 can also be achieved. Details are not described herein again.

In the following embodiments in FIG. 5A and FIG. 5B, and FIG. 6A and FIG. 6B, the method for determining a background traffic transfer policy provided in the embodiments of this application is described in detail based on the foregoing embodiments and using examples.

Figure 5A:
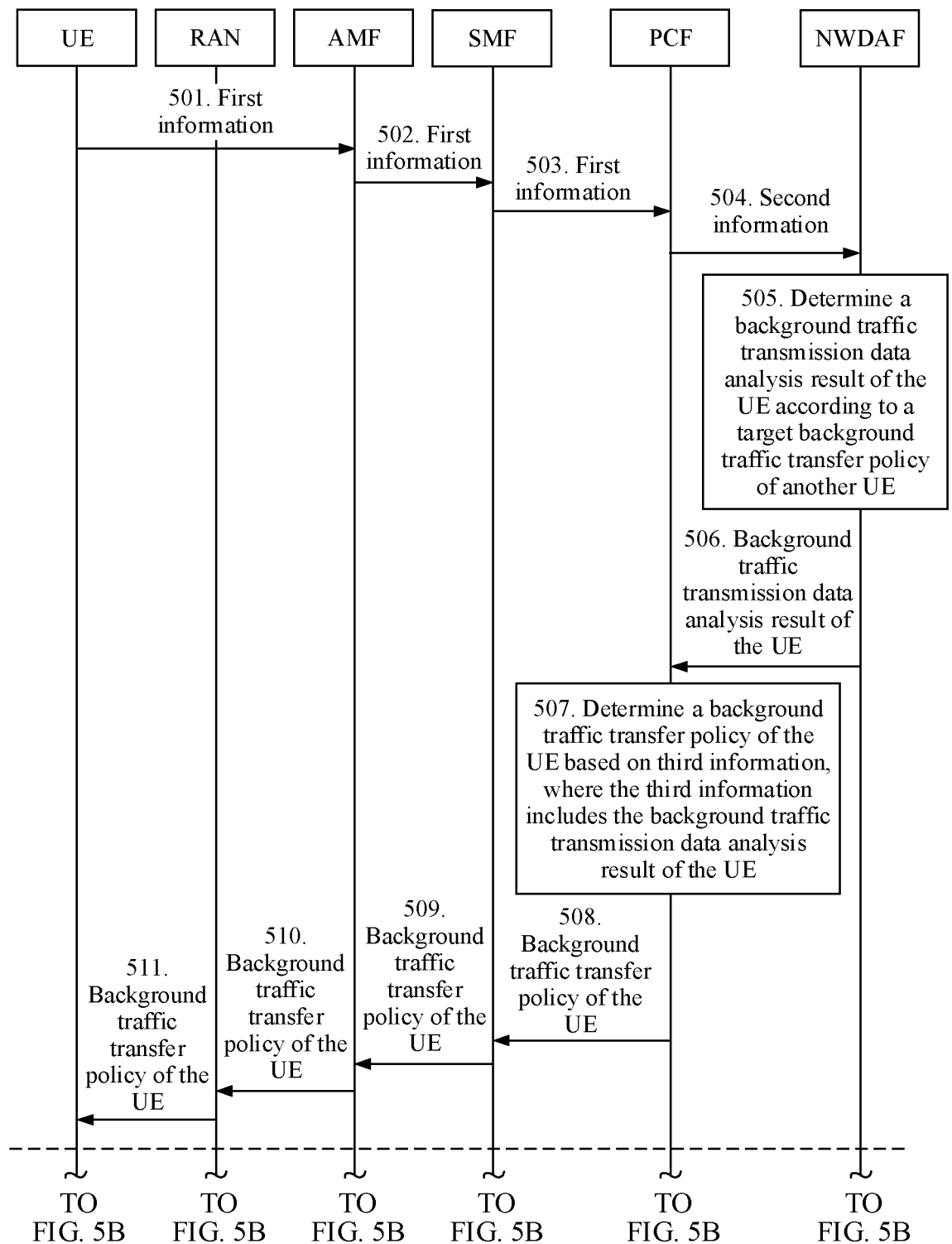
FIG. 5A and FIG. 5B are flowcharts of an example of a method for determining a background traffic transfer policy according to this application.
Figure 5B:
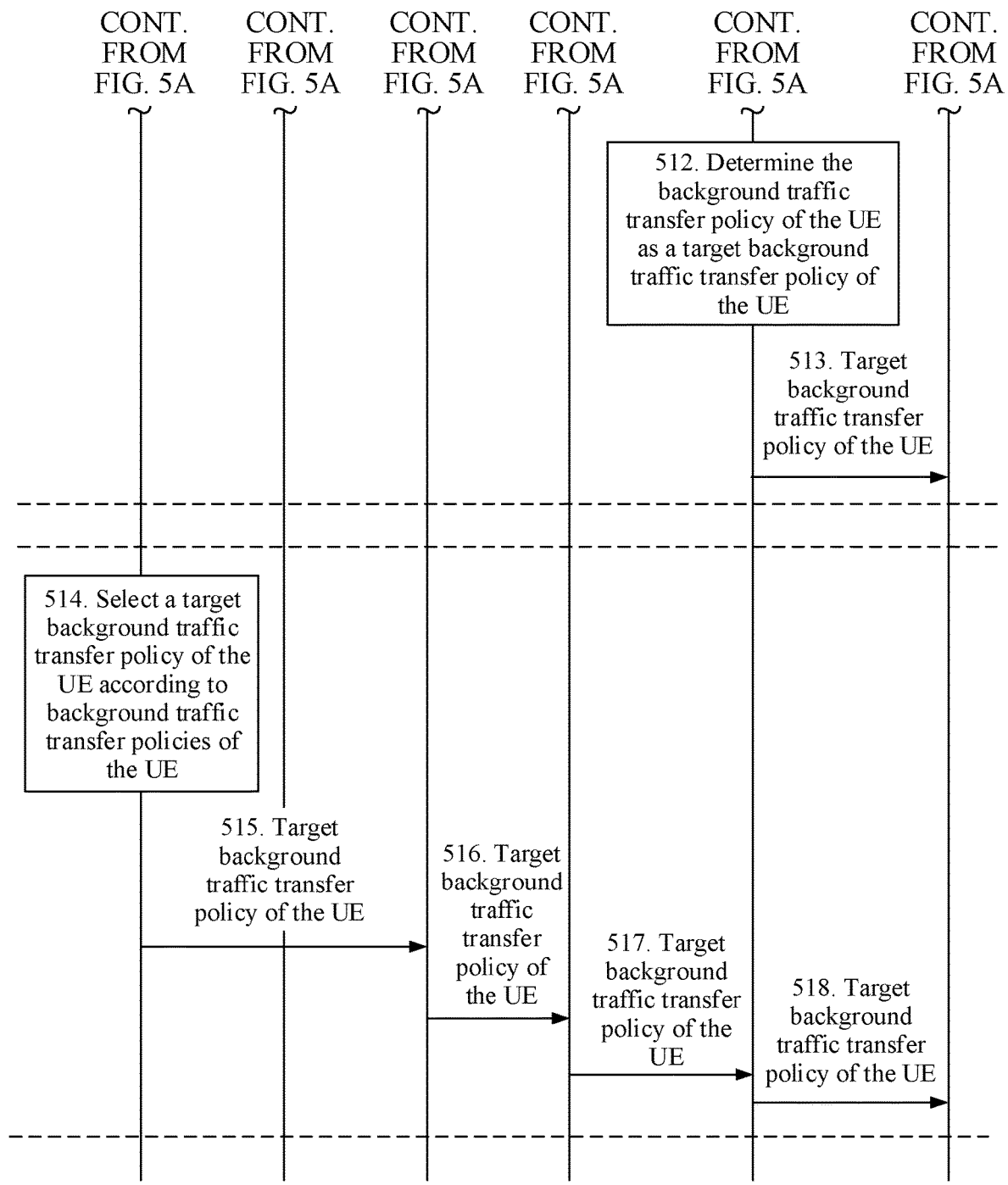

As shown in FIG. 5A and FIG. 5B, an embodiment of this application provides an example of a method for determining a background traffic transfer policy. In the example, a first terminal device directly requests a background traffic transfer policy of a first terminal device. An example in which a terminal device is UE, a policy control network element is a PCF, and a data analytics network element is an NWDAF is used for description. A procedure of the example may include the following steps.

Step 501. The UE sends first information to an AMF, where the first information is used to request a background traffic transfer policy of the UE.

For example, the AMF is an example of an access and mobility management function network element. The AMF herein may alternatively be replaced with another access and mobility management function network element. This is not limited in this application.

For example, the UE may send the first information to the AMF using an N1 message.

Step 502. The AMF sends the first information to an SMF.

The SMF is an example of a session management function network element. The SMF herein may alternatively be replaced with another session management function network element. This is not limited in this application.

For example, the AMF may send the first information to the SMF by invoking an Nsmf_PDU Session_UpdateSM-Context service.

Step 503. The SMF sends the first information to the PCF.

For example, the SMF may send the first information to the PCF by invoking an Npcf_SMPolicyControl_Update service.

Step 504. The PCF sends second information to the NWDAF based on the first information, where the second information is used to request a background traffic transmission data analysis result of the UE.

Step 505. The NWDAF determines the background traffic transmission data analysis result of the UE according to a target background traffic transfer policy of the other UE.

During implementation, the NWDAF determines the background traffic transmission data analysis result of the UE based on the second information and the target background traffic transfer policy of the other UE.

Step 506. The NWDAF sends the background traffic transmission data analysis result of the UE to the PCF.

Step 507. The PCF determines the background traffic transfer policy of the UE based on third information, where the third information includes the background traffic transmission data analysis result of the UE.

Step 508. The PCF sends the background traffic transfer policy of the UE to the SMF.

For example, the PCF may send the background traffic transfer policy of the UE to the SMF by invoking an Npcf_SMPolicy Control_Update service.

Optionally, when sending the background traffic transfer policy of the UE to the SMF, the PCF further sends identification information to the SMF, where the identification information is used to identify a target background traffic transfer policy of the first terminal device.

Step 509. The SMF sends the background traffic transfer policy of the UE to the AMF.

For example, the SMF may send the background traffic transfer policy of the UE to the AMF using a response of Nsmf_PDU Session_Update SMContext.

Step 510. The AMF sends the background traffic transfer policy of the UE to a RAN.

The RAN is an example of an access network device. The RAN herein may alternatively be replaced with another access network device. This is not limited in this application.

For example, the AMF may send the background traffic transfer policy of the UE to the RAN using an N2 message.

Step 511. The RAN sends the background traffic transfer policy of the UE to the UE.

For example, the RAN may send the background traffic transfer policy of the UE to the UE using AN_specific resource modification (that is, a PDU session modification command/ACK).

In a possible implementation, when the UE has one background traffic transfer policy, after or before step 511, the PCF may perform step 512 and step 513. Details are as follows:

Step 512. The PCF determines that the background traffic transfer policy of the UE is a target background traffic transfer policy of the UE.

Step 513. The PCF sends the target background traffic transfer policy of the UE to the NWDAF.

Optionally, when sending the target background traffic transfer policy of the UE to the NWDAF, the PCF may further send at least one of the identification information, an identifier of the PCF, or an identifier of the UE to the NWDAF.

Optionally, when the UE has one background traffic transfer policy, step 512 may be omitted, and the PCF may directly send the background traffic transfer policy of the UE to the NWDAF. Details are not described herein again.

In another possible implementation, when the UE has a plurality of background traffic transfer policies, after step 511, the following steps may be further included.

Step 514. The UE selects the target background traffic transfer policy of the UE according to the background traffic transfer policies of the UE.

Step 515. The UE sends the target background traffic transfer policy of the UE to the AMF.

For example, the UE may send the target background traffic transfer policy of the UE to the AMF using a PDU session modification request message.

Step 516. The AMF sends the target background traffic transfer policy of the UE to the SMF.

For example, the AMF may send the target background traffic transfer policy of the UE to the SMF by invoking an Nsmf_PDUSession_UpdateSMContex service.

Step 517. The SMF sends the target background traffic transfer policy of the UE to the PCF.

For example, the SMF may send the target background traffic transfer policy of the UE to the PCF by invoking an Npcf_SMPolicyControl_Update request service.

Optionally, after the UE performs step 514, the UE may further send the target background traffic transfer policy of the UE to the NWDAF. Alternatively, after the UE performs step 514, the UE may further send the target background traffic transfer policy of the UE to a database network element (for example, a UDR). Details are not further shown in FIG. 5A and FIG. 5B.

Step 518. The PCF sends the target background traffic transfer policy of the UE to the NWDAF.

Optionally, when sending the target background traffic transfer policy of the UE to the NWDAF, the PCF may further send at least one of the identification information, an identifier of the PCF, or an identifier of the UE to the NWDAF.

For example, step 518 and step 513 are the same. Herein, two steps are shown for ease of illustrating two possible implementations.

It should be noted that, for implementation details of each step in the embodiment shown in FIG. 5A and FIG. 5B, refer to related descriptions in the foregoing embodiments. Details are not described herein again.

Based on the foregoing example, technical effects of the embodiments shown in FIG. 2 and FIG. 3 can also be achieved. Details are not described herein again.

Figure 6A:
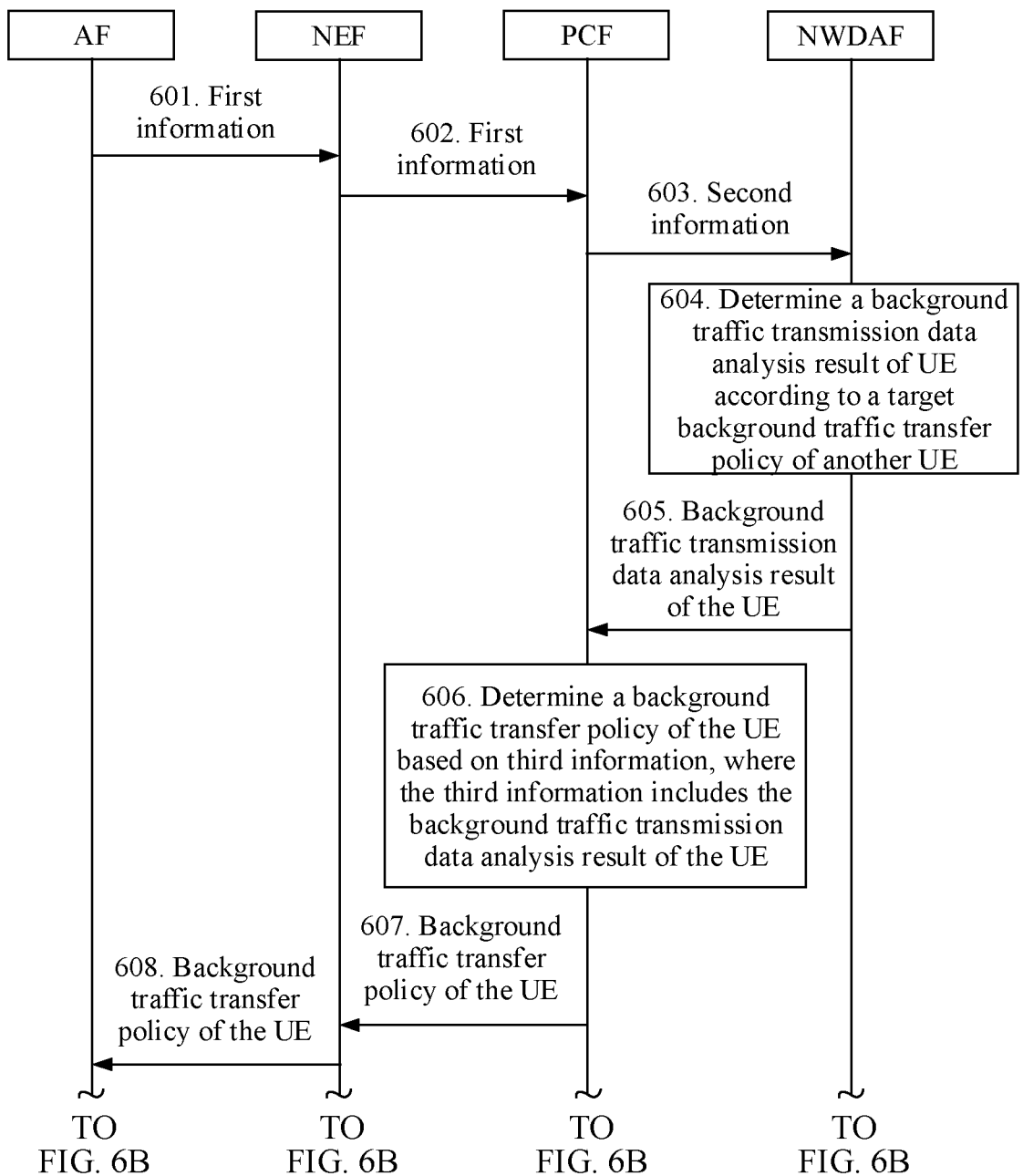
FIG. 6A and FIG. 6B are flowcharts of another example of a method for determining a background traffic transfer policy according to this application.
Figure 6B:
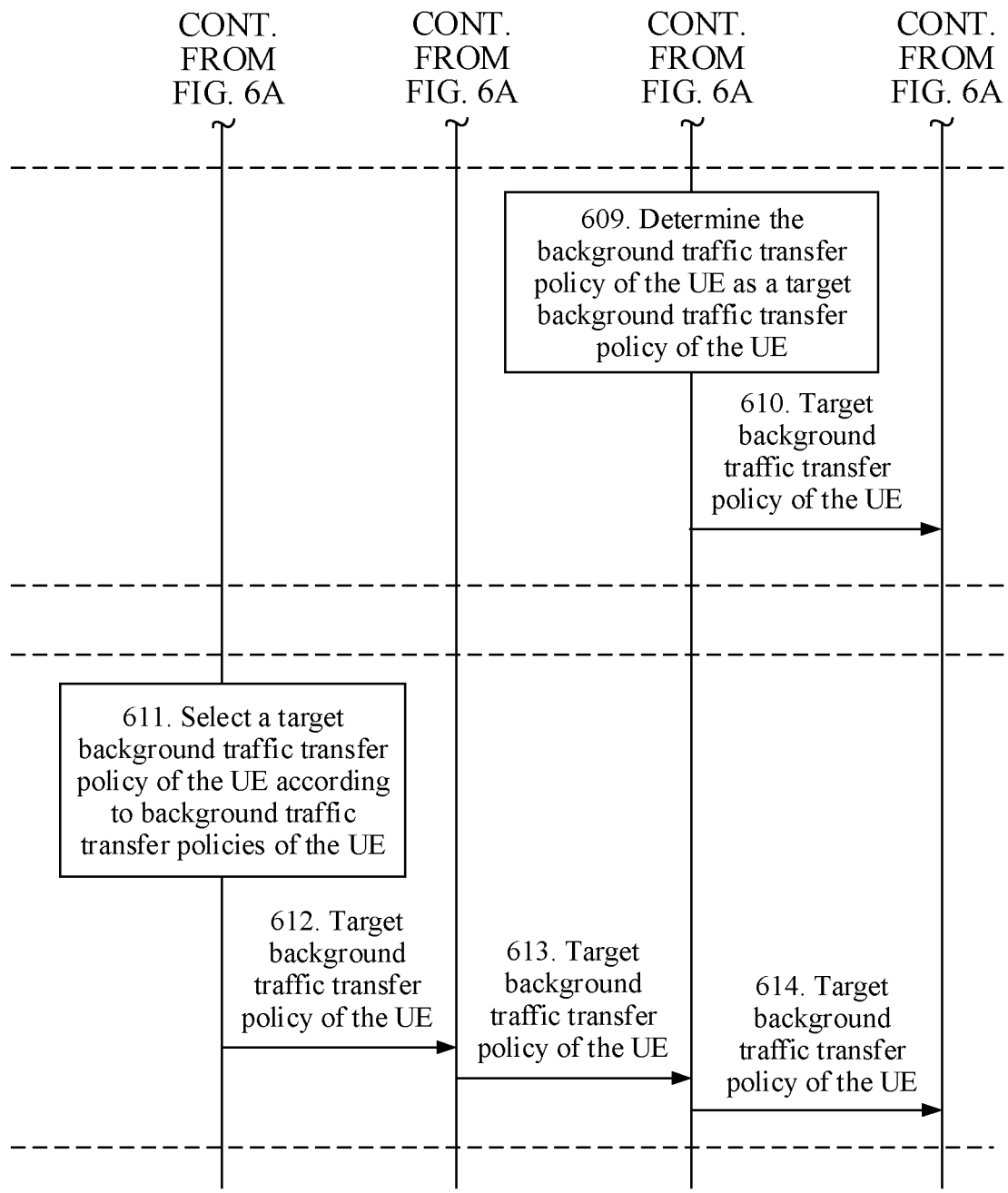

As shown in FIG. 6A and FIG. 6B, an embodiment of this application provides another example of a method for determining a background traffic transfer policy. In the example, a first service network element serving a first terminal device requests a background traffic transfer policy of a first terminal. An example in which the first service network element is an AF, a terminal device is a UE, a policy control network element is a PCF, and a data analytics network element is an NWDAF is used for description. A procedure of the example may include the following steps.

Step 601. The AF sends first information to an NEF, where the first information is used to request a background traffic transfer policy of the UE.

The NEF is an example of a network exposure function network element. The NEF herein may alternatively be replaced with another network exposure function network element. This is not limited in this application.

For example, the AF may send the first information to the NEF by invoking an Nnef_BDTPNegotiation_Create request service or an Nnef_Trigger_Delivery request service.

Step 602. The NEF sends the first information to the PCF.

For example, the NEF may send the first information to the PCF by invoking an Npcf_BDTPolicyControl_Create request service or an Npcf_PolicyAuthorization_Create request service.

Step 603. The PCF sends second information to the NWDAF based on the first information, where the second information is used to request a background traffic transmission data analysis result of the UE.

Step 604. The NWDAF determines the background traffic transmission data analysis result of the UE according to a target background traffic transfer policy of the other UE.

During implementation, the NWDAF determines the background traffic transmission data analysis result of the UE based on the second information and the target background traffic transfer policy of the other UE.

Step 605. The NWDAF sends the background traffic transmission data analysis result of the UE to the PCF.

Step 606. The PCF determines the background traffic transfer policy of the UE based on third information, where the third information includes the background traffic transmission data analysis result of the UE.

Step 607. The PCF sends the background traffic transfer policy of the UE to the NEF.

For example, the PCF may send the background traffic transfer policy of the UE to the NEF by invoking an Npcf_BDT Policy Control_Create response service or an Npcf_PolicyAuthorization_Notify service.

Optionally, when sending the background traffic transfer policy of the UE to the SMF, the PCF further sends identification information to the SMF, where the identification information is used to identify a target background traffic transfer policy of the first terminal device.

Step 608. The NEF sends the background traffic transfer policy of the UE to the AF.

For example, the NEF may send the background traffic transfer policy of the UE to the AF by invoking an Nnef_BDT PNegotiation_Create response service or an Nnef_Trigger_Delivery response service.

In a possible implementation, when the UE has one background traffic transfer policy, after or before step 608, the PCF may perform step 609 and step 610. Details are as follows:

Step 609. The PCF determines that the background traffic transfer policy of the UE is the target background traffic transfer policy of the UE.

Step 610. The PCF sends the target background traffic transfer policy of the UE to the NWDAF.

Optionally, when sending the target background traffic transfer policy of the UE to the NWDAF, the PCF may further send at least one of the identification information, an identifier of the PCF, or an identifier of the UE to the NWDAF.

Optionally, when the UE has one background traffic transfer policy, step 609 may be omitted, and the PCF may directly send the background traffic transfer policy of the UE to the NWDAF. Details are not described herein again.

In another possible implementation, when the UE has a plurality of background traffic transfer policies, after step 608, the following steps may be further included.

Step 611. The AF selects a target background traffic transfer policy of the UE according to the background traffic transfer policies of the UE.

Step 612. The AF sends the target background traffic transfer policy of the UE to the NEF.

For example, the AF may send the target background traffic transfer policy of the UE to the NEF by invoking an Nnef_BDTPNegotiation_Update request service or an Nnef_Trigger_Delivery request service.

Step 613. The NEF sends the target background traffic transfer policy of the UE and/or the identification information to the PCF.

For example, the NEF may send the target background traffic transfer policy of the UE to the PCF by invoking an Npcf_BDTPolicyControl_Update request service or an Npcf_PolicyAuthorization_Update request service.

Optionally, after performing step 611, the AF may further send the target background traffic transfer policy of the UE, or the target background traffic transfer policy of the UE and at least one of an identifier of the PCF, an identifier of the AF, or the identification information to the NWDAF. Alternatively, after performing step 611, the AF may further send the target background traffic transfer policy of the UE, or the target background traffic transfer policy of the UE and at least one of an identifier of the PCF, an identifier of the AF, or the identification information to a database network element (for example, a UDR). Details are not further shown in FIG. 5A and FIG. 5B.

Step 614. The PCF sends the target background traffic transfer policy of the UE to the NWDAF.

Optionally, when sending the target background traffic transfer policy of the UE to the NWDAF, the PCF may further send at least one of the identification information, an identifier of the PCF, or an identifier of the UE to the NWDAF.

For example, step 614 and step 610 are the same. Herein, two steps are shown for ease of illustrating two possible implementations.

It should be noted that, for implementation details of each step in the embodiment shown in FIG. 6A and FIG. 6B, refer to related descriptions in the foregoing embodiments. Details are not described herein again.

Based on the foregoing example, technical effects of the embodiments shown in FIG. 2 and FIG. 4 can also be achieved. Details are not described herein again.

The foregoing embodiments provided in this application describe, from a perspective of interaction between network elements or devices, the solutions of the method for determining a background traffic transfer policy provided in the embodiments of this application. It may be understood that, to implement the foregoing functions, the network elements and devices, for example, the first policy control network element, the data analytics network element, the first service network element, and the first terminal device, each include corresponding hardware structures and/or software modules for performing the functions. A person skilled in the art should easily be aware that, in combination with units and algorithm steps of the examples described in the embodiments disclosed in this application, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

For example, when the network element or the device implements a corresponding function using a software module, a communications apparatus for determining a background traffic transfer policy may include a receiving module 701 and a sending module 702, and optionally, may further include a processing module 703. For details, refer to a schematic structural diagram shown in FIG. 7.

Figure 7:
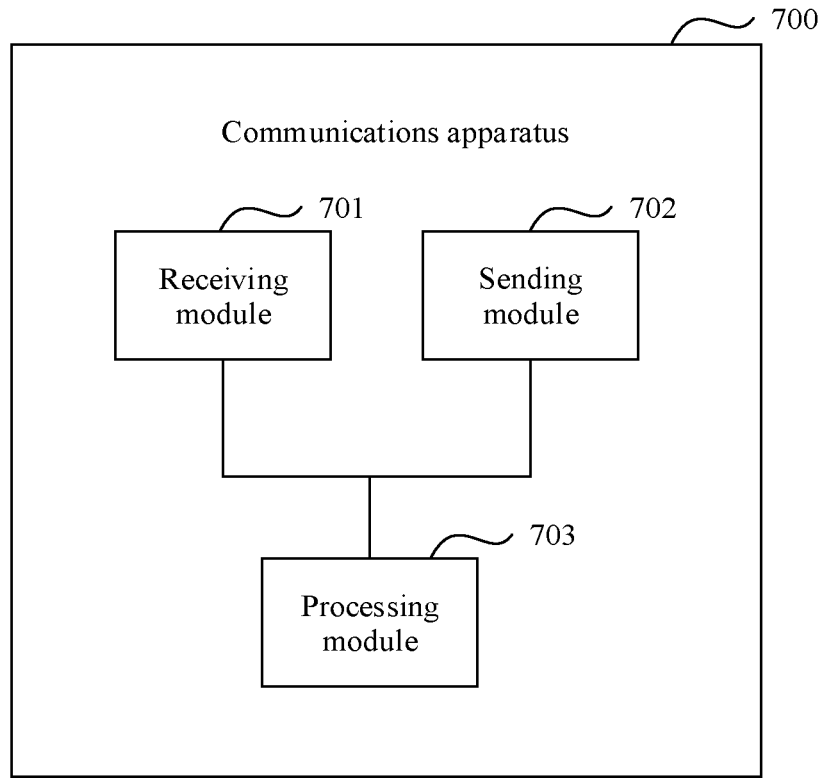
FIG. 7 is a schematic structural diagram of a communications apparatus for determining a background traffic transfer policy according to this application.

In an embodiment, the communications apparatus shown in FIG. 7 may be configured to perform an operation performed by the first policy control network element in the embodiments shown in FIG. 2, FIG. 3, and FIG. 4, and may be configured to perform an operation performed by the PCF in the embodiments shown in FIG. 5A and FIG. 5B, and FIG. 6A and FIG. 6B. For example, details are provided below.

The receiving module 701 is configured to receive first information from a requesting device, where the first information is used to request a background traffic transfer policy of a first terminal device.

The sending module 702 is configured to send second information to a data analytics network element based on the first information, where the second information is used to request a background traffic transmission data analysis result of the first terminal device.

The receiving module 701 is further configured to receive the background traffic transmission data analysis result of the first terminal device from the data analytics network element, where the background traffic transmission data analysis result of the first terminal device is determined by the data analytics network element according to a target background traffic transfer policy of a second terminal device, the second terminal device is different from the first terminal device, and the target background traffic transfer policy of the second terminal device is used by the second terminal device to transmit background traffic.

The sending module 702 is further configured to send the background traffic transfer policy of the first terminal device to the requesting device, where the background traffic transfer policy of the first terminal device is determined by the first policy control network element based on third information, and the third information includes the background traffic transmission data analysis result of the first terminal device.

Therefore, according to the communications apparatus for determining a background traffic transfer policy, the data analytics network element may determine the background traffic transmission data analysis result of the first terminal device based on a target background traffic transfer policy of another terminal device (that is, the second terminal device), such that the first policy control network element can determine the background traffic transfer policy of the first terminal device. Therefore, the background traffic transfer policy of the first terminal device is determined by the first policy control network element with reference to the other terminal device. In this way, the background traffic transfer policy that is of the first terminal device and that is determined by the first policy control network element does not conflict with a background traffic transfer policy of the other terminal device, thereby avoiding a background traffic transmission failure.

In an optional implementation, the third information further includes a background traffic transmission query result of the first terminal device and/or a local background traffic transfer policy of the first terminal device.

In an optional implementation, the receiving module 701 is further configured to: when the third information further includes the background traffic transmission query result of the first terminal device, obtain the background traffic transmission query result of the first terminal device from a database network element; or when the third information further includes the local background traffic transfer policy of the first terminal device, obtain the local background traffic transfer policy of the first terminal device from the first policy control network element; or when the third information further includes the background traffic transmission query result of the first terminal device and the local background traffic transfer policy of the first terminal device, obtain the background traffic transmission query result of the first terminal device from a database network element, and obtain the local background traffic transfer policy of the first terminal device from the first policy control network element.

In an optional implementation, when the first terminal device has one background traffic transfer policy, the processing module 703 is further configured to determine that the background traffic transfer policy of the first terminal device is a target background traffic transfer policy of the first terminal device, where the target background traffic transfer policy of the first terminal device is used by the first terminal device to transmit background traffic. The sending module 702 is further configured to send the target background traffic transfer policy of the first terminal device to the data analytics network element and/or the database network element.

In an optional implementation, when the first terminal device has a plurality of background traffic transfer policies, the receiving module 701 is further configured to receive a target background traffic transfer policy of the first terminal device from the requesting device, where the target background traffic transfer policy of the first terminal device is selected by the requesting device according to the background traffic transfer policies of the first terminal device. The sending module 702 is further configured to send the target background traffic transfer policy of the first terminal device to the data analytics network element and/or the database network element.

In an optional implementation, the requesting device is the first terminal device or a service network element serving the first terminal device.

In an optional implementation, the background traffic transmission data analysis result includes a first data value of a background traffic transmission time window. The background traffic transmission data analysis result further includes at least one of a first data value of a background traffic transmission bandwidth, the location information of the first terminal device, or the identifier of the first terminal device.

In an optional implementation, the background traffic transfer policy includes a second data value of the background traffic transmission time window. The background traffic transfer policy further includes at least one of a second data value of the background traffic transmission bandwidth, the location information of the first terminal device, or the identifier of the first terminal device.

In an optional implementation, the second information includes a volume of background traffic of the first terminal device. The second information further includes at least one of an identifier of the first policy control network element, an identifier of the requesting device, a third data value of the background traffic transmission time window for the first terminal device, the location information of the first terminal device, or the identifier of the first terminal device.

In an optional implementation, the first information includes the volume of the background traffic of the first terminal device. The first information further includes at least one of the identifier of the requesting device, the third data value of the background traffic transmission time window for the first terminal device, the location information of the first terminal device, or the identifier of the first terminal device.

In an optional implementation, the background traffic transmission query result includes a fourth data value of the background traffic transmission time window. The background traffic transmission query result further includes at least one of a fourth data value of the background traffic transmission bandwidth, the location information of the first terminal device, or the identifier of the first terminal device.

In an optional implementation, the local background traffic transfer policy includes a fifth data value of the background traffic transmission time window. The local background traffic transmission result further includes at least one of a fifth data value of the background traffic transmission bandwidth, the location information of the first terminal device, or the identifier of the first terminal device.

In an optional implementation, when the sending module 702 sends the background traffic transfer policy of the first terminal device to the requesting device, the sending module 702 is further configured to send identification information to the requesting device, where the identification information is used to identify the target background traffic transfer policy of the first terminal device.

In an optional implementation, when the sending module 702 sends the target background traffic transfer policy of the first terminal device to the data analytics network element and/or the database network element, the sending module 702 is further configured to send at least one of the identification information, the identifier of the requesting device, or the identifier of the first policy control network element to the data analytics network element and/or the database network element.

In an optional implementation, the receiving module 701 is further configured to receive the identification information from the requesting device after the sending module 702 sends the background traffic transfer policy of the first terminal device to the requesting device.

In addition, based on the receiving module 701 and the sending module 702, and optionally, the processing module 703 in the communications apparatus for determining a background traffic transfer policy, another operation or function of the first policy control network element in the foregoing methods may be further implemented, and details are not described herein again.

In another embodiment, the communications apparatus shown in FIG. 7 may be further configured to: perform an operation performed by the first terminal device in the embodiment shown in FIG. 3, and perform an operation performed by the UE in the embodiment shown in FIG. 5A and FIG. 5B. Example are described below.

The sending module 702 is configured to send first information to a first policy control network element, where the first information is used to request a background traffic transfer policy of the first terminal device.

The receiving module 701 is configured to receive the background traffic transfer policy of the first terminal device from the first policy control network element, where the background traffic transfer policy of the first terminal device is determined by the first policy control network element based on third information, and the third information includes a background traffic transmission data analysis result that is of the first terminal device and that is from a data analytics network element.

Therefore, according to the communications apparatus for determining a background traffic transfer policy, the background traffic transfer policy of the first terminal device is determined by the first policy control network element based on the third information, and the third information includes the background traffic transmission data analysis result that is of the first terminal device and that is from the data analytics network element. Therefore, the background traffic transfer policy of the first terminal device is determined by the first policy control network element with reference to another terminal device. In this way, the background traffic transfer policy of the first terminal device does not conflict with a background traffic transfer policy of the other terminal device, thereby avoiding a background traffic transmission failure.

In an optional implementation, the third information further includes a background traffic transmission query result of the first terminal device and/or a local background traffic transfer policy of the first terminal device.

In an optional implementation, when the first terminal device has one background traffic transfer policy, the processing module 703 is configured to determine that the background traffic transfer policy of the first terminal device is a target background traffic transfer policy of the first terminal device. The sending module 702 is further configured to send the target background traffic transfer policy of the first terminal device to the data analytics network element.

In an optional implementation, when the first terminal device has a plurality of background traffic transfer policies, the processing module 703 is further configured to select a target background traffic transfer policy of the first terminal device according to the background traffic transfer policies of the first terminal device. The sending module 702 is further configured to send the target background traffic transfer policy of the first terminal device to the first policy control network element.

In an optional implementation, the sending module 702 is further configured to send the target background traffic transfer policy of the first terminal device to the data analytics network element.

In an optional implementation, the background traffic transmission data analysis result includes a first data value of a background traffic transmission time window. The background traffic transmission data analysis result further includes at least one of a first data value of a background traffic transmission bandwidth, the location information of the first terminal device, or the identifier of the first terminal device.

In an optional implementation, the background traffic transfer policy includes a second data value of the background traffic transmission time window. The background traffic transfer policy further includes at least one of a second data value of the background traffic transmission bandwidth, the location information of the first terminal device, or the identifier of the first terminal device.

In an optional implementation, the first information includes a volume of background traffic of the first terminal device. The first information further includes at least one of a third data value of the background traffic transmission time window for, the location information of, or the identifier of the first terminal device.

In an optional implementation, the background traffic transmission query result includes a fourth data value of the background traffic transmission time window. The background traffic transmission query result further includes at least one of a fourth data value of the background traffic transmission bandwidth, the location information of the first terminal device, or the identifier of the first terminal device.

In an optional implementation, the local background traffic transfer policy includes a fifth data value of the background traffic transmission time window. The local background traffic transmission result further includes at least one of a fifth data value of the background traffic transmission bandwidth, the location information of the first terminal device, or the identifier of the first terminal device.

In an optional implementation, before the sending module 702 sends the first information to the first policy control network element, the receiving module 701 is further configured to obtain the volume of the background traffic of the first terminal device from the first service network element. The receiving module 701 is further configured to obtain at least one of the third data value of the background traffic transmission time window for, the location information of, or the identifier of the first terminal device from the first service network element.

In an optional implementation, when the receiving module 701 receives the background traffic transfer policy of the first terminal device, the receiving module 701 is further configured to receive identification information from the first policy control network element, where the identification information is used to identify the target background traffic transfer policy of the first terminal device.

In an optional implementation, after the receiving module 701 receives the background traffic transfer policy of the first terminal device from the first policy control network element, the sending module 702 is further configured to send the identification information to the first policy control network element.

In addition, based on the receiving module 701 and the sending module 702, and optionally, the processing module 703 in the communications apparatus for determining a background traffic transfer policy, another operation or function of the first terminal device in the foregoing methods may be further implemented, and details are not described herein again.

In another embodiment, the communications apparatus shown in FIG. 7 may be further configured to: perform an operation performed by the first service network element in the embodiment shown in FIG. 4, and perform an operation performed by the AF in the embodiment shown in FIG. 6A and FIG. 6B. Some examples are discussed below.

The sending module 702 is configured to send first information to a first policy control network element, where the first information is used to request a background traffic transfer policy of a first terminal device.

The receiving module 701 is configured to receive the background traffic transfer policy of the first terminal device from the first policy control network element, where the background traffic transfer policy of the first terminal device is determined by the first policy control network element based on third information, and the third information includes a background traffic transmission data analysis result that is of the first terminal device and that is from a data analytics network element.

Therefore, according to the communications apparatus for determining a background traffic transfer policy, the background traffic transfer policy of the first terminal device is determined by the first policy control network element based on the third information, and the third information includes the background traffic transmission data analysis result that is of the first terminal device and that is from the data analytics network element. Therefore, the background traffic transfer policy of the first terminal device is determined by the first policy control network element with reference to another terminal device. In this way, the background traffic transfer policy of the first terminal device does not conflict with a background traffic transfer policy of the other terminal device, thereby avoiding a background traffic transmission failure.

In an optional implementation, the third information further includes a background traffic transmission query result of the first terminal device and/or a local background traffic transfer policy of the first terminal device.

In an optional implementation, when the first terminal device has one background traffic transfer policy, the processing module 703 is configured to determine that the background traffic transfer policy of the first terminal device is a target background traffic transfer policy of the first terminal device. The sending module 702 is further configured to send the target background traffic transfer policy of the first terminal device to the data analytics network element.

In an optional implementation, when the first terminal device has a plurality of background traffic transfer policies, the processing module 703 is further configured to select a target background traffic transfer policy of the first terminal device according to the background traffic transfer policies of the first terminal device. The sending module 702 is further configured to send the target background traffic transfer policy of the first terminal device to the first policy control network element.

In an optional implementation, the sending module 702 is further configured to send the target background traffic transfer policy of the first terminal device to the data analytics network element.

In an optional implementation, the background traffic transmission data analysis result includes a first data value of a background traffic transmission time window. The background traffic transmission data analysis result further includes at least one of a first data value of a background traffic transmission bandwidth, the location information of the first terminal device, or the identifier of the first terminal device.

In an optional implementation, the background traffic transfer policy includes a second data value of the background traffic transmission time window. The background traffic transfer policy further includes at least one of a second data value of the background traffic transmission bandwidth, the location information of the first terminal device, or the identifier of the first terminal device.

In an optional implementation, the first information includes the volume of the background traffic of the first terminal device. The first information further includes at least one of the identifier of the first service network element, the third data value of the background traffic transmission time window for the first terminal device, the location information of the first terminal device, or the identifier of the first terminal device.

In an optional implementation, the background traffic transmission query result includes a fourth data value of the background traffic transmission time window. The background traffic transmission query result further includes at least one of a fourth data value of the background traffic transmission bandwidth, the location information of the first terminal device, or the identifier of the first terminal device.

In an optional implementation, the local background traffic transfer policy includes a fifth data value of the background traffic transmission time window. The local background traffic transmission result further includes at least one of a fifth data value of the background traffic transmission bandwidth, the location information of the first terminal device, or the identifier of the first terminal device.

In an optional implementation, before the sending module 702 sends the first information to the first policy control network element, the receiving module 701 is further configured to obtain the volume of the background traffic of the first terminal device from the first terminal device. The receiving module 701 further obtains at least one of the identifier of the first service network element, the third data value of the background traffic transmission time window for the first terminal device, the location information of the first terminal device, or the identifier of the first terminal device from the first terminal device.

In an optional implementation, when the receiving module 701 receives the background traffic transfer policy of the first terminal device from the first policy control network element, the receiving module 701 is further configured to receive identification information from the first policy control network element, where the identification information is used to identify the target background traffic transfer policy of the first terminal device.

In an optional implementation, after the receiving module 701 receives the background traffic transfer policy of the first terminal device from the first policy control network element, the sending module 702 is further configured to send the identification information to the first policy control network element.

In addition, based on the receiving module 701 and the sending module 702, and optionally, the processing module 703 in the communications apparatus for determining a background traffic transfer policy, another operation or function of the first service network element in the foregoing methods may be further implemented, and details are not described herein again.

For another example, when the network element or the device implements a corresponding function using a software module, a communications apparatus for determining a background traffic transfer policy may alternatively include a receiving module 801 and a sending module 802. For details, refer to a schematic structural diagram shown in FIG. 8.

Figure 8:
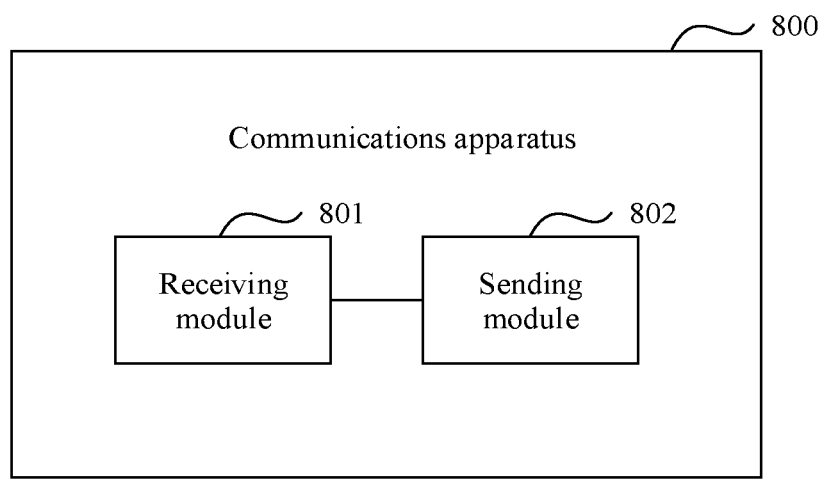
FIG. 8 is a schematic structural diagram of another communications apparatus for determining a background traffic transfer policy according to this application.

In an embodiment, the communications apparatus shown in FIG. 8 may be configured to perform an operation performed by the data analytics network element in the embodiments shown in FIG. 2, FIG. 3, and FIG. 4, and may be configured to perform an operation performed by the NWDAF in the embodiments shown in FIG. 5A and FIG. 5B, and FIG. 6A and FIG. 6B. For example, details are provided below.

The receiving module 801 is configured to receive second information from a first policy control network element, where the second information is used to request a background traffic transmission data analysis result of a first terminal device, the second information is determined by the first policy control network element based on first information received from a requesting device, and the first information is used to request a background traffic transfer policy of the first terminal device.

The sending module 802 is configured to send the background traffic transmission data analysis result of the first terminal device to the first policy control network element, where the background traffic transmission data analysis result of the first terminal device is determined by the data analytics network element according to a target background traffic transfer policy of a second terminal device, the second terminal device is different from the first terminal device, and the target background traffic transfer policy of the second terminal device is used by the second terminal device to transmit background traffic.

Therefore, according to the communications apparatus for determining a background traffic transfer policy, the background traffic transmission data analysis result of the first terminal device is determined based on a target background traffic transfer policy of another terminal device (that is, the second terminal device), such that the first policy control network element can determine the background traffic transfer policy of the first terminal device. Therefore, the background traffic transfer policy that is of the first terminal device and that is determined by the first policy control network element can be referred to the other terminal device. In this way, the background traffic transfer policy that is of the first terminal device and that is determined by the first policy control network element does not conflict with background traffic transfer policy of the other terminal device, thereby avoiding a background traffic transmission failure.

In an optional implementation, the background traffic transmission data analysis result of the first terminal device may be alternatively determined by the data analytics network element based on the target background traffic transfer policy of the second terminal device, the second information, and load information of a functional network element and/or capacity information of the functional network element.

In an optional implementation, the receiving module 801 is further configured to obtain the target background traffic transfer policy of the second terminal device.

In an optional implementation, when obtaining the target background traffic transfer policy of the second terminal device, the receiving module 801 is configured to receive the target background traffic transfer policy of the second terminal device from a first device, where the first device is any one or more of the following: the second terminal device, the first policy control network element, a second policy control network element, a second service network element, or a second database network element, where the first policy control network element, the second policy control network element, the second service network element, and the second database network element serve the second terminal device.

In an optional implementation, the receiving module 801 is further configured to obtain the load information of the functional network element. Alternatively, the receiving module 801 is further configured to obtain the capacity information of the functional network element. Alternatively, the receiving module 801 is further configured to obtain the load information of the functional network element and the capacity information of the functional network element.

In an optional implementation, when obtaining the load information of the functional network element, the receiving module 801 is configured to receive the load information of the functional network element from the functional network element or an operation, administration and maintenance network element. Alternatively, when obtaining the capacity information of the functional network element, the receiving module 801 is configured to receive the capacity information of the functional network element from the functional network element or an operation, administration and maintenance network element. Alternatively, when obtaining the load information of the functional network element and the capacity information of the functional network element, the receiving module 801 may be configured to receive the load information of the functional network element and the capacity information of the functional network element from the functional network element or an operation, administration and maintenance network element.

In an optional implementation, the functional network element includes at least one of the first policy control network element, a session management function network element, a radio access network element, an access and mobility management function network element, or a user plane function network element that serves the first terminal device.

In an optional implementation, the receiving module 801 is further configured to receive a target background traffic transfer policy of the first terminal device, where the first terminal device transmits background traffic according to the target background traffic transfer policy of the first terminal device.

In an optional implementation, when receiving the target background traffic transfer policy of the first terminal device, the receiving module 801 is configured to receive the target background traffic transfer policy of the first terminal device from a second device, where the second device is any one or more of the following: the first terminal device, the first policy control network element, a first service network element, or a first database network element, where the first policy control network element, the first service network element, and the first database network element serve the first terminal device.

In an optional implementation, when the receiving module 801 receives the target background traffic transfer policy of the first terminal device, the receiving module 801 is further configured to receive an identifier of the requesting device, an identifier of the first policy control network element, an identifier of the requesting device and an identifier of the first policy control network element.

In an optional implementation, the background traffic transmission data analysis result includes a first data value of a background traffic transmission time window. The background traffic transmission data analysis result further includes at least one of a first data value of a background traffic transmission bandwidth, the location information of the first terminal device, or the identifier of the first terminal device.

In an optional implementation, the background traffic transfer policy includes a second data value of the background traffic transmission time window. The background traffic transfer policy further includes at least one of a second data value of the background traffic transmission bandwidth, the location information of the first terminal device, or the identifier of the first terminal device.

In an optional implementation, the second information includes a volume of background traffic of the first terminal device. The second information further includes at least one of an identifier of the first policy control network element, an identifier of the requesting device, a third data value of the background traffic transmission time window for the first terminal device, the location information of the first terminal device, or the identifier of the first terminal device.

In an optional implementation, the first information includes the volume of the background traffic of the first terminal device. The first information further includes at least one of the identifier of the requesting device, the third data value of the background traffic transmission time window for the first terminal device, the location information of the first terminal device, or the identifier of the first terminal device.

In addition, based on the receiving module 801 and the sending module 802 in the communications apparatus for determining a background traffic transfer policy, another operation or function of the data analytics network element in the foregoing methods may further be implemented, and details are not described herein again.

It should be noted that, division into units or modules in the embodiments of this application is an example, and is merely logical function division. In actual implementation, another division manner may be used. Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software function unit and sold or used as an independent product, the integrated unit may be stored in a computer-readable storage medium. Based on such an understanding, the technical solutions of this application essentially, or the part contributing to other approaches, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods in the embodiments of this application. The storage medium includes any medium that can store program code, such as a Universal Serial Bus (USB) flash drive, a removable hard disk, a read-only memory (ROM), a random-access memory (RAM), a magnetic disk, or an optical disc.

For another example, when the network element or the device implements a corresponding function using hardware, a communications apparatus for determining a background traffic transfer policy may include a transceiver 901 and a processor 902, and optionally, may further include a memory 903. For details, refer to a structural diagram shown in FIG. 9.

The processor 902 may be a central processing unit (CPU), a network processor (NP), a combination of a CPU and an NP, or the like. The processor 902 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof. The processor 902 may implement the foregoing functions by hardware or by hardware executing corresponding software.

The transceiver 901 and the processor 902 are connected to each other. Optionally, the transceiver 901 and the processor 902 are connected to each other via a bus 904. The bus 904 may be a Peripheral Component Interconnect (PCI) bus, an Extended Industry Standard Architecture (EISA) bus, or the like. The bus may be classified into an address bus, a data bus, a control bus, and the like. For ease of representation, only one thick line is used to represent the bus in FIG. 9, but this does not mean that there is only one bus or only one type of bus.

Figure 9:
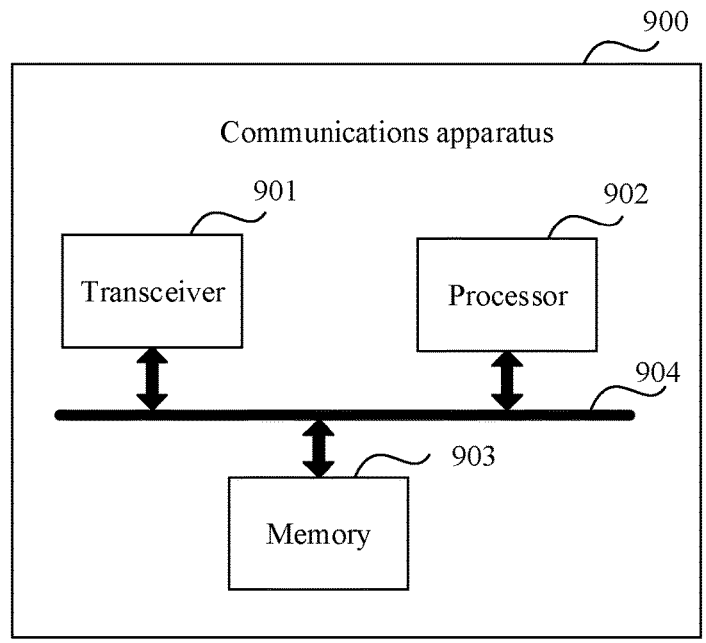
FIG. 9 is a structural diagram of a communications apparatus for determining a background traffic transfer policy according to this application.

In an embodiment, the communications apparatus shown in FIG. 9 may be configured to perform an operation performed by the first policy control network element in the embodiments shown in FIG. 2, FIG. 3, and FIG. 4, and may be further configured to perform an operation performed by the PCF in the embodiments shown in FIG. 5A and FIG. 5B, and FIG. 6A and FIG. 6B. For example, details are provided below.

The transceiver 901 is configured to implement communication interaction with another device connected to the first policy control network element (for example, the PCF), that is, configured to send and receive data.

The processor 902 is configured to: control the transceiver 901 to receive first information from a requesting device, where the first information is used to request a background traffic transfer policy of a first terminal device; control the transceiver 901 to send second information to a data analytics network element based on the first information, where the second information is used to request a background traffic transmission data analysis result of the first terminal device; control the transceiver 901 to receive the background traffic transmission data analysis result of the first terminal device from the data analytics network element, where the background traffic transmission data analysis result of the first terminal device is determined by the data analytics network element according to a target background traffic transfer policy of a second terminal device, the second terminal device is different from the first terminal device, and the target background traffic transfer policy of the second terminal device is used by the second terminal device to transmit background traffic; and control the transceiver 901 to send the background traffic transfer policy of the first terminal device to the requesting device, where the background traffic transfer policy of the first terminal device is determined by the first policy control network element based on third information, and the third information includes the background traffic transmission data analysis result of the first terminal device.

Therefore, according to the communications apparatus for determining a background traffic transfer policy, the data analytics network element may determine the background traffic transmission data analysis result of the first terminal device based on a target background traffic transfer policy of another terminal device (that is, the second terminal device), such that the first policy control network element can determine the background traffic transfer policy of the first terminal device. Therefore, the background traffic transfer policy of the first terminal device is determined by the first policy control network element with reference to the other terminal device. In this way, the background traffic transfer policy that is of the first terminal device and that is determined by the first policy control network element does not conflict with a background traffic transfer policy of the other terminal device, thereby avoiding a background traffic transmission failure.

In an optional implementation, the third information further includes a background traffic transmission query result of the first terminal device and/or a local background traffic transfer policy of the first terminal device.

In an optional implementation, the processor 902 is further configured to: when the third information further includes the background traffic transmission query result of the first terminal device, control the transceiver 901 to obtain the background traffic transmission query result of the first terminal device from a database network element; or when the third information further includes the local background traffic transfer policy of the first terminal device, control the transceiver 901 to obtain the local background traffic transfer policy of the first terminal device from the first policy control network element; or when the third information further includes the background traffic transmission query result of the first terminal device and the local background traffic transfer policy of the first terminal device, control the transceiver 901 to obtain the background traffic transmission query result of the first terminal device from a database network element, and control the transceiver to obtain the local background traffic transfer policy of the first terminal device from the first policy control network element.

In an optional implementation, when the first terminal device has one background traffic transfer policy, the processor 902 is further configured to: determine that the background traffic transfer policy of the first terminal device is a target background traffic transfer policy of the first terminal device, where the target background traffic transfer policy of the first terminal device is used by the first terminal device to transmit background traffic; and control the transceiver 901 to send the target background traffic transfer policy of the first terminal device to the data analytics network element and/or the database network element.

In an optional implementation, when the first terminal device has a plurality of background traffic transfer policies, the processor 902 is further configured to: control the transceiver 901 to receive a target background traffic transfer policy of the first terminal device from the requesting device, where the target background traffic transfer policy of the first terminal device is selected by the requesting device according to the background traffic transfer policies of the first terminal device; and control the transceiver 901 to send the target background traffic transfer policy of the first terminal device to the data analytics network element and/or the database network element.

In an optional implementation, the requesting device is the first terminal device or a service network element serving the first terminal device.

In an optional implementation, the background traffic transmission data analysis result includes a first data value of a background traffic transmission time window. The background traffic transmission data analysis result further includes at least one of a first data value of a background traffic transmission bandwidth, the location information of the first terminal device, or the identifier of the first terminal device.

In an optional implementation, the background traffic transfer policy includes a second data value of the background traffic transmission time window. The background traffic transfer policy further includes at least one of a second data value of the background traffic transmission bandwidth, the location information of the first terminal device, or the identifier of the first terminal device.

In an optional implementation, the second information includes a volume of background traffic of the first terminal device. The second information further includes at least one of an identifier of the first policy control network element, an identifier of the requesting device, a third data value of the background traffic transmission time window for the first terminal device, the location information of the first terminal device, or the identifier of the first terminal device.

In an optional implementation, the first information includes the volume of the background traffic of the first terminal device. The first information further includes at least one of the identifier of the requesting device, the third data value of the background traffic transmission time window for the first terminal device, the location information of the first terminal device, or the identifier of the first terminal device.

In an optional implementation, the background traffic transmission query result includes a fourth data value of the background traffic transmission time window. The background traffic transmission query result further includes at least one of a fourth data value of the background traffic transmission bandwidth, the location information of the first terminal device, or the identifier of the first terminal device.

In an optional implementation, the local background traffic transfer policy includes a fifth data value of the background traffic transmission time window. The local background traffic transmission result further includes at least one of a fifth data value of the background traffic transmission bandwidth, the location information of the first terminal device, or the identifier of the first terminal device.

In an optional implementation, when controlling the transceiver 901 to send the background traffic transfer policy of the first terminal device to the requesting device, the processor 902 is further configured to control the transceiver 901 to send identification information to the requesting device, where the identification information is used to identify the target background traffic transfer policy of the first terminal device.

In an optional implementation, when controlling the transceiver 901 to send the target background traffic transfer policy of the first terminal device to the data analytics network element and/or the database network element, the processor 902 is further configured to control the transceiver 901 to send at least one of the identification information, the identifier of the requesting device, or the identifier of the first policy control network element to the data analytics network element and/or the database network element.

In an optional implementation, after controlling the transceiver 901 to send the background traffic transfer policy of the first terminal device to the requesting device, the processor 902 is further configured to control the transceiver 901 to receive the identification information from the requesting device.

In an optional implementation, the memory 903 is coupled to the processor 902, and is configured to store a program and the like. For example, the program may include program code, and the program code includes a computer executable instruction. The memory 903 may include a RAM, and may further include a non-volatile memory, for example, at least one magnetic disk memory. The processor 902 executes the application program stored in the memory 903, to implement the foregoing functions, thereby implementing the methods for determining a background traffic transfer policy shown in FIG. 2, FIG. 3, FIG. 4, FIG. 5A and FIG. 5B, and FIG. 6A and FIG. 6B.

In another embodiment, the communications apparatus shown in FIG. 9 may be configured to perform an operation performed by the data analytics network element in the embodiments shown in FIG. 2, FIG. 3, and FIG. 4, and may be further configured to perform an operation performed by the NWDAF in the embodiments shown in FIG. 5A and FIG. 5B, and FIG. 6A and FIG. 6B. Some examples are described below.

The transceiver 901 is configured to implement communication interaction with another device connected to the data analytics network element (for example, the NWDAF), that is, configured to send and receive data.

The processor 902 is configured to: control the transceiver 901 to receive second information from a first policy control network element, where the second information is used to request a background traffic transmission data analysis result of a first terminal device, the second information is determined by the first policy control network element based on first information received from a requesting device, and the first information is used to request a background traffic transfer policy of the first terminal device; and control the transceiver 901 to send the background traffic transmission data analysis result of the first terminal device to the first policy control network element, where the background traffic transmission data analysis result of the first terminal device is determined by the data analytics network element according to a target background traffic transfer policy of a second terminal device, the second terminal device is different from the first terminal device, and the target background traffic transfer policy of the second terminal device is used by the second terminal device to transmit background traffic.

Therefore, according to the communications apparatus for determining a background traffic transfer policy, the background traffic transmission data analysis result of the first terminal device is determined based on a target background traffic transfer policy of another terminal device (that is, the second terminal device), such that the first policy control network element can determine the background traffic transfer policy of the first terminal device. Therefore, the background traffic transfer policy that is of the first terminal device and that is determined by the first policy control network element can be referred to the other terminal device. In this way, the background traffic transfer policy that is of the first terminal device and that is determined by the first policy control network element does not conflict with a background traffic transfer policy of the other terminal device, thereby avoiding a background traffic transmission failure.

In an optional implementation, the background traffic transmission data analysis result of the first terminal device may be alternatively determined by the data analytics network element based on the target background traffic transfer policy of the second terminal device, the second information, and load information of a functional network element and/or capacity information of the functional network element.

In an optional implementation, the processor 902 is further configured to control the transceiver 901 to obtain the target background traffic transfer policy of the second terminal device.

In an optional implementation, when controlling the transceiver 901 to obtain the target background traffic transfer policy of the second terminal device, the processor 902 is configured to control the transceiver 901 to receive the target background traffic transfer policy of the second terminal device from a first device, where the first device is any one or more of the following: the second terminal device, the first policy control network element, a second policy control network element, a second service network element, or a second database network element, where the first policy control network element, the second policy control network element, the second service network element, and the second database network element serve the second terminal device.

In an optional implementation, the processor 902 is further configured to control the transceiver 901 to obtain the load information of the functional network element; or is further configured to control the transceiver 901 to obtain the capacity information of the functional network element; or is further configured to control the transceiver 901 to obtain the load information of the functional network element and the capacity information of the functional network element.

In an optional implementation, when controlling the transceiver 901 to obtain the load information of the functional network element, the processor 902 is configured to receive the load information of the functional network element from the functional network element or an operation, administration and maintenance network element. Alternatively, when controlling the transceiver 901 to obtain the capacity information of the functional network element, the processor 902 is configured to receive the capacity information of the functional network element from the functional network element or an operation, administration and maintenance network element. Alternatively, when controlling the transceiver 901 to obtain the load information of the functional network element and the capacity information of the functional network element, the processor 902 may be configured to receive the load information of the functional network element and the capacity information of the functional network element from the functional network element or an operation, administration and maintenance network element.

In an optional implementation, the functional network element includes at least one of the first policy control network element, a session management function network element, a radio access network element, an access and mobility management function network element, or a user plane function network element that serves the first terminal device.

In an optional implementation, the processor 902 is further configured to control the transceiver 901 to receive a target background traffic transfer policy of the first terminal device, where the first terminal device transmits background traffic according to the target background traffic transfer policy of the first terminal device.

In an optional implementation, when controlling the transceiver 901 to receive the target background traffic transfer policy of the first terminal device, the processor 902 is configured to control the transceiver 901 to receive the target background traffic transfer policy of the first terminal device from a second device, where the second device is any one or more of the following: the first terminal device, the first policy control network element, a first service network element, or a first database network element, where the first policy control network element, the first service network element, and the first database network element serve the first terminal device.

In an optional implementation, when controlling the transceiver 901 to receive the target background traffic transfer policy of the first terminal device, the processor 902 is further configured to control the transceiver 901 to receive an identifier of the requesting device, or is further configured to control the transceiver 901 to receive an identifier of the first policy control network element, or is further configured to control the transceiver 901 to receive an identifier of the requesting device and an identifier of the first policy control network element.

In an optional implementation, the background traffic transmission data analysis result includes a first data value of a background traffic transmission time window. The background traffic transmission data analysis result further includes at least one of a first data value of a background traffic transmission bandwidth, the location information of the first terminal device, or the identifier of the first terminal device.

In an optional implementation, the background traffic transfer policy includes a second data value of the background traffic transmission time window. The background traffic transfer policy further includes at least one of a second data value of the background traffic transmission bandwidth, the location information of the first terminal device, or the identifier of the first terminal device.

In an optional implementation, the second information includes a volume of background traffic of the first terminal device. The second information further includes at least one of an identifier of the first policy control network element, an identifier of the requesting device, a third data value of the background traffic transmission time window for the first terminal device, the location information of the first terminal device, or the identifier of the first terminal device.

In an optional implementation, the first information includes the volume of the background traffic of the first terminal device. The first information further includes at least one of the identifier of the requesting device, the third data value of the background traffic transmission time window for the first terminal device, the location information of the first terminal device, or the identifier of the first terminal device.

In an optional implementation, the memory 903 is coupled to the processor 902, and is configured to store a program and the like. For example, the program may include program code, and the program code includes a computer executable instruction. The memory 903 may include a RAM, and may further include a non-volatile memory, for example, at least one magnetic disk memory. The processor 902 executes the application program stored in the memory 903, to implement the foregoing functions, thereby implementing the methods for determining a background traffic transfer policy shown in FIG. 2, FIG. 3, FIG. 4, FIG. 5A and FIG. 5B, and FIG. 6A and FIG. 6B.

In another embodiment, the communications apparatus shown in FIG. 9 may be configured to perform an operation performed by the first terminal device in the embodiment shown in FIG. 3, and may be further configured to perform an operation performed by the UE in the embodiment shown in FIG. 5A and FIG. 5B. For example, details are provided below.

The transceiver 901 is configured to implement communication interaction with another device connected to the first terminal device (for example, the UE), that is, configured to send and receive data.

The processor 902 is configured to: control the transceiver 901 to send first information to a first policy control network element, where the first information is used to request a background traffic transfer policy of a first terminal device; and control the transceiver 901 to receive the background traffic transfer policy of the first terminal device from the first policy control network element, where the background traffic transfer policy of the first terminal device is determined by the first policy control network element based on third information, and the third information includes a background traffic transmission data analysis result that is of the first terminal device and that is from a data analytics network element.

Therefore, according to the communications apparatus for determining a background traffic transfer policy, the background traffic transfer policy of the first terminal device is determined by the first policy control network element based on the third information, and the third information includes the background traffic transmission data analysis result that is of the first terminal device and that is from the data analytics network element. Therefore, the background traffic transfer policy of the first terminal device is determined by the first policy control network element with reference to another terminal device. In this way, the background traffic transfer policy of the first terminal device does not conflict with a background traffic transfer policy of the other terminal device, thereby avoiding a background traffic transmission failure.

In an optional implementation, the third information further includes a background traffic transmission query result of the first terminal device and/or a local background traffic transfer policy of the first terminal device.

In an optional implementation, when the first terminal device has one background traffic transfer policy, the processor 902 is further configured to: determine that the background traffic transfer policy of the first terminal device is a target background traffic transfer policy of the first terminal device; and control the transceiver 901 to send the target background traffic transfer policy of the first terminal device to the data analytics network element.

In an optional implementation, when the first terminal device has a plurality of background traffic transfer policies, the processor 902 is further configured to: select a target background traffic transfer policy of the first terminal device according to the background traffic transfer policies of the first terminal device; and control the transceiver 901 to send the target background traffic transfer policy of the first terminal device to the first policy control network element.

In an optional implementation, the processor 902 is further configured to control the transceiver to send the target background traffic transfer policy of the first terminal device to the data analytics network element.

In an optional implementation, the background traffic transmission data analysis result includes a first data value of a background traffic transmission time window. The background traffic transmission data analysis result further includes at least one of a first data value of a background traffic transmission bandwidth, the location information of the first terminal device, or the identifier of the first terminal device.

In an optional implementation, the background traffic transfer policy includes a second data value of the background traffic transmission time window. The background traffic transfer policy further includes at least one of a second data value of the background traffic transmission bandwidth, the location information of the first terminal device, or the identifier of the first terminal device.

In an optional implementation, the first information includes a volume of background traffic of the first terminal device. The first information further includes at least one of a third data value of the background traffic transmission time window for, the location information of, or the identifier of the first terminal device.

In an optional implementation, the background traffic transmission query result includes a fourth data value of the background traffic transmission time window. The background traffic transmission query result further includes at least one of a fourth data value of the background traffic transmission bandwidth, the location information of the first terminal device, or the identifier of the first terminal device.

In an optional implementation, the local background traffic transfer policy includes a fifth data value of the background traffic transmission time window. The local background traffic transmission result further includes at least one of a fifth data value of the background traffic transmission bandwidth, the location information of the first terminal device, or the identifier of the first terminal device.

In an optional implementation, before controlling the transceiver 901 to send the first information to the first policy control network element, the processor 902 is further configured to: control the transceiver 901 to obtain the volume of the background traffic of the first terminal device from the first service network element; and further control the transceiver 901 to obtain at least one of the third data value of the background traffic transmission time window for, the location information of, or the identifier of the first terminal device from the first service network element.

In an optional implementation, when controlling the transceiver 901 to receive the background traffic transfer policy of the first terminal device, the processor 902 is further configured to control the transceiver 901 to receive identification information from the first policy control network element, where the identification information is used to identify the target background traffic transfer policy of the first terminal device.

In an optional implementation, after controlling the transceiver 901 to receive the background traffic transfer policy of the first terminal device from the first policy control network element, the processor 902 is further configured to control the transceiver 901 to send the identification information to the first policy control network element.

In an optional implementation, the memory 903 is coupled to the processor 902, and is configured to store a program and the like. For example, the program may include program code, and the program code includes a computer executable instruction. The memory 903 may include a RAM, and may further include a non-volatile memory, for example, at least one magnetic disk memory. The processor 902 executes the application program stored in the memory 903, to implement the foregoing functions, thereby implementing the methods for determining a background traffic transfer policy shown in FIG. 3 and FIG. 5A and FIG. 5B.

In another embodiment, the communications apparatus shown in FIG. 9 may be configured to perform an operation performed by the first service network element in the embodiment shown in FIG. 4, and may be further configured to perform an operation performed by the AF in the embodiment shown in FIG. 6A and FIG. 6B. Example are described below.

The transceiver 901 is configured to implement communication interaction with another device connected to the first service network element (for example, the AF), that is, configured to send and receive data.

The processor 902 is configured to: control the transceiver 901 to send first information to a first policy control network element, where the first information is used to request a background traffic transfer policy of a first terminal device; and control the transceiver 901 to receive the background traffic transfer policy of the first terminal device from the first policy control network element, where the background traffic transfer policy of the first terminal device is determined by the first policy control network element based on third information, and the third information includes a background traffic transmission data analysis result that is of the first terminal device and that is from a data analytics network element.

Therefore, according to the communications apparatus for determining a background traffic transfer policy, the background traffic transfer policy of the first terminal device is determined by the first policy control network element based on the third information, and the third information includes the background traffic transmission data analysis result that is of the first terminal device and that is from the data analytics network element. Therefore, the background traffic transfer policy of the first terminal device is determined by the first policy control network element with reference to another terminal device. In this way, the background traffic transfer policy of the first terminal device does not conflict with a background traffic transfer policy of the other terminal device, thereby avoiding a background traffic transmission failure.

In an optional implementation, the third information further includes a background traffic transmission query result of the first terminal device and/or a local background traffic transfer policy of the first terminal device.

In an optional implementation, when the first terminal device has one background traffic transfer policy, the processor 902 is further configured to: determine that the background traffic transfer policy of the first terminal device is a target background traffic transfer policy of the first terminal device; and control the transceiver to send the target background traffic transfer policy of the first terminal device to the data analytics network element.

In an optional implementation, when the first terminal device has a plurality of background traffic transfer policies, the processor 902 is further configured to: select a target background traffic transfer policy of the first terminal device according to the background traffic transfer policies of the first terminal device; and control the transceiver 901 to send the target background traffic transfer policy of the first terminal device to the first policy control network element.

In an optional implementation, the processor 902 is further configured to control the transceiver 901 to send the target background traffic transfer policy of the first terminal device to the data analytics network element.

In an optional implementation, the background traffic transmission data analysis result includes a first data value of a background traffic transmission time window. The background traffic transmission data analysis result further includes at least one of a first data value of a background traffic transmission bandwidth, the location information of the first terminal device, or the identifier of the first terminal device.

In an optional implementation, the background traffic transfer policy includes a second data value of the background traffic transmission time window. The background traffic transfer policy further includes at least one of a second data value of the background traffic transmission bandwidth, the location information of the first terminal device, or the identifier of the first terminal device.

In an optional implementation, the first information includes the volume of the background traffic of the first terminal device. The first information further includes at least one of the identifier of the first service network element, the third data value of the background traffic transmission time window for the first terminal device, the location information of the first terminal device, or the identifier of the first terminal device.

In an optional implementation, the background traffic transmission query result includes a fourth data value of the background traffic transmission time window. The background traffic transmission query result further includes at least one of a fourth data value of the background traffic transmission bandwidth, the location information of the first terminal device, or the identifier of the first terminal device.

In an optional implementation, the local background traffic transfer policy includes a fifth data value of the background traffic transmission time window. The local background traffic transmission result further includes at least one of a fifth data value of the background traffic transmission bandwidth, the location information of the first terminal device, or the identifier of the first terminal device.

In an optional implementation, before controlling the transceiver 901 to send the first information to the first policy control network element, the processor 902 is further configured to: control the transceiver 901 to obtain the volume of the background traffic of the first terminal device from the first terminal device; and control the transceiver 901 to obtain at least one of the identifier of the first service network element, the third data value of the background traffic transmission time window for the first terminal device, the location information of the first terminal device, or the identifier of the first terminal device from the first terminal device.

In an optional implementation, when controlling the transceiver 901 to receive the background traffic transfer policy of the first terminal device from the first policy control network element, the processor 902 is further configured to control the transceiver 901 to receive identification information from the first policy control network element, where the identification information is used to identify the target background traffic transfer policy of the first terminal device.

In an optional implementation, after controlling the transceiver 901 to receive the background traffic transfer policy of the first terminal device from the first policy control network element, the processor 902 is further configured to control the transceiver 901 to send the identification information to the first policy control network element.

In an optional implementation, the memory 903 is coupled to the processor 902, and is configured to store a program and the like. For example, the program may include program code, and the program code includes a computer executable instruction. The memory 903 may include a RAM, and may further include a non-volatile memory, for example, at least one magnetic disk memory. The processor 902 executes the application program stored in the memory 903, to implement the foregoing functions, thereby implementing the methods for determining a background traffic transfer policy shown in FIG. 4, and FIG. 6A and FIG. 6B.

In conclusion, according to the method and apparatus for determining a background traffic transfer policy provided in the embodiments of this application, after receiving, from the requesting device, the first information for requesting the background traffic transfer policy of the first terminal device, the first policy control network element requests the background traffic transmission data analysis result of the first terminal device from the data analytics network element, and after receiving the data analysis result of the first terminal device from the data analytics network element, sends the background traffic transfer policy of the first terminal device to the requesting device. The data analysis result of the first terminal device is determined by the data analytics network element according to the target background traffic transfer policy of the second terminal device, the second terminal device is different from the first terminal device, and the target background traffic transfer policy of the second terminal device is used by the second terminal device to transmit background traffic. The background traffic transfer policy of the first terminal device is determined by the first policy control network element based on the third information, and the third information includes the background traffic transmission data analysis result of the first terminal device. According to the foregoing method, the data analytics network element may determine the background traffic transmission data analysis result of the first terminal device based on target background traffic transfer policies of another terminal device (that is, the second terminal device), such that the first policy control network element can determine the background traffic transfer policy of the first terminal device. Therefore, the background traffic transfer policy of the first terminal device is determined by the first policy control network element with reference to the other terminal devices. In this way, the background traffic transfer policy that is of the first terminal device and that is determined by the first policy control network element does not conflict with background traffic transfer policies of the other terminal devices, thereby avoiding a background traffic transmission failure.

Figure 10:
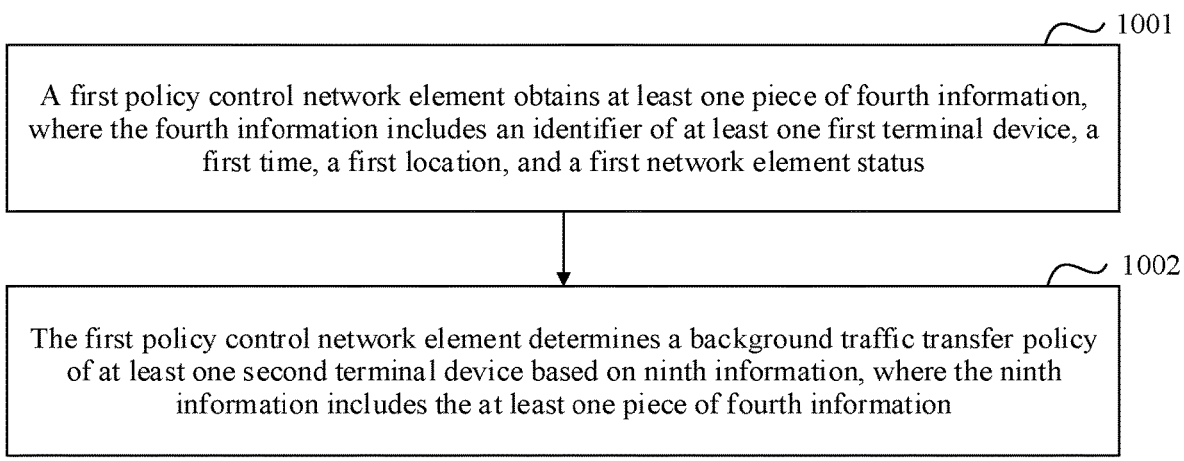
FIG. 10 is a flowchart of another method for determining a background traffic transfer policy according to this application.

An embodiment of this application further provides a method for determining a background traffic transfer policy. The method is also applicable to the communications system shown in FIG. 1. Referring to FIG. 10, a procedure of the method may include the following steps.

Step 1001. A first policy control network element obtains at least one piece of fourth information, where the fourth information includes an identifier of at least one first terminal device, a first time, a first location, and a first network element status.

Optionally, the identifier of the first terminal device may be at least one of an SUFI, a PEI, a GPSI, an IP 5-tuple, an IMSI, an IMEI, or an MSISDN.

The first time is a future moment, and the first location is a predicted location at which at least one first terminal device camps on the first time, that is, predicted track information. Optionally, the first location may be a network area (a TA List) or a routing area list (RA List), a cell (Cell ID), a radio access network (RAN ID), a Global Positioning System (GPS), or the like in which the at least one first terminal device is located at the first time.

For example, the at least one first terminal device camps on the first location at the first time, and has the first network element status. In other words, all of the at least one first terminal device camps on the first location at the first time, and has the first network element status.

In an optional implementation, the first network element status may include one or more of the following: a first load, a first capacity, and a first available bandwidth. The first load is a load of a first network element corresponding to the first location, and the first network element serves the first terminal device. The first capacity is a capacity of the first network element corresponding to the first location. The first available bandwidth is a bandwidth for the first network element corresponding to the first location. The first terminal device camps on the first location at the first time. For example, the first load, the first capacity, and the first available bandwidth may all be used to indicate an idle state or a busy state of the first network element. For example, when the first load is 80%, it indicates that the first network element still has 20% load that can be used to transmit background traffic of the at least one first terminal device. For another example, if the first capacity or the first available bandwidth is 1 gigabyte (GB), it indicates that the first network element still has a capacity or a bandwidth of 1 GB that can be used to transmit background traffic of the at least one first terminal device.

Optionally, the first network element may be a user plane network element (for example, a RAN or a UPF), a control plane network element (for example, an AMF or an SMF), or the like that serves the first terminal device. Optionally, if the first terminal device is a massive internet of things (mIoT) terminal, the AMF network element or the SMF network element may also be used as a user plane network element to transmit background traffic.

In an optional implementation, before the first policy control network element obtains the at least one piece of fourth information, the first policy control network element receives fifth information from a requesting device, where the fifth information is used to request the background traffic transfer policy of the at least one second terminal device. The fifth information may include an identifier of the requesting device and one or more of the following: a quantity of second terminal devices, a volume of background traffic that needs to be transmitted by each second terminal device, or a time window. Optionally, the fifth information may further include a network area (a TA List) or a routing area list (RA List)) in which the at least one second terminal device is located.

In an optional implementation, the requesting device serves the at least one second terminal device. For example, the requesting device may be a service network element that currently serves the at least one second terminal device, that is, may be the AF network element in FIG. 1, including an AF network element (for example, a proxy-call session control function (P-CSCF) network element) controlled by an operator, or may be a third-party AF network element, for example, a third-party service server.

The at least one first terminal device is a part or all of the at least one second terminal device. For example, the at least one first terminal device is a subset of the at least one second terminal device. In an optional implementation, when there are a plurality of second terminal devices, there may be a plurality of pieces of fourth information. One piece of fourth information corresponds to one group of first terminal devices, and one group of first terminal devices includes at least one first terminal device. In other words, the plurality of second terminal devices may include a plurality of groups of first terminal devices. A group of first terminal devices are at a same first location at the first time and have a same first network element status.

In an optional implementation, when the requesting device is a service network element, that the first policy control network element receives the fifth information from the requesting device may be as follows: The service network element may send the fifth information to the first policy control network element via a network exposure function network element. The foregoing process may be as follows: The service network element sends the fifth information to the network exposure function network element. Optionally, the service network element may send the fifth information to the network exposure function network element by invoking an Nnef_BDTPNegotiation_Create request service. Then, the network exposure function network element forwards the fifth information to the first policy control network element. Optionally, the network exposure function network element may send the fifth information to the first policy control network element by invoking an Npcf_BDTPolicyControl_Create request service.

In an optional implementation, the first policy control network element may obtain the at least one piece of fourth information in the following two manners.

f1: The first policy control network element obtains the at least one piece of fourth information from a data analytics network element.

f2: The first policy control network element obtains at least one piece of locally stored fourth information.

Optionally, in f1, the first policy control network element may obtain the at least one piece of fourth information from the data analytics network element after receiving the fifth information from the requesting device. Optionally, a method used by the first policy control network element to obtain the at least one piece of fourth information from the data analytics network element may be as follows: The first policy control network element sends sixth information to the data analytics network element, where the sixth information is used to request the at least one piece of fourth information, and the sixth information includes an identifier of the at least one second terminal device. The first policy control network element receives the at least one piece of fourth information from the data analytics network element.

In an optional implementation, the sixth information further includes one or more of the following: the identifier of the requesting device, a time window, or a network area. The time window is used to indicate a time window corresponding to the at least one requested second terminal device, and the network area is used to indicate a network area corresponding to the at least one requested second terminal device.

Optionally, in f2, the first policy control network element may locally store the at least one piece of fourth information in advance before receiving the fifth information from the requesting device. Optionally, the first policy control network element may store at least one piece of seventh information corresponding to at least one third terminal device, where the seventh information includes an identifier of at least one fourth terminal device, the first time, the first location, and the first network element status. The at least one fourth terminal device is a part or all of the at least one third terminal device, and the at least one third terminal device includes the at least one second terminal device. In this case, after receiving the fifth information of the requesting device, the first policy control network element determines the at least one piece of fourth information in the stored at least one piece of seventh information. For example, a method used by the first policy control network element to determine the at least one piece of fourth information in the stored at least one piece of seventh information may be as follows: The first policy control network element selects, from the at least one piece of seventh information, information corresponding to a fourth terminal device whose identifier is the same as the identifier of the second terminal device, to select the at least one piece of fourth information.

Optionally, the at least one piece of seventh information locally stored by the first policy control network element may be obtained by the first policy control network element from the data analytics network element. Optionally, in this scenario, when the first policy control network element obtains, from the data analytics network element, the at least one piece of seventh information that needs to be locally stored, a method may be as follows: The first policy control network element sends eighth information to the data analytics network element, where the eighth information is used to request the at least one piece of seventh information, and the eighth information includes an identifier of the at least one third terminal device. The first policy control network element receives the at least one piece of seventh information from the data analytics network element. In an optional implementation, the eighth information further includes one or more of the following: the identifier of the requesting device, the time window, or the network area. The time window is used to indicate a time window corresponding to the requested at least one piece of seventh information, and the network area is used to indicate a network area corresponding to the requested at least one piece of seventh information.

In an optional implementation, the following operation is further performed: The first policy control network element obtains the identifier of the at least one second terminal device. Optionally, the operation may be performed before the first policy control network element obtains the at least one piece of fourth information. For example, the operation may be performed after the first policy control network element receives the fifth information and before the first policy control network element obtains the at least one piece of fourth information.

Optionally, the first policy control network element may obtain the identifier of the at least one second terminal device using the following two methods.

Method g1: The first policy control network element receives the identifier of the at least one second terminal device from the requesting device.

Method g2: The first policy control network element receives the identifier of the requesting device from the requesting device, and obtains the identifier of the at least one second terminal device by querying the first policy control network element or a database network element based on the identifier of the requesting device.

In the foregoing method g1, the first policy control network element may receive the identifier of the at least one second terminal device by receiving the fifth information from the requesting device. In other words, in this case, the fifth information includes the identifier of the at least one second terminal device.

In the foregoing method g2, the identifier of the requesting device received by the first policy control network element from the requesting device comes from the fifth information received by the first policy control network element from the requesting device. In this case, the fifth information does not include the identifier of the at least one second terminal device. Optionally, during the query, background traffic transmission indication information may be included in a query request, to indicate that the identifier of the at least one second terminal device that needs to transmit background traffic is to be queried for.

Step 1002. The first policy control network element determines the background traffic transfer policy of the at least one second terminal device based on ninth information, where the ninth information includes the at least one piece of fourth information.

In an optional implementation, the ninth information may further include the fifth information, and the ninth information may further include a background traffic transmission query result of the at least one second terminal device and/or a local background traffic transmission query result of the at least one second terminal device.

In an optional implementation, when the ninth information further includes the background traffic transmission query result of the at least one second terminal device, the first policy control network element obtains the background traffic transmission query result of the at least one second terminal device from the database network element. Alternatively, when the ninth information further includes the local background traffic transfer policy of the at least one second terminal device, the first policy control network element obtains the local background traffic transfer policy of the at least one second terminal device from the first policy control network element. Alternatively, when the ninth information further includes the background traffic transmission query result of the at least one second terminal device and the local background traffic transfer policy of the at least one second terminal device, the first policy control network element obtains the background traffic transmission query result of the at least one second terminal device from the database network element, and obtains the local background traffic transfer policy of the at least one second terminal device from the first policy control network element.

In an optional implementation, a method used by the first policy control network element to determine the background traffic transfer policy of the at least one second terminal device based on the ninth information may be as follows.

First, the first policy control network element may determine distribution of the at least one piece of fourth information in the ninth information based on the identifier of the at least one second terminal device. To be more specific, it is assumed that in step 1001, the first policy control network element obtains three pieces of fourth information from the data analytics network element, to be more specific, the data analytics network element classifies the at least one second terminal device into three categories, and each category corresponds to a subset 1, a subset 2, or a subset 3 of the at least one second terminal device.

Then, the first policy control network element determines, based on a first time, a first location, and a first network element status in each piece of fourth information, that the subset 1, the subset 2, or the subset 3 of the at least one second terminal device is located at the first location at the first time and has the first network status at the first location.

Finally, the first policy control network element determines a background traffic transfer policy of each second terminal device based on that the subset 1, the subset 2, or the subset 3 of the at least one second terminal device is located at the first location at the first time and has the first network status at the first location, and a volume of background traffic to be transmitted by each second terminal device. For example, the subset 1 of the at least one second terminal device includes 10 second terminal devices, each second terminal device needs to transmit 60 megabits (Mbs) background traffic, all of the 10 second terminal devices are located in a same cell from 00:00 to 01:00, and an available capacity of a base station corresponding to the cell is 60 MB or more than 60 MB. In this case, a background traffic transfer policy formulated for the 10 second terminal devices included in the subset 1 of the second terminal device may be as follows: (1) time window: 00:00 to 01:00; and (2) bandwidth: 1 megabits per second (Mb/s).

It should be noted that the foregoing is only an example of obtaining the background traffic transfer policy of the at least one second terminal device by the first policy control network element. In an implementation process, the first policy control network element needs to refer to the at least one piece of fourth information or the fifth information in the ninth information, the background traffic transmission query result of the at least one second terminal device and/or the local background traffic transfer policy of the at least one second terminal device.

In an optional implementation, after the first policy control network element determines the background traffic transfer policy of the at least one second terminal device based on the ninth information, the first policy control network element sends the background traffic transfer policy of the at least one second terminal device to the requesting device.

In an optional implementation, any one of the at least one second terminal device may have one or more traffic transfer policies. For example, the background traffic transfer policy of the second terminal device may include a seventh data value of a background traffic transmission time window. The background traffic transfer policy of the second terminal device further includes one or more of the following: a seventh data value of a background traffic transmission bandwidth, location information of the second terminal device, and an identifier of the second terminal device.

Optionally, when the second terminal device has one background traffic transfer policy, the first policy control network element may further perform the following operations.

The first policy control network element determines that the background traffic transfer policy of the second terminal device is a target background traffic transfer policy of the second terminal device.

The first policy control network element sends the target background traffic transfer policy of the second terminal device to the data analytics network element.

Optionally, when the second terminal device has a plurality of background traffic transfer policies, the first policy control network element may further perform the following operations.

The first policy control network element receives a target background traffic transfer policy of the second terminal device from the requesting device, where the target background traffic transfer policy of the second terminal device is selected by the requesting device according to the background traffic transfer policies of the second terminal device.

The first policy control network element sends the target background traffic transfer policy of the second terminal device to the data analytics network element.

The first policy control network element sends the target background traffic transfer policy of the second terminal device to the data analytics network element, and the data analytics network element may store the target background traffic transfer policy of the second terminal device. In this way, if the requesting device requests background traffic policies of other new terminal devices next time, when determining a movement track (including a time and a location) and a network element status of a corresponding network element on the movement track for each of the new terminal devices, the data analytics network element may refer to the stored target background traffic transfer policy of the second terminal device, such that a network element status is more accurate.

In an optional implementation, when the requesting device is a service network element, a process in which the first policy control network element sends the background traffic transfer policy of the at least one second terminal device to the service network element may be as follows: The first policy control network element sends the background traffic transfer policy of the at least one second terminal device to the service network element via the network exposure function network element. For example, the first policy control network element sends the background traffic transfer policy of the at least one second terminal device to the network exposure function network element. Optionally, the first policy control network element may send the background traffic transfer policy of the at least one second terminal device to the network exposure function network element by invoking an Npcf_BDT Policy Control_Create response service. Then, the network exposure function network element sends the background traffic transfer policy of the at least one second terminal device to the service network element. Optionally, the network exposure function network element may send the background traffic transfer policy of the at least one second terminal device to the service network element by invoking an Nnef_BDT PNegotiation_Create response service.

According to the method for determining a background traffic transfer policy provided in this embodiment of this application, the first policy control network element obtains the at least one piece of fourth information, where the fourth information includes the identifier of the at least one first terminal device, the first time, the first location, and the first network element status; the first policy control network element determines the background traffic transfer policy of the at least one second terminal device based on the ninth information, where the ninth information includes the at least one piece of fourth information, the at least one first terminal device is a part or all of the at least one second terminal device, and the at least one first terminal device camps on the first location at the first time, and has the first network element status. According to the foregoing method, when formulating the background traffic transfer policy of the at least one second terminal device, the first policy control network element may consider a movement track (including the first time and the first location) of each second terminal device and the first network element status at the first location. In this way, the background traffic transfer policy of the at least one second terminal device formulated by the first policy control network element is more accurate.

It should be noted that both the first location of the at least one first terminal device and the first network element status are closely related to the first time. That is, when the at least one first terminal device moves to the first location at the first time, a network element (the first network element) at the first location has the first network element status; when the at least one first terminal device moves to another location at another time, a network element at the other location corresponds to another network element status.

Figure 11:
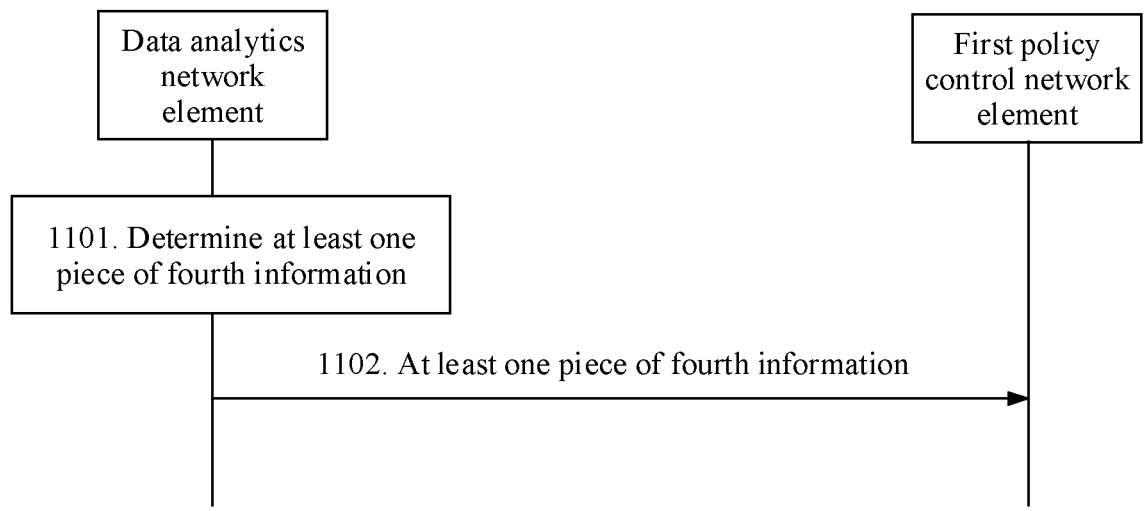
FIG. 11 is a flowchart of another method for determining a background traffic transfer policy according to this application.

An embodiment of this application further provides a method for determining a background traffic transfer policy. The method is also applicable to the communications system shown in FIG. 1. Referring to FIG. 11, a procedure of the method may include the following steps.

Step 1101. A data analytics network element determines at least one piece of fourth information, where the fourth information includes an identifier of at least one first terminal device, a first time, a first location, and a first network element status, the at least one first terminal device is a part or all of at least one second terminal device, and the at least one first terminal device camps on the first location at the first time, and has the first network element status.

The at least one second terminal device is to transmit background traffic, and needs to obtain a background traffic transfer policy.

Optionally, the first network element status includes one or more of the following: a first load, a first capacity, and a first available bandwidth. The first load is a load of a first network element corresponding to the first location, and the first network element serves the first terminal device. The first capacity is a capacity of the first network element corresponding to the first location. The first available bandwidth is a bandwidth for the first network element corresponding to the first location. The first terminal device camps on the first location at the first time.

For detailed descriptions of the first terminal device, the second terminal device, the first network element, and content included in the fourth information, refer to related content in the embodiment in FIG. 10, and details are not described herein again.

In an optional implementation, before the data analytics network element determines the at least one piece of fourth information, the data analytics network element receives sixth information from a first policy control network element, where the sixth information is used to request the at least one piece of fourth information, and the sixth information includes an identifier of the at least one second terminal device.

In an optional implementation, a method used by the data analytics network element to determine the at least one piece of fourth information may be as follows.

The data analytics network element obtains at least one piece of tenth information of the at least one second terminal device on a third network element, where the tenth information includes the identifier of the second terminal device, a second time, a second location, and a second network element status, the second terminal device camps on the second location at the second time, and has the second network element status, and the third network element serves the at least one second terminal device.

The data analytics network element determines the at least one piece of fourth information based on the at least one piece of tenth information of the second terminal device.

For example, the third network element may be one or more of an access device, a functional network element in 5G, and an OAM. The at least one piece of tenth information of the second terminal device is at least one piece of historical information of the second terminal device, and each piece of historical information includes information included in the tenth information.

Optionally, the data analytics network element may directly obtain the at least one piece of tenth information of the at least one second terminal device on the third network element from the third network element, or may obtain the at least one piece of tenth information of the at least one second terminal device on the third network element from another device. For example, when the information is obtained from another device, and when the third network element is one or more of an access network device or a functional network element in 5G, the data analytics network element may obtain the at least one piece of tenth information of the at least one second terminal device on the third network element from an OAM network element.

For example, a process in which the data analytics network element determines the at least one piece of fourth information may be explained as follows: The data analytics network element first collects a historical movement track of each second terminal device and historical network element statuses of a network element corresponding to different locations at different time points from the third network element based on the identifier of the at least one second terminal device. The data analytics network element predicts, based on the collected data, a predicted movement track of each of the at least one second terminal device, that is, a future location to which each second terminal device moves at a future time. Then, the data analytics network element groups the at least one second terminal device based on the predicted movement track of each second terminal device, where second terminal devices in each group camp on a same location at a same future time. For example, a group of second terminal devices is the at least one first terminal device, and the at least one first terminal device camps on the first location at the first time. Finally, the data analytics network element predicts, based on a historical network element status of a network element corresponding to a future location on which each group of second terminal devices obtained after the grouping camp, a network element status of the network element corresponding to the location on which the group of second terminal devices camp at a future time. For example, a group of second terminal devices camp on the first location at the first time and have the first network element status. In this way, the data analytics network element obtains related information that at least one group of second terminal devices have a specific network element status at a specific location at a specific time. That is, the data analytics network element determines the at least one piece of fourth information based on the at least one piece of tenth information of each second terminal device.

It should be noted that, in an actual implementation process, the data analytics network element may determine the at least one piece of fourth information using, but not limited to, the analysis method in the foregoing implementation. For example, after collecting the historical movement track of each second terminal device and the historical network element statuses of the network element corresponding to the different locations at the different time points, the data analytics network element may cluster or classify the at least one second terminal device based on the information. Second terminal devices of a same category correspond to a same time, a same location, and same network element status information.

In an optional implementation, the second network element status includes one or more of the following: a second load, a second capacity, and a second available bandwidth. The second load is a load of a second network element corresponding to the second location, and the second network element serves the second terminal device. The second capacity is a capacity of the second network element corresponding to the second location. The second bandwidth is a bandwidth for the second network element corresponding to the second location. The second terminal device camps on the second location at the second time.

Step 1102. The data analytics network element sends the at least one piece of fourth information to the first policy control network element.

According to the method for determining a background traffic transfer policy provided by this embodiment of this application, the data analytics network element determines the at least one piece of fourth information, where the fourth information includes the identifier of the at least one first terminal device, the first time, the first location, and the first network element status, the at least one first terminal device is a part or all of the at least one second terminal device, and the at least one first terminal device camps on the first location at the first time, and has the first network element status. The data analytics network element sends the at least one piece of fourth information to the first policy control network element. According to the foregoing method, the data analytics network element may send, to the first policy control network element, a predicted network element status corresponding to the future specific time and location of the terminal device that is to transmit background traffic, such that the first policy control network element can more accurately determine the background traffic transfer policy of the second terminal device, thereby improving a success rate of transmitting background traffic.

Figure 12A:
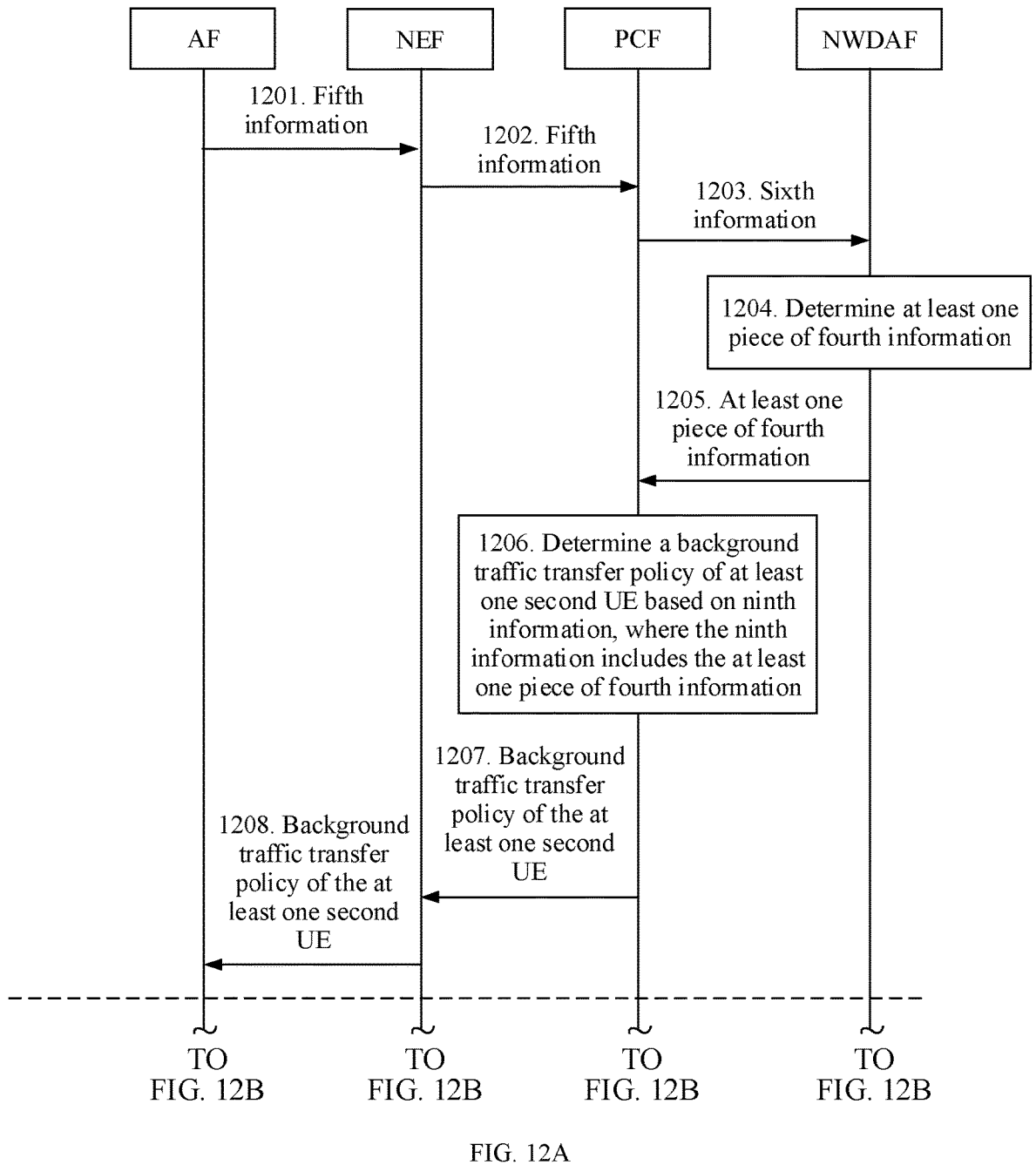
FIG. 12A and FIG. 12B are flowcharts of an example of another method for determining a background traffic transfer policy according to this application.
Figure 12B:
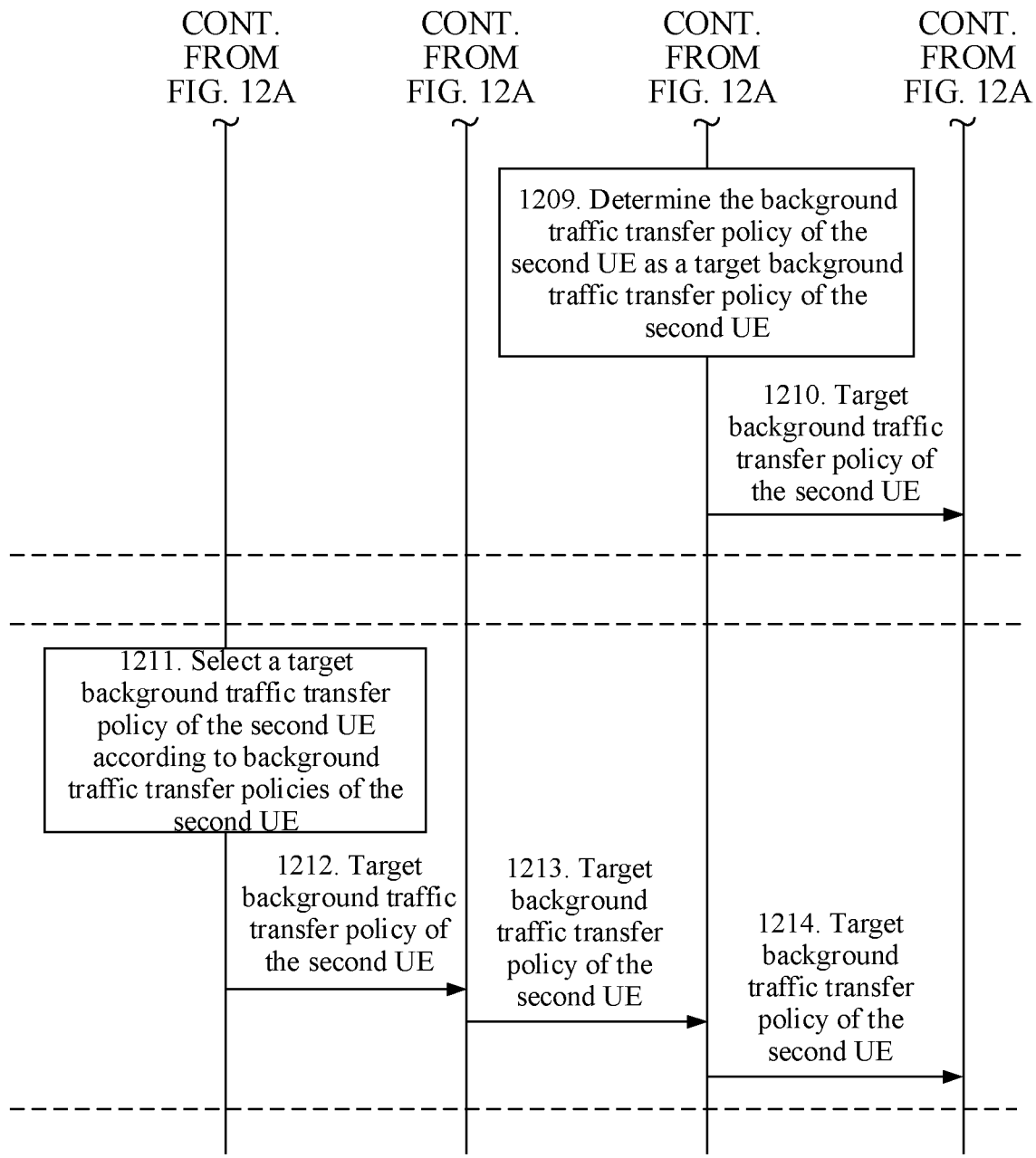

Based on the foregoing embodiments, an embodiment of this application further provides an example of a method for determining a background traffic transfer policy. As shown in FIG. 12A and FIG. 12B, in the example, in a process in which a service network element requests a background traffic transfer policy for at least one second terminal device, a data analytics network element provides prediction information (that is, at least one piece of fourth information). An example in which the service network element is an AF, a terminal device is a UE, a first policy control network element is a PCF, and the data analytics network element is an NWDAF is used for description. A procedure of the example may include the following steps.

Step 1201. The AF sends fifth information to an NEF, where the fifth information is used to request a background traffic transfer policy of at least one second UE.

The NEF is an example of a network exposure function network element. The NEF herein may alternatively be replaced with another network exposure function network element. This is not limited in this application.

For example, the AF may send the fifth information to the NEF by invoking an Nnef_BDTPNegotiation_Create request service or an Nnef_Trigger_Delivery request service.

Step 1202. The NEF sends the fifth information to the PCF.

For example, the NEF may send the fifth information to the PCF by invoking an Npcf_BDTPolicyControl_Create request service or an Npcf_PolicyAuthorization_Create request service.

Step 1203. The PCF sends sixth information to the NWDAF, where the sixth information is used to request at least one piece of fourth information, and the sixth information includes an identifier of the at least one second UE.

For example, the PCF sends the sixth information to the NWDAF by initiating an Nnwdaf_AnalyticsInfo_Request service operation to the NWDAF.

Step 1204. The NWDAF determines the at least one piece of fourth information, where the fourth information includes an identifier of at least one first UE, a first time, a first location, and a first network element status, the at least one first UE is a part or all of the at least one second UE, and the at least one first UE camps on the first location at the first time, and has the first network element status.

Step 1205. The NWDAF sends the at least one piece of fourth information to the PCF.

For example, the NWDAF returns the at least one piece of fourth information by initiating an Nnwdaf_AnalyticsInfo_Request response service operation to the PCF.

Step 1206. The PCF determines the background traffic transfer policy of the at least one second UE based on ninth information, where the ninth information includes the at least one piece of fourth information.

Step 1207. The PCF sends the background traffic transfer policy of the at least one second UE to the NEF.

For example, the PCF may send the background traffic transfer policy of the at least one second UE to the NEF by invoking an Npcf_BDT Policy Control_Create response service or an Npcf_PolicyAuthorization_Notify service.

Step 1208. The NEF sends the background traffic transfer policy of the at least one second UE to the AF.

For example, the NEF may send the background traffic transfer policy of the at least one second UE to the AF by invoking an Nnef_BDT PNegotiation_Create response service or an Nnef_Trigger_Delivery response service.

In a possible implementation, when the second UE has one background traffic transfer policy, after or before step 1208, the PCF may perform step 1209 and step 1210. Details are as follows:

Step 1209. The PCF determines that the background traffic transfer policy of the second UE is a target background traffic transfer policy of the second UE.

Step 1210. The PCF sends the target background traffic transfer policy of the second UE to the NWDAF.

Optionally, the PCF may further send the target background traffic transfer policy of the second UE to a UDR.

Optionally, when the second UE has one background traffic transfer policy, step 1209 may be omitted, and the PCF may directly send the background traffic transfer policy of the second UE to the NWDAF. Details are not described herein again.

In another possible implementation, when the second UE has a plurality of background traffic transfer policies, after step 1208, the following steps may be further included.

Step 1211. The AF selects a target background traffic transfer policy of the second UE according to the background traffic transfer policies of the second UE.

Step 1212. The AF sends the target background traffic transfer policy of the second UE to the NEF.

For example, the AF may send the target background traffic transfer policy of the second UE to the NEF by invoking an Nnef_BDTPNegotiation_Update request service or an Nnef_Trigger_Delivery request service.

Step 1213. The NEF sends the target background traffic transfer policy of the second UE to the PCF.

For example, the NEF may send the target background traffic transfer policy of the second UE to the PCF by invoking an Npcf_BDTPolicyControl_Update request service or an Npcf_PolicyAuthorization_Update request service.

Step 1214. The PCF sends the target background traffic transfer policy of the second UE to the NWDAF.

Optionally, the PCF may further send the target background traffic transfer policy of the second UE to the UDR.

For example, step 1214 and step 1210 are the same. Herein, two steps are shown for ease of illustrating two possible implementations.

It should be noted that, for implementation details of each step in the embodiment shown in FIG. 12A and FIG. 12B, refer to related descriptions in the foregoing embodiments shown in FIG. 10 and FIG. 11. Details are not described herein again.

It should be noted that in step 1207, step 1208, step 1210, and step 1214, one or more pieces of identification information may be included, to identify the target background traffic transfer policy of the at least one second terminal device.

(1) When there is one piece of identification information, it indicates that target background traffic transfer policies of all of the at least one second terminal device are the same.

(2) When there are a plurality of pieces of identification information, it indicates that target background traffic transfer policies of some of the at least one second terminal device are different. In this case, each of the plurality of pieces of identification information is used to identify one target background traffic transfer policy, and the target background traffic transfer policy corresponds to one or more second terminal devices.

It should be noted that after step 1214, the first policy control network element may send the background traffic transfer policy of the second terminal device to the second terminal device using, but not limited to, a PDU session modification procedure. For a procedure, refer to the embodiment in FIG. 2. Optionally, the first policy control network element may alternatively send the background traffic transfer policy of the second terminal device to the second terminal device using a plurality of other procedures such as a PDU session establishment procedure, a registration procedure, a service request procedure, and a UE configuration update procedure (UE Configuration Update). Optionally, when the registration procedure or the terminal configuration update procedure is used, the first policy control network element may include the background traffic transfer policy of the second terminal device in a UE route selection policy (URSP) of the second terminal device, and send the UE route selection policy to the second terminal device. Descriptions of the plurality of other procedures such as the PDU session establishment procedure, the registration procedure, the service request procedure, and the UE configuration update procedure (UE Configuration Update) are not provided herein.

The foregoing embodiments provided in this application describe, from a perspective of interaction between network elements or devices, the solutions of the method for determining a background traffic transfer policy provided in the embodiments of this application. It may be understood that, to implement the foregoing functions, the network elements and devices, for example, the first policy control network element, the data analytics network element, the first service network element, the first terminal device, and the second terminal device, each include corresponding hardware structures and/or software modules for performing the functions. A person skilled in the art should easily be aware that, in combination with units and algorithm steps of the examples described in the embodiments disclosed in this application, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

For example, when the network element or the device implements a corresponding function using a software module, a communications apparatus for determining a background traffic transfer policy may include an obtaining module 1301 and a processing module 1302, and optionally, may further include a sending module 1303. For details, refer to a schematic structural diagram shown in FIG. 13.

Figure 13:
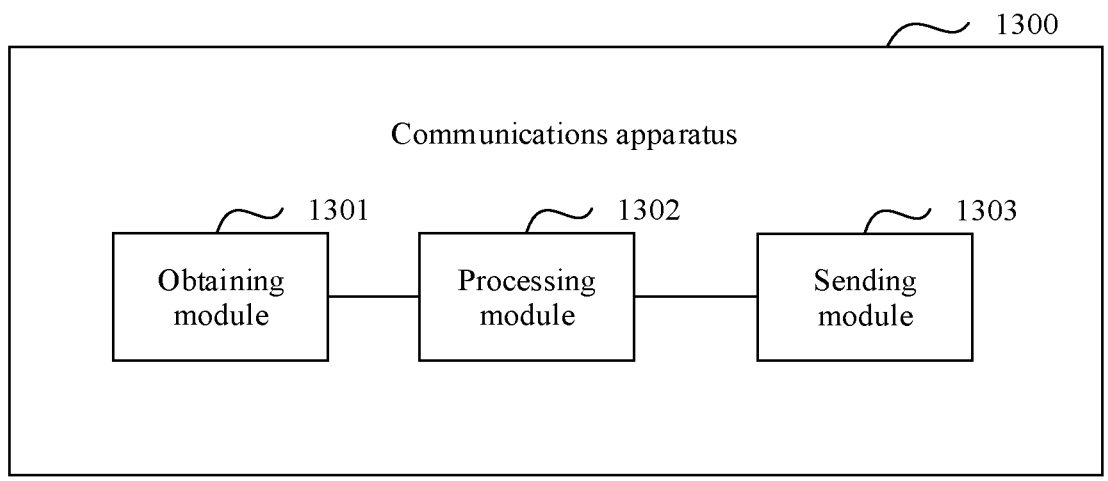
FIG. 13 is a schematic structural diagram of another communications apparatus for determining a background traffic transfer policy according to this application.

In an embodiment, the communications apparatus shown in FIG. 13 may be configured to perform an operation performed by the first policy control network element in the embodiments shown in FIG. 10 and FIG. 11, and configured to perform an operation performed by the PCF in the embodiment shown in FIG. 12A and FIG. 12B. Examples are described below.

The obtaining module 1301 is configured to obtain at least one piece of fourth information, where the fourth information includes an identifier of at least one first terminal device, a first time, a first location, and a first network element status.

The processing module 1302 is configured to determine a background traffic transfer policy of at least one second terminal device based on ninth information, where the ninth information includes the at least one piece of fourth information, the at least one first terminal device is a part or all of the at least one second terminal device, and the at least one first terminal device camps on the first location at the first time, and has the first network element status.

Therefore, according to the communications apparatus for determining a background traffic transfer policy, during formulation the background traffic transfer policy of the at least one second terminal device, a movement track (including the first time and the first location) of each second terminal device and the first network element status at the first location may be considered. In this way, the background traffic transfer policy of the at least one second terminal device formulated by the first policy control network element is more accurate.

In an optional implementation, the obtaining module 1301 is further configured to receive an identifier of the at least one second terminal device from a requesting device, where the requesting device serves the at least one second terminal device.

In an optional implementation, the obtaining module 1301 is further configured to receive an identifier of a requesting device from the requesting device. Then, the processing module 1302 is further configured to obtain the identifier of the at least one second terminal device by querying the first policy control network element or a database network element based on the identifier of the requesting device.

In an optional implementation, when obtaining the at least one piece of fourth information, the obtaining module 1301 is configured to obtain the at least one piece of fourth information from a data analytics network element, or obtain at least one piece of locally stored fourth information.

In an optional implementation, the first network element status includes one or more of the following: a first load, a first capacity, and a first available bandwidth. The first load is a load of a first network element corresponding to the first location, and the first network element serves the first terminal device. The first capacity is a capacity of the first network element corresponding to the first location. The first available bandwidth is a bandwidth for the first network element corresponding to the first location. The first terminal device camps on the first location at the first time.

In an optional implementation, the sending module 1303 is configured to: after the processing module 1302 determines the background traffic transfer policy of the at least one second terminal device based on the ninth information, send the background traffic transfer policy of the at least one second terminal device to the requesting device, where the requesting device serves the at least one second terminal device.

In an optional implementation, when the second terminal device has one background traffic transfer policy, the processing module 1302 is further configured to determine that the background traffic transfer policy of the second terminal device is a target background traffic transfer policy of the second terminal device. The sending module 1303 is further configured to send the target background traffic transfer policy of the second terminal device to the data analytics network element.

In an optional implementation, when the second terminal device has a plurality of background traffic transfer policies, the obtaining module 1301 is further configured to receive a target background traffic transfer policy of the second terminal device from the requesting device, where the target background traffic transfer policy of the second terminal device is selected by the requesting device according to the background traffic transfer policies of the second terminal device. The sending module 1303 is further configured to send the target background traffic transfer policy of the second terminal device to the data analytics network element.

In an optional implementation, the background traffic transfer policy of the second terminal device may include a seventh data value of a background traffic transmission time window. The background traffic transfer policy of the second terminal device further includes one or more of the following: a seventh data value of a background traffic transmission bandwidth, location information of the second terminal device, and an identifier of the second terminal device.

For another example, when the network element or the device implements a corresponding function using a software module, a communications apparatus for determining a background traffic transfer policy may alternatively include a processing module 1401 and a sending module 1402. For details, refer to a schematic structural diagram shown in FIG. 14.

Figure 14:
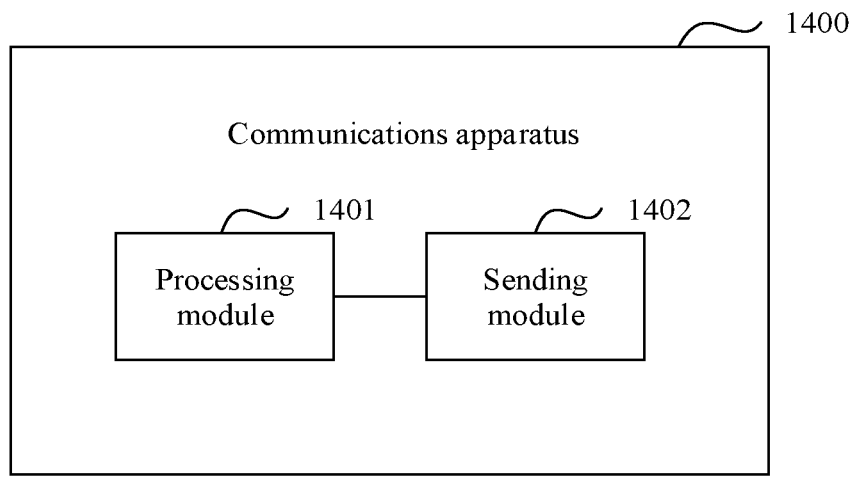
FIG. 14 is a schematic structural diagram of another communications apparatus for determining a background traffic transfer policy according to this application.

In an embodiment, the communications apparatus shown in FIG. 14 may be configured to perform an operation performed by the data analytics network element in the embodiments shown in FIG. 10 and FIG. 11, and may be configured to perform an operation performed by the NWDAF in the embodiment shown in FIG. 12A and FIG. 12B. Examples are described below.

The processing module 1401 is configured to determine at least one piece of fourth information, where the fourth information includes an identifier of at least one first terminal device, a first time, a first location, and a first network element status, the at least one first terminal device is a part or all of at least one second terminal device, and the at least one first terminal device camps on the first location at the first time, and has the first network element status.

The sending module 1402 is configured to send the at least one piece of fourth information to a first policy control network element.

Therefore, according to the communications apparatus for determining a background traffic transfer policy, a predicted network element status corresponding to the future specific time and location of the terminal device that is to transmit background traffic may be sent to the first policy control network element, such that the first policy control network element can more accurately determine the background traffic transfer policy of the second terminal device, thereby improving a success rate of transmitting background traffic.

In an optional implementation, when determining the at least one piece of fourth information, the processing module 1401 is configured to: obtain at least one piece of tenth information of the at least one second terminal device on a third network element, where the tenth information includes an identifier of the second terminal device, a second time, a second location, and a second network element status, and the second terminal device camps on the second location at the second time, and has the second network element status; and determine the at least one piece of fourth information based on the at least one piece of tenth information of the at least one second terminal device. The third network element serves the at least one second terminal device.

In an optional implementation, the second network element status includes one or more of the following: a second load, a second capacity, and a second available bandwidth. The second load is a load of a second network element corresponding to the second location, and the second network element serves the second terminal device. The second capacity is a capacity of the second network element corresponding to the second location. The second bandwidth is a bandwidth for the second network element corresponding to the second location. The second terminal device camps on the second location at the second time.

In an optional implementation, the first network element status includes one or more of the following: a first load, a first capacity, and a first available bandwidth. The first load is a load of a first network element corresponding to the first location, and the first network element serves the first terminal device. The first capacity is a capacity of the first network element corresponding to the first location. The first available bandwidth is a bandwidth for the first network element corresponding to the first location. The first terminal device camps on the first location at the first time.

In an embodiment, the communications apparatus shown in FIG. 9 may be configured to perform an operation performed by the first policy control network element in the embodiments shown in FIG. 10 and FIG. 11, and may be further configured to perform an operation performed by the PCF in the embodiment shown in FIG. 12A and FIG. 12B. Examples are described below.

The transceiver 901 is configured to implement communication interaction with another device connected to the first policy control network element (for example, the PCF), that is, configured to send and receive data.

The processor 902 is configured to: obtain at least one piece of fourth information, where the fourth information includes an identifier of at least one first terminal device, a first time, a first location, and a first network element status; and determine a background traffic transfer policy of at least one second terminal device based on ninth information, where the ninth information includes the at least one piece of fourth information, the at least one first terminal device is a part or all of the at least one second terminal device, and the at least one first terminal device camps on the first location at the first time, and has the first network element status.

Therefore, according to the communications apparatus for determining a background traffic transfer policy, during formulation of the background traffic transfer policy of the at least one second terminal device, a movement track (including the first time and the first location) of each second terminal device, a first network element status at the first location may be considered, and a volume of background traffic of, a time window for, and a network area of each second terminal device that are reported by a requesting device. Optionally, it may be considered that a background traffic transmission query result of the at least one second terminal device and/or a local background traffic transmission query result of the at least one second terminal device are/is included. In this way, the background traffic transfer policy of the at least one second terminal device formulated by the first policy control network element is more accurate.

In an optional implementation, the processor 902 is further configured to control the transceiver 901 to receive an identifier of the at least one second terminal device from the requesting device, where the requesting device serves the at least one second terminal device.

In an optional implementation, the processor 902 is further configured to control the transceiver 901 to: receive an identifier of the requesting device from the requesting device, and obtain an identifier of the at least one second terminal device by querying the first policy control network element or a database network element based on the identifier of the requesting device.

In an optional implementation, when obtaining the at least one piece of fourth information, the processor 902 is configured to control the transceiver 901 to obtain the at least one piece of fourth information from a data analytics network element, or obtain at least one piece of locally stored fourth information.

In an optional implementation, the first network element status includes one or more of the following: a first load, a first capacity, and a first available bandwidth. The first load is a load of a first network element corresponding to the first location, and the first network element serves the first terminal device. The first capacity is a capacity of the first network element corresponding to the first location. The first available bandwidth is a bandwidth for the first network element corresponding to the first location. The first terminal device camps on the first location at the first time.

In an optional implementation, after determining the background traffic transfer policy of the at least one second terminal device based on the ninth information, the processor 902 is further configured to control the transceiver 901 to send the background traffic transfer policy of the at least one second terminal device to the requesting device, where the requesting device serves the at least one second terminal device.

In an optional implementation, when the second terminal device has one background traffic transfer policy, the processor 902 is further configured to: determine that the background traffic transfer policy of the second terminal device is a target background traffic transfer policy of the second terminal device; and control the transceiver 901 to send the target background traffic transfer policy of the second terminal device to the data analytics network element.

In an optional implementation, when the second terminal device has a plurality of background traffic transfer policies, the processor 902 is further configured to: receive a target background traffic transfer policy of the second terminal device from the requesting device, where the target background traffic transfer policy of the second terminal device is selected by the requesting device according to the background traffic transfer policies of the second terminal device; and control the transceiver 901 to send the target background traffic transfer policy of the second terminal device to the data analytics network element.

In an optional implementation, the background traffic transfer policy of the second terminal device may include a seventh data value of a background traffic transmission time window. The background traffic transfer policy of the second terminal device further includes one or more of the following: a seventh data value of a background traffic transmission bandwidth, location information of the second terminal device, and an identifier of the second terminal device.

In another embodiment, the communications apparatus shown in FIG. 9 may be configured to perform an operation performed by the data analytics network element in the embodiments shown in FIG. 10 and FIG. 11, and may be further configured to perform an operation performed by the NWDAF in the embodiment shown in FIG. 12A and FIG. 12B. Examples are described below.

The transceiver 901 is configured to implement communication interaction with another device connected to the data analytics network element (for example, the NWDAF), that is, configured to send and receive data.

The processor 902 is configured to: determine at least one piece of fourth information, where the fourth information includes an identifier of at least one first terminal device, a first time, a first location, and a first network element status, the at least one first terminal device is a part or all of at least one second terminal device, and the at least one first terminal device camps on the first location at the first time, and has the first network element status; and control the transceiver 901 to send the at least one piece of fourth information to a first policy control network element.

Therefore, according to the communications apparatus for determining a background traffic transfer policy, a predicted network element status corresponding to the future specific time and location of the terminal device that is to transmit background traffic may be sent to the first policy control network element, such that the first policy control network element can more accurately determine the background traffic transfer policy of the second terminal device, thereby improving a success rate of transmitting background traffic.

In an optional implementation, when determining the at least one piece of fourth information, the processor 902 is configured to: obtain at least one piece of tenth information of the at least one second terminal device on a third network element, where the tenth information includes an identifier of the second terminal device, a second time, a second location, and a second network element status, the third network element serves the at least one second terminal device, and the second terminal device camps on the second location at the second time, and has the second network element status; and determine the at least one piece of fourth information based on the at least one piece of tenth information of the at least one second terminal device.

In an optional implementation, the second network element status includes one or more of the following: a second load, a second capacity, and a second available bandwidth. The second load is a load of a second network element corresponding to the second location, and the second network element serves the second terminal device. The second capacity is a capacity of the second network element corresponding to the second location. The second bandwidth is a bandwidth for the second network element corresponding to the second location. The second terminal device camps on the second location at the second time.

In an optional implementation, the first network element status includes one or more of the following: a first load, a first capacity, and a first available bandwidth. The first load is a load of a first network element corresponding to the first location, and the first network element serves the first terminal device. The first capacity is a capacity of the first network element corresponding to the first location. The first available bandwidth is a bandwidth for the first network element corresponding to the first location. The first terminal device camps on the first location at the first time.

In conclusion, according to the method and apparatus for determining a background traffic transfer policy provided in the embodiments of this application, the first policy control network element obtains the at least one piece of fourth information, where the fourth information includes the identifier of the at least one first terminal device, the first time, the first location, and the first network element status; the first policy control network element determines the background traffic transfer policy of the at least one second terminal device based on the ninth information, where the ninth information includes the at least one piece of fourth information, the at least one first terminal device is a part or all of the at least one second terminal device, and the at least one first terminal device camps on the first location at the first time, and has the first network element status. According to the foregoing method, when formulating the background traffic transfer policy of the at least one second terminal device, the first policy control network element may consider a movement track (including the first time and the first location) of each second terminal device and the first network element status at the first location. In this way, the background traffic transfer policy of the at least one second terminal device formulated by the first policy control network element is more accurate.

Figure 15:
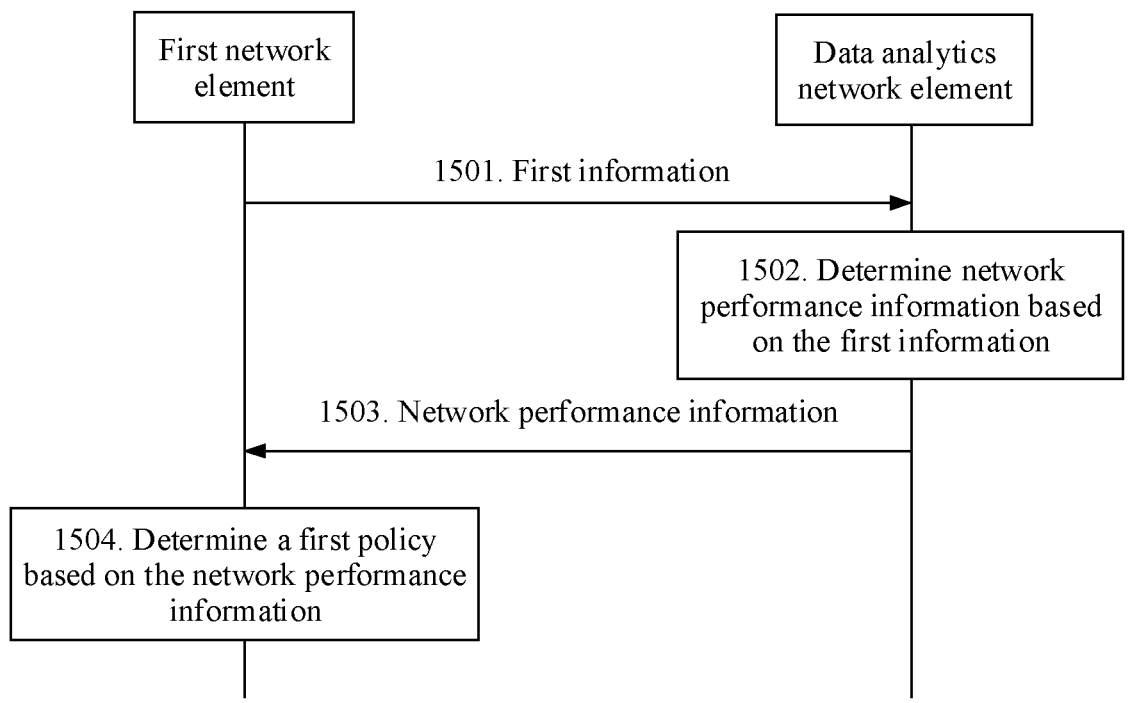
FIG. 15 is a flowchart of a method for determining network performance information according to this application.

This application further provides a method for determining network performance information. The method is also applicable to the communications system shown in FIG. 1. Referring to FIG. 15, a procedure of the method may include the following steps.

Step 1501. A first network element sends first information to a data analytics network element, where the first information is used to request network performance information, and the first information includes one or more of the following: area information of a first area, an identifier of a requesting device, or a terminal device group identifier.

Step 1502. The data analytics network element determines the network performance information based on the first information, where the network performance information includes area information of a second area and second information, and the second information includes one or more of the following: load information of a network in the second area, service experience information for a service in the second area, or a number of terminal devices in the second area. The second area is a subarea of the first area.

It should be understood that there may be one or more second areas. Each second area corresponds to one piece of second information. The one or more second areas are obtained through division by the data analytics network element based on the first area provided by the first network element or obtained through division by the data analytics network element based on an area (which may be the first area) in which a terminal device corresponding to the identifier of the requesting device and/or the terminal device group identifier is located.

Step 1503. The data analytics network element sends the network performance information to the first network element.

Step 1504. The first network element determines a first policy based on the network performance information.

According to the foregoing method, the first network element may formulate a policy based on area information, that is, related information, of a subarea obtained through division, such that the formulated policy can be more accurate. If the first area can be divided, a subarea obtained after the division is smaller than the first area. If the first area cannot be divided, a subarea is the same as the first area.

In an optional implementation, the first network element is a policy control network element (for example, a PCF), or may be another network element. Examples are not listed one by one herein.

In an optional implementation, the requesting device serves at least one terminal device. For example, the requesting device may be a service network element that currently serves the at least one terminal device, that is, may be the AF network element in FIG. 1, including an AF network element (for example, a P-CSCF) controlled by an operator, or may be a third-party AF network element, for example, a third-party service server.

In an optional implementation, when the requesting device is a service network element, that the first network element receives third information from the requesting device may be as follows: The service network element may send the third information to the first network element via a network exposure function network element. The foregoing process may be as follows: The service network element sends the third information to the network exposure function network element. Optionally, the service network element may send the third information to the network exposure function network element by invoking an Nnef_BDTPNegotiation_Create request service. Then, the network exposure function network element forwards the third information to the first network element. Optionally, the network exposure function network element may send the third information to the first network element by invoking an Npcf_BDTPolicyControl_Create request service.

For example, the first policy may include a background traffic transfer policy, and the background traffic transfer policy is a background traffic transfer policy of at least one terminal device.

When the first policy includes the background traffic transfer policy, the first network element receives the third information from the requesting device, where the third information is used to request the background traffic transfer policy, and the third information includes one or more of the following: the area information of the first area, the terminal device group identifier, or the identifier of the requesting device. The first network element sends the background traffic transfer policy to the requesting device.

In an optional implementation, the background traffic transfer policy includes the area information of the second area.

In another optional implementation, the first network element sends the area information of the second area to the requesting device.

According to the foregoing method, the requesting device may learn that the background traffic transfer policy is formulated for a subarea, and may send the background traffic transfer policy to the at least one terminal device more accurately, such that the terminal device executes a more accurate background traffic transfer policy.

In an optional implementation, the background traffic transfer policy further includes one or more of the following information: a recommended time window, a charging rate, a maximum aggregated bitrate, or the like.

In an implementation, information included in the first information is generated based on information included in the third information.

In an optional implementation, when the first information includes the area information of the first area, a method used by the data analytics network element to determine the network performance information based on the first information may be as follows.

The data analytics network element obtains the area information of the second area based on the area information of the first area.

The data analytics network element determines one or more of the following: the load information of the network in the second area, the service experience information for the service in the second area, or the number of terminal devices in the second area.

In another optional implementation, when the first information includes the terminal device group identifier and/or the identifier of the requesting device, a method used by the data analytics network element to determine the network performance information based on the first information may be as follows.

The data analytics network element determines the area information of the second area based on the terminal device group identifier and/or the identifier of the requesting device.

The data analytics network element determines one or more of the following: the load information of the network in the second area, the service experience information for the service in the second area, or the number of terminal devices in the second area.

In an example, that the data analytics network element determines the area information of the second area based on the terminal device group identifier and/or the identifier of the requesting device includes: the data analytics network element determines the area information of the first area based on the terminal device group identifier and/or the identifier of the requesting device; and the data analytics network element obtains the area information of the second area based on the area information of the first area.

Optionally, a method used by the data analytics network element to determine the area information of the first area based on the terminal device group identifier and/or the identifier of the requesting device may be as follows.

The data analytics network element determines an identifier of at least one terminal device based on the terminal device group identifier and/or the identifier of the requesting device, then determines location information of all terminal devices based on the identifier of the at least one terminal device, and finally determines the area information of the first area based on the location information of all the terminal devices. The location information is used to indicate a location on which the terminal device camps.

Optionally, a method used by the data analytics network element to determine the identifier of the at least one terminal device based on the terminal device group identifier and/or the identifier of the requesting device may be as follows: The data analytics network element obtains an identifier list of the terminal devices from a database network element based on the terminal device group identifier and/or the identifier of the requesting device, that is, obtains the identifier of the at least one terminal device.

Optionally, that the data analytics network element determines the location information of the at least one terminal device based on the identifier of the at least one terminal device may be that the data analytics network element obtains the location information of the at least one terminal device from an access and mobility management function network element or an access device based on the identifier of the at least one terminal device.

In an optional implementation, a method used by the data analytics network element to obtain the area information of the second area based on the area information of the first area may be as follows.

The data analytics network element obtains locally stored area information of the second area based on the area information of the first area.

Alternatively, the data analytics network element obtains the area information of the second area from an operation, management, and maintenance network element or an access and mobility management function network element based on the area information of the first area.

Alternatively, the data analytics network element collects location information of at least one terminal device located in the first area from the first area, and determines the area information of the second area based on the location information of the at least one terminal device located in the first area.

In an optional implementation, a method used by the data analytics network element to determine the load information of the network in the second area may be as follows: The data analytics network element obtains the load information of the network in the second area from a network management network element or an operation, administration and maintenance network element.

In an optional implementation, a method used by the data analytics network element to determine the load information of the network in the second area may be as follows: The data analytics network element determines the load information of the network in the second area based on the service experience information for the service in the second area. For example, when an interval of a service experience service mean opinion score (MOS) is [0, 5.0] and a service experience requirement is greater than or equal to 3.0, if the service MOS is [4.0, 5.0], the load information indicates a light load; if the service MOS is [3.0, 4.0], the load information indicates a medium load; if the service MOS is less than or equal to 3.0, the load information indicates a heavy load.

In an optional implementation, a method used by the data analytics network element to determine the service experience information for the service in the second network area may be as follows.

First, the data analytics network element may collect service data and network data of a terminal device in a network, as shown in Table 1 and Table 2 respectively. The data analytics network element uses a correlation identifier to obtain a training sample, that is, a mean opinion score (MOS) of a service and corresponding network data (including a bit rate, a packet loss rate, a packet error rate, and the like at a QoS flow level).

TABLE 1

Service data from service experience data of a tenant

| Information | Source | Purpose |
| --- | --- | --- |
| Correlation identifier (Correlation ID) | AF network element | Used to correlate data that is on each NE and that is in Table 1 and Table 2 |
| Application ID | | Service identifier of a service of a terminal device |
| Geographical area identifier (geographical area ID) | | Identified geographical area in which the terminal device is located when the terminal device uses a service |
| Service MOS | | Service experience data of the terminal device |

In Table 1, when the information is a correlation identifier, the correlation identifier comes from the AF network element, and is used to correlate data that is on each network element and that is in Table 1 and Table 2. When the information is an application identifier (Application ID), the application ID comes from the AF network element, is a service identifier of a service of the terminal device, and is used to identify the service of the terminal device. When the information is a geographical area identifier, the geographical area identifier comes from the AF network element, and is used to identify a geographical area in which the terminal device uses the service. When the information is a service MOS, the service MOS is obtained from the AF network element, and is used to identify service experience data of the terminal device.

TABLE 2

Network data from a 5G NF

| Information | Data Source | Purpose |
| --- | --- | --- |
| Correlation identifier (Correlation ID) | | Used to correlate data that is on each network element (NE) and that is in Table 1 and Table 2 |
| Application ID | PCF, UPF | Service identifier of a service of a terminal device |
| Quality of service flow identifier (QFI) | SMF, UPF | Quality of service flow identifier of a service of a terminal device |
| Cell ID | AMF, RAN | Used to identify a cell that provides a service of a terminal device |
| QoS flow bit rate | UPF | Determine a quality of service flow parameter, a guaranteed flow bit rate (GFBR), of a service of a terminal device |
| QoS flow Packet Delay Budget | UPF | Determine a quality of service flow parameter, a packet delay budget (PDB), of a |

TABLE 2-continued

Network data from a 5G NF

| Information | Data Source | Purpose |
|---|---|---|
| Qos flow Packet Error Rate | UPF | service of a terminal device Determine a quality of service flow parameter, a packet error rate (PER), of a service of a terminal device |
| Network data X4 | RAN | Network data X4 |
| Network data X5 | RAN | Network data X5 |

In Table 2, when the information is a correlation identifier, the correlation identifier is used to correlate data that is on each network element and that is in Table 1 and Table 2. When the information is an application ID, the application ID comes from a PCF network element or a UPF network element, is a service identifier of a service of a terminal device, and is used to identify the service of the terminal device. When the information is a QFI, the QFI comes from an SMF network element or a UPF network element, is a quality of service flow identifier of a service of the terminal device, and is used to identify a quality of service flow of the service of the terminal device. When the information is a cell ID, the cell ID comes from an AMF or a RAN, and is used to identify a cell that provides a service of the terminal device. When the information is a QoS flow bit rate, the QoS flow bit rate comes from the UPF, and is used to determine the parameter GFBR of the quality of service flow of the service of the terminal device. When the information is a QoS flow packet delay budget, the QoS flow packet delay budget comes from the UPF, and is used to determine the parameter PDB of the quality of service flow of the service of the terminal device. When the information is a QoS flow packet error rate, the QoS flow packet error rate comes from the UPF, and is used to determine the parameter PER of the quality of service flow of the service of the terminal device. When the information is network data X4, the network data X4 comes from the RAN, and is used to identify network data X4. When the information is network data X5, the network data X5 comes from the RAN, and is used to identify network data X5.

Then, the data analytics network element obtains a service MOS model through training based on the training sample, and the service MOS model is used to represent a correspondence between the service experience information and the network data. For example, the service MOS model may be expressed as follows:

$$H(x)=W0*X0+W1*X1+W2*X2+W3*X3+W4*X4+W5*X5+\ldots+Wn*Xn \quad (1).$$

With reference to Table 2, X is a variable, X1 may be the QoS flow bit rate, X2 may be the QoS flow packet error rate, X3 may be the QoS flow packet error rate, X4 may be the network data X4, and X5 may be the network data X5. Wn represents a weight of an $n^{th}$ variable, n represents a quantity of variables, Xn represents the $n^{th}$ variable, n is an integer greater than or equal to 1, and H(x) represents the service MOS model.

Finally, the data analytics network element may collect, from the second area, network data corresponding to the service of the terminal device in the second area, and may obtain the service experience information for the service in the second area based on the foregoing service MOS model.

In an optional implementation, a method used by the data analytics network element to determine the number of terminal devices in the second area may be as follows.

The data analytics network element collects historical terminal device information (including a time and a quantity of terminal devices) in the second area and historical service information (including a corresponding time and the service experience information) in the second area, and then obtains, through analysis, a number of terminal devices that can be accommodated in the second area when the service experience requirement is satisfied, where the quantity is recorded as the number of terminal devices in the second area.

The number of terminal devices in the second area is a number of terminal devices that can be accommodated in the second area in a different time period.

It should be noted that there may be one or more second areas, that is, the first area is divided into one or more second areas.

It should be noted that when the first policy is another policy, the first network element receives, from the requesting device, information for requesting another policy. The information may also include one or more of the following: the area information of the first area, the terminal device group identifier, or the identifier of the requesting device. In this embodiment of this application, an example in which the first policy is the background traffic transfer policy is only used for description, and the case in which the first policy is the other policy is not described in detail herein.

Figure 16:
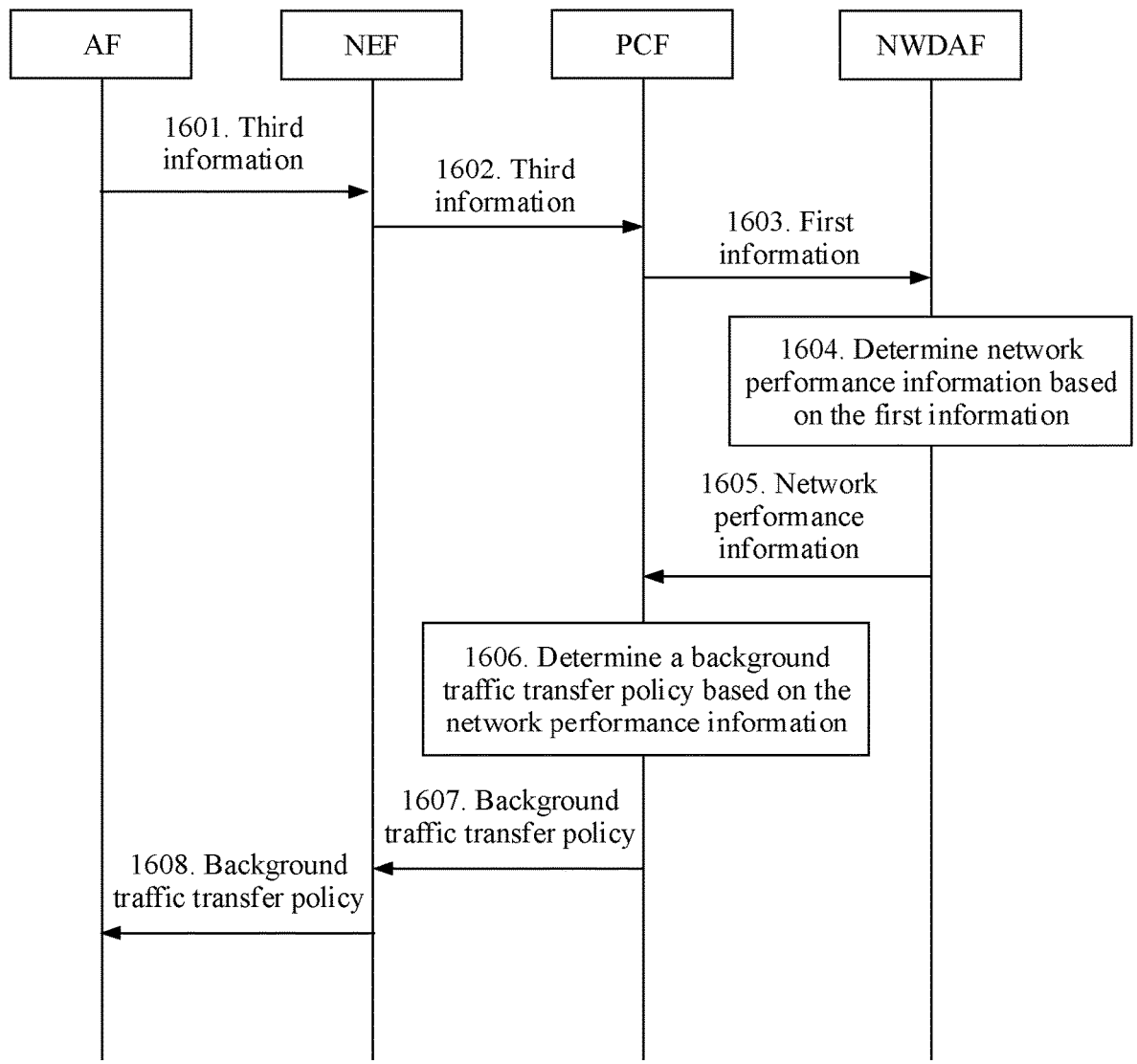
FIG. 16 is a flowchart of an example of another method for determining a background traffic transfer policy according to this application.

The following uses an example in which the first policy is the background traffic transfer policy, to describe an example of the method for determining a background traffic transfer policy provided in the embodiments of this application. As shown in FIG. 16, in this example, in a process in which a requesting device requests a background traffic transfer policy, a data analytics network element divides a first area into one or more second areas, such that a policy control network element accurately formulates the background traffic transfer policy. An example in which the requesting device is a service network element AF, a terminal device is UE, a first network element is a policy control network element PCF, and the data analytics network element is an NWDAF is used for description. A procedure of the example may include the following steps.

Step 1601. The AF sends third information to an NEF, where the third information is used to request a background traffic transfer policy. The third information includes one or more of the following: area information of a first area, an identifier of the AF, or a UE group identifier.

The NEF is an example of a network exposure function network element. The NEF herein may alternatively be replaced with another network exposure function network element. This is not limited in this application.

For example, the AF may send the third information to the NEF by invoking an Nnef_BDTPNegotiation_Create request service or an Nnef_Trigger_Delivery request service.

Step 1602. The NEF sends the third information to the PCF.

For example, the NEF may send the third information to the PCF by invoking an Npcf_BDTPolicyControl_Create request service or an Npcf_PolicyAuthorization_Create request service.

Step 1603. The PCF sends first information to the NWDAF, where the first information includes one or more of the following: the area information of the first area, the identifier of the AF, or the UE group identifier.

The PCF may send the first information to the NWDAF by invoking an Nnwdaf_AnalyticsSubscription_Subscribe request service.

Step 1604. The NWDAF determines network performance information based on the first information, where the network performance information includes area information of a second area and second information, and the second information includes one or more of the following: load information of a network in the second area, service experience information for a service in the second area, or a number of terminal devices in the second area. The second area is a subarea of the first area.

For a method for determining the network performance information by the NWDAF based on the first information, refer to related content in the embodiment shown in FIG. 15. Details are not described herein again.

Step 1605. The NWDAF sends the network performance information to the PCF.

The NWDAF may send the network performance information to the PCF by invoking an Nnwdaf_Nnwdaf_AnalyticsSubscription_Subscribe Response service.

Step 1606. The PCF determines the background traffic transfer policy based on the network performance information.

For related descriptions of the background traffic transfer policy, refer to the foregoing embodiments. Details are not described herein again.

Step 1607. The PCF sends the background traffic transfer policy to the NEF. The background traffic transfer policy includes the area information of the second area.

The PCF may send the background traffic transfer policy to the NEF by invoking an Npcf_BDT Policy Control_Create response service or an Npcf_PolicyAuthorization_Notify service.

Step 1608. The NEF sends the background traffic transfer policy to the AF.

The NEF may send the background traffic transfer policy to the AF by invoking an Nnef_BDT PNegotiation_Create response service or an Nnef_Trigger_Delivery response service.

Optionally, the NEF may first convert the area information, of the second area, of a network type in the background traffic transmission policy into area information, of the second area, of a geographic area type, and then perform step 1608.

According to the foregoing method, the PCF may formulate the background traffic transfer policy based on area information of a subarea obtained through division and related information. In this way, the formulated background traffic transfer policy can be more accurate.

The foregoing embodiments provided in this application describe, from a perspective of interaction between network elements or devices, the solutions of the method for determining a background traffic transfer policy provided in the embodiments of this application. It may be understood that, to implement the foregoing functions, the network elements and devices, for example, the first policy control network element, the data analytics network element, the first service network element, the first terminal device, and the second terminal device, each include corresponding hardware structures and/or software modules for performing the functions. A person skilled in the art should easily be aware that, in combination with units and algorithm steps of the examples described in the embodiments disclosed in this application, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In an embodiment, the communications apparatus shown in FIG. 7 may be configured to: perform an operation performed by the first service network element in the embodiment shown in FIG. 15, and perform an operation performed by the PCF in the embodiment shown in FIG. 16. Examples are described below.

The sending module 702 is configured to send first information to a data analytics network element, where the first information is used to request network performance information, and the first information includes one or more of the following: area information of a first area, an identifier of a requesting device, or a terminal device group identifier.

The receiving module 701 is configured to receive the network performance information from the data analytics network element, where the network performance information includes area information of a second area and second information, and the second information includes one or more of the following: load information of a network in the second area, service experience information for a service in the second area, or a number of terminal devices in the second area, where the second area is a subarea of the first area.

The processing module 703 is configured to determine a first policy based on the network performance information.

Therefore, based on the communications apparatus, after requesting the network performance information from the data analytics network element, the first network element may formulate the first policy more accurately based on area information of a subarea obtained through division and related information.

In an optional implementation, the first policy includes a background traffic transfer policy, and the background traffic transfer policy is a background traffic transfer policy of at least one terminal device.

In an optional implementation, the receiving module 701 is further configured to receive third information from the requesting device, where the third information is used to request the background traffic transfer policy, and the third information includes one or more of the following: the area information of the first area, the terminal device group identifier, or the identifier of the requesting device.

The sending module 702 is further configured to send the background traffic transfer policy to the requesting device.

In an optional implementation, the background traffic transfer policy includes the area information of the second area.

In an optional implementation, the sending module 702 is further configured to send the area information of the second area to the requesting device.

In an optional implementation, the background traffic transfer policy further includes one or more of the following information: a recommended time window, a charging rate, or a maximum aggregated bitrate.

In an optional implementation, the first network element is a policy control function network element.

In an embodiment, the communications apparatus shown in FIG. 7 may be configured to: perform an operation performed by the data analytics network element in the embodiment shown in FIG. 15, and perform an operation performed by the NWDAF in the embodiment shown in FIG. 16. Examples are described below.

The receiving module 701 is configured to receive first information from a first network element, where the first information is used to request network performance information, and the first information includes one or more of the following: area information of a first area, an identifier of a requesting device, or a terminal device group identifier.

The processing module 703 is configured to determine network performance information based on the first information, where the network performance information includes area information of a second area and second information, and the second information includes one or more of the following: load information of a network in the second area, service experience information for a service in the second area, or a number of terminal devices in the second area. The second area is a subarea of the first area.

The sending module 702 is configured to send the network performance information to the first network element.

Therefore, based on the communications apparatus, after requesting the network performance information from the data analytics network element, the first network element may formulate the first policy more accurately based on area information of a subarea obtained through division and related information.

In an optional implementation, when the first information includes the area information of the first area, when determining the network performance information based on the first information, the processing module is configured to: obtain the area information of the second area based on the area information of the first area; and determine one or more of the following: the load information of the network in the second area, the service experience information for the service in the second area, or the number of terminal devices in the second area.

In an optional implementation, when the first information includes the terminal device group identifier and/or the identifier of the requesting device, when determining the network performance information based on the first information, the processing module 703 is configured to: determine the area information of the second area based on the terminal device group identifier and/or the identifier of the requesting device; and determine one or more of the following: the load information of the network in the second area, the service experience information for the service in the second area, or the number of terminal devices in the second area.

In an optional implementation, when determining the area information of the second area based on the terminal device group identifier and/or the identifier of the requesting device, the processing module 703 is configured to: determine the area information of the first area based on the terminal device group identifier and/or the identifier of the requesting device; and obtain the area information of the second area based on the area information of the first area.

In an optional implementation, when obtaining the area information of the second area based on the area information of the first area, the processing module 703 is configured to: obtain locally stored area information of the second area based on the area information of the first area; or obtain the area information of the second area from an operation, management, and maintenance network element or an access and mobility management function network element based on the area information of the first area.

In an optional implementation, when determining the load information of the network in the second area, the processing module 703 is configured to: obtain the load information of the network in the second area from a network management network element or the operation, management, and maintenance network element.

In an optional implementation, the first network element is a policy control function network element.

In an embodiment, the communications apparatus shown in FIG. 8 may be configured to: perform an operation performed by the requesting device in the embodiment shown in FIG. 15, and perform an operation performed by the AF in the embodiment shown in FIG. 16. For example, details are provided below.

The sending module 802 is configured to send third information to a first network element, where the third information is used to request a background traffic transfer policy, and the third information includes one or more of the following: area information of a first area, an identifier of the requesting device, or a terminal device group identifier.

The receiving module 801 is configured to receive the background traffic transfer policy from the first network element, where the background traffic transfer policy includes area information of a second area, and the second area is a subarea of the first area.

Therefore, based on the communications apparatus, the background traffic transfer policy requested by the requesting device from the first network element can be more accurate.

In an optional implementation, the background traffic transfer policy is a background traffic transfer policy of at least one terminal device.

In an optional implementation, the requesting device serves the at least one terminal device.

In an optional implementation, the background traffic transfer policy includes one or more of the following information: a recommended time window, a charging rate, or a maximum aggregated bitrate.

In an optional implementation, the first network element is a policy control function network element.

In an embodiment, the communications apparatus shown in FIG. 9 may be configured to perform an operation performed by the first service network element in the embodiment shown in FIG. 15, and may be further configured to perform an operation performed by the PCF in the embodiment shown in FIG. 16. For example, details are provided below.

The transceiver 901 is configured to implement communication interaction with another device connected to the first network element (for example, the PCF), that is, configured to send and receive data.

The processor 902 is configured to: control the transceiver 901 to receive network performance information from a data analytics network element, where the network performance information includes area information of a second area and second information, and the second information includes one or more of the following: load information of a network in the second area, service experience information for a service in the second area, or a number of terminal devices in the second area, where the second area is a subarea of the first area; and determine a first policy based on the network performance information.

Therefore, based on the communications apparatus, after requesting the network performance information from the data analytics network element, the first network element may formulate the first policy more accurately based on area information of a subarea obtained through division and related information.

In an optional implementation, the first policy includes a background traffic transfer policy, and the background traffic transfer policy is a background traffic transfer policy of at least one terminal device.

In an optional implementation, the processor 902 is further configured to: control the transceiver 901 to receive third information from a requesting device, where the third information is used to request the background traffic transfer policy, and the third information includes one or more of the following: area information of a first area, a terminal device group identifier, or an identifier of the requesting device; and control the transceiver 901 to send the background traffic transfer policy to the requesting device.

In an optional implementation, the background traffic transfer policy includes the area information of the second area.

In an optional implementation, the processor 902 is further configured to control the transceiver 901 to send the area information of the second area to the requesting device.

In an optional implementation, the background traffic transfer policy further includes one or more of the following information: a recommended time window, a charging rate, or a maximum aggregated bitrate.

In an optional implementation, the first network element is a policy control function network element.

In another embodiment, the communications apparatus shown in FIG. 9 may be configured to perform an operation performed by the data analytics network element in the embodiment shown in FIG. 15, and may be further configured to perform an operation performed by the NWDAF in the embodiment shown in FIG. 16. Examples are described below.

The transceiver 901 is configured to implement communication interaction with another device connected to the data analytics network element (for example, the NWDAF), that is, configured to send and receive data.

The processor 902 is configured to: control the transceiver 901 to receive first information from a first network element, where the first information is used to request network performance information, and the first information includes one or more of the following: area information of a first area, an identifier of a requesting device, or a terminal device group identifier; determine network performance information based on the first information, where the network performance information includes area information of a second area and second information, and the second information includes one or more of the following: load information of a network in the second area, service experience information for a service in the second area, or a number of terminal devices in the second area, where the second area is a subarea of the first area; and control the transceiver 901 to send the network performance information to the first network element.

Therefore, based on the communications apparatus, after requesting the network performance information from the data analytics network element, the first network element may formulate the first policy more accurately based on area information of a subarea obtained through division and related information.

In an optional implementation, when the first information includes the area information of the first area, when determining the network performance information based on the first information, the processor 902 is configured to: obtain the area information of the second area based on the area information of the first area; and determine one or more of the following: the load information of the network in the second area, the service experience information for the service in the second area, or the number of terminal devices in the second area.

In an optional implementation, when the first information includes the terminal device group identifier and/or the identifier of the requesting device, when determining the network performance information based on the first information, the processor 902 is configured to: determine the area information of the second area based on the terminal device group identifier and/or the identifier of the requesting device; and determine one or more of the following: the load information of the network in the second area, the service experience information for the service in the second area, or the number of terminal devices in the second area.

In an optional implementation, when determining the area information of the second area based on the terminal device group identifier and/or the identifier of the requesting device, the processor 902 is configured to: determine the area information of the first area based on the terminal device group identifier and/or the identifier of the requesting device; and obtain the area information of the second area based on the area information of the first area.

In an optional implementation, when obtaining the area information of the second area based on the area information of the first area, the processor 902 is configured to: obtain locally stored area information of the second area based on the area information of the first area; or obtain the area information of the second area from an operation, management, and maintenance network element or an access and mobility management function network element based on the area information of the first area.

In an optional implementation, when determining the load information of the network in the second area, the processor 902 is configured to: obtain the load information of the network in the second area from a network management network element or the operation, management, and maintenance network element.

In an optional implementation, the first network element is a policy control function network element.

In another embodiment, the communications apparatus shown in FIG. 9 may be configured to perform an operation performed by the requesting device in the embodiment shown in FIG. 15, and may be further configured to perform an operation performed by the AF in the embodiment shown in FIG. 16. Examples are described below.

The transceiver 901 is configured to implement communication interaction with another device connected to the requesting device (for example, the AF), that is, configured to send and receive data.

The processor 902 is configured to: control the transceiver 901 to send third information to a first network element, where the third information is used to request a background traffic transfer policy, and the third information includes one or more of the following: area information of a first area, an identifier of the requesting device, or a terminal device group identifier; and control the transceiver 901 to receive the background traffic transfer policy from the first network element, where the background traffic transfer policy includes area information of a second area, and the second area is a subarea of the first area.

Therefore, based on the communications apparatus, the background traffic transfer policy requested by the requesting device from the first network element can be more accurate.

In an optional implementation, the background traffic transfer policy is a background traffic transfer policy of at least one terminal device.

In an optional implementation, the requesting device serves the at least one terminal device.

In an optional implementation, the background traffic transfer policy includes one or more of the following information: a recommended time window, a charging rate, or a maximum aggregated bitrate.

In an optional implementation, the first network element is a policy control function network element.

In this application, "at least one" means one or more, and "a plurality of" means two or more. The term "and/or" describes an association relationship between associated objects and may indicate three relationships. For example, A and/or B may indicate the following cases: Only A exists, both A and B exist, and only B exists, where A and B may be singular or plural. The character "/" generally indicates an "or" relationship between the associated objects. "At least one item (piece) of the following" or a similar expression thereof means any combination of these items, including any combination of singular items (pieces) or plural items (pieces). For example, at least one (piece) of a, b, or c may represent: a, b, c, a-b, a-c, b-c, or a-b-c, where a, b, and c may be singular or plural.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, such that the instructions executed by a computer or the processor of another programmable data processing device generate an apparatus for implementing a specific function in one or more processes in the flowcharts and/or in one or more blocks in the block diagrams.

These computer program instructions may be stored in a computer-readable memory that can instruct the computer or the other programmable data processing device to work in a specific manner, such that the instructions stored in the computer-readable memory generate an artifact that includes an instruction apparatus. The instruction apparatus implements the specific function in the one or more processes in the flowcharts and/or in the one or more blocks in the block diagrams.

These computer program instructions may be loaded onto the computer or the other programmable data processing device, such that a series of operations and steps are performed on the computer or the other programmable device, thereby generating computer-implemented processing. Therefore, the instructions executed on the computer or the other programmable device provide steps for implementing the specific function in the one or more processes in the flowcharts and/or in the one or more blocks in the block diagrams.

A person skilled in the art can make various modifications and variations to the embodiments of this application without departing from the scope of the embodiments of this application. In this way, the embodiments of this application are intended to cover these modifications and variations provided that they fall within the scope of the following claims and their equivalent technologies.

What is claimed is:

1. A method for determining network performance information, comprising:
    sending, by a first network element, first information to a data analytics network element, wherein the first information is for requesting the network performance information, and wherein the first information comprises one or more of: first area information of a first area, an identifier of a requesting device, or a terminal device group identifier;
    receiving, by the data analytics network element, the first information from the first network element;
    determining, by the data analytics network element, the network performance information based on the first information, wherein the network performance information comprises second area information of a second area and second information, wherein the second information comprises one or more of: load information of a network in the second area, service experience information for a service in the second area, or a number of terminal devices in the second area, wherein the second area is a subarea of the first area, and wherein when the first information comprises the first area information, determining the network performance information comprises:
        obtaining, by the data analytics network element, the second area information based on the first area information; and
        determining, by the data analytics network element, one or more of: the load information of the network in the second area, the service experience information for the service in the second area, or the number of terminal devices in the second area;
    sending, by the data analytics network element, the network performance information to the first network element;
    receiving, by the first network element, the network performance information from the data analytics network element; and
    determining, by the first network element, a first policy based on the network performance information.

2. The method according to claim 1, wherein the first policy comprises a background traffic transfer policy of at least one terminal device.

3. The method according to claim 2, further comprising:
    receiving, by the first network element, third information from the requesting device, wherein the third information is for requesting the background traffic transfer policy, and wherein the third information comprises one or more of: the first area information, the terminal device group identifier, or the identifier of the requesting device; and
    sending, by the first network element, the background traffic transfer policy to the requesting device.

4. The method according to claim 2, wherein the background traffic transfer policy comprises the second area information.

5. The method according to claim 2, wherein the background traffic transfer policy further comprises one or more of: a recommended time window, a charging rate, or a maximum aggregated bitrate.

6. The method according to claim 1, wherein when the first information comprises at least one of the terminal device group identifier or the identifier of the requesting device, determining, by the data analytics network element, the network performance information based on the first information comprises:
- determining, by the data analytics network element, the second area information based on at least one of the terminal device group identifier or the identifier of the requesting device; and
- determining, by the data analytics network element, one or more of: the load information of the network in the second area, the service experience information for the service in the second area, or the number of terminal devices in the second area.

7. The method according to claim 6, wherein determining, by the data analytics network element, the second area information based on at least one of the terminal device group identifier or the identifier of the requesting device comprises:
- determining, by the data analytics network element, the first area information based on at least one of the terminal device group identifier or the identifier of the requesting device; and
- obtaining, by the data analytics network element, the second area information based on the first area information.

8. The method according to claim 1, further comprising:
- sending, by the requesting device, third information to the first network element, wherein the third information is for requesting a background traffic transfer policy, and wherein the third information comprises one or more of: the first area information, the identifier of the requesting device, or the terminal device group identifier; and
- receiving, by the requesting device, the background traffic transfer policy from the first network element.

9. The method according to claim 8, wherein the background traffic transfer policy is of at least one terminal device.

10. A communication system, comprising:
- a first network element configured to send first information, wherein the first information is for requesting network performance information, and wherein the first information comprises one or more of: first area information of a first area, an identifier of a requesting device, or a terminal device group identifier; and
- a data analytics network element is configured to:
  - receive the first information from the first network element;
  - determine the network performance information based on the first information, wherein the network performance information comprises second area information of a second area and second information, wherein the second information comprises one or more of: load information of a network in the second area, service experience information for a service in the second area, or a number of terminal devices in the second area, and
  - wherein the second area is a subarea of the first area; and
  - send the network performance information to the first network element,
- wherein the first network element is further configured to:
  - receive the network performance information from the data analytics network element; and
  - determine a first policy based on the network performance information,
- wherein when the first information comprises the first area information, the data analytics network element is configured to:
  - obtain the second area information based on the first area information; and
  - determine one or more of: the load information of the network in the second area, the service experience information for the service in the second area, or the number of terminal devices in the second area.

11. The communication system according to claim 10, wherein the first policy comprises a background traffic transfer policy of at least one terminal device.

12. The communication system according to claim 11, wherein the first network element is further configured to:
- receive third information from the requesting device, wherein the third information is for requesting the background traffic transfer policy, and wherein the third information comprises one or more of: the first area information of the first area, the terminal device group identifier, or the identifier of the requesting device; and
- send the background traffic transfer policy to the requesting device.

13. The communication system according to claim 11, wherein the background traffic transfer policy comprises the second area information.

14. The communication system according to claim 11, wherein the background traffic transfer policy further comprises one or more of: a recommended time window, a charging rate, or a maximum aggregated bitrate.

15. The communication system according to claim 10, wherein when the first information comprises at least one of the terminal device group identifier or the identifier of the requesting device, the data analytics network element is configured to:
- determine the second area information based on at least one of the terminal device group identifier or the identifier of the requesting device; and
- determine one or more of: the load information of the network in the second area, the service experience information for the service in the second area, or the number of terminal devices in the second area.

16. The communication system according to claim 15, wherein the data analytics network element is configured to:
- determine the first area information based on at least one of the terminal device group identifier or the identifier of the requesting device; and
- obtain the second area information based on the first area information.

17. The communication system according to claim 10, further comprising the requesting device, wherein the requesting device is configured to:
- send third information to the first network element, wherein the third information is for requesting a background traffic transfer policy, and wherein the third information comprises one or more of: the first area information, the identifier of the requesting device, or the terminal device group identifier; and
- receive, by the requesting device, the background traffic transfer policy from the first network element.

18. The communication system according to claim 17, wherein the background traffic transfer policy is that of at least one terminal device.

19. A method for determining network performance information, comprising:
- receiving, by a data analytics network element, first information from a first network element; wherein the first information is for requesting the network performance information, and wherein the first information comprises one or more of: first area information of a first area, an identifier of a requesting device, or a terminal device group identifier;
determining, by the data analytics network element, the network performance information based on the first information, wherein the network performance information comprises second area information of a second area and second information, wherein the second information comprises one or more of: load information of a network in the second area, service experience information for a service in the second area, or a number of terminal devices in the second area, wherein the second area is a subarea of the first area, and wherein when the first information comprises the first area information, determining the network performance information comprises:
  obtaining, by the data analytics network element, the second area information based on the first area information; and
  determining, by the data analytics network element, one or more of: the load information of the network in the second area, the service experience information for the service in the second area, or the number of terminal devices in the second area;
sending, by the data analytics network element, the network performance information to the first network element;
receiving, by the first network element, the network performance information from the data analytics network element; and
determining, by the first network element, a first policy based on the network performance information.

20. A communications apparatus, comprising:
a memory configured to store instructions; and
one or more processors in communication with the memory and configured to execute the instructions to:
  receive first information from a first network element, wherein the first information is for requesting network performance information, and wherein the first information comprises one or more of: first area information of a first area, an identifier of a requesting device, or a terminal device group identifier;
  determine the network performance information based on the first information, wherein the network performance information comprises second area information of a second area and second information, wherein the second information comprises one or more of: load information of a network in the second area, service experience information for a service in the second area, or a number of terminal devices in the second area, wherein the second area is a subarea of the first area, and wherein when the first information comprises the first area information, determining the network performance information comprises:
  obtaining the second area information based on the first area information; and
  determining one or more of: the load information of the network in the second area, the service experience information for the service in the second area, or the number of terminal devices in the second area;
  send the network performance information to the first network element;
  receive the network performance information from a data analytics network element; and
  determine a first policy based on the network performance information.

* * * * *